(12) United States Patent
Tan et al.

(10) Patent No.: US 8,756,042 B2
(45) Date of Patent: Jun. 17, 2014

(54) METHOD AND SYSTEM FOR CHECKPOINTING DURING SIMULATIONS

(75) Inventors: Lijian Tan, Sugar Land, TX (US); John E. Anderson, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 449 days.

(21) Appl. No.: 13/034,341

(22) Filed: Feb. 24, 2011

(65) Prior Publication Data

US 2011/0288831 A1 Nov. 24, 2011

Related U.S. Application Data

(60) Provisional application No. 61/346,298, filed on May 19, 2010.

(51) Int. Cl.
| | |
|---|---|
| *G06G 7/48* | (2006.01) |
| *G06F 7/60* | (2006.01) |
| *G06F 17/10* | (2006.01) |
| *G01V 1/28* | (2006.01) |
| *G01V 1/00* | (2006.01) |

(52) U.S. Cl.
CPC ..................... *G01V 1/28* (2013.01); *G01V 1/005* (2013.01); *G01V 1/282* (2013.01)
USPC ............................... 703/10; 703/2

(58) Field of Classification Search
CPC ......... G01V 1/28; G01V 1/005; G01V 1/282; G06F 17/5009
USPC ....................................... 703/2, 10
See application file for complete search history.

(56) References Cited

U.S. PATENT DOCUMENTS

| 3,812,457 A | 5/1974 | Weller |
| 3,864,667 A | 2/1975 | Bahjat |

(Continued)

FOREIGN PATENT DOCUMENTS

| EP | 1 094 338 | 4/2001 |
| EP | 1 746 443 | 1/2007 |

(Continued)

OTHER PUBLICATIONS

Wang, Qiqi, Parviz Moin, and Gianluca Iaccarino. "Minimal repetition dynamic checkpointing algorithm for unsteady adjoint calculation." SIAM Journal on Scientific Computing 31.4 (2009): 2549-2567.*

(Continued)

*Primary Examiner* — Aniss Chad
(74) *Attorney, Agent, or Firm* — ExxonMobil Upstream Research Company Law Dept.

(57) ABSTRACT

Method and system for more efficient checkpointing strategy in cross correlating (316) a forward (328) and backward (308) propagated wave such as in migrating (326) or inverting seismic data. The checkpointing strategy includes storing in memory forward simulation data at a checkpointed time step, wherein the stored data are sufficient to do a cross correlation at that time step but not to restart the forward simulation. At other checkpoints, a greater amount of data sufficient to restart the simulation may be stored in memory (314). Methods are disclosed for finding an optimal combination, i.e. one that minimizes computation time (1132), of the two types of checkpoints for a given amount of computer memory (1004), and for locating a checkpoint at an optimal time step (306, 1214, 1310). The optimal checkpointing strategy (1002) also may optimize (1408) on use of fast (1402) vs. slow (1404) storage.

28 Claims, 19 Drawing Sheets

(56) References Cited

U.S. PATENT DOCUMENTS

| | | |
|---|---|---|
| 4,159,463 A | 6/1979 | Silverman |
| 4,168,485 A | 9/1979 | Payton et al. |
| 4,545,039 A | 10/1985 | Savit |
| 4,562,540 A | 12/1985 | Devaney |
| 4,575,830 A | 3/1986 | Ingram et al. |
| 4,594,662 A | 6/1986 | Devaney |
| 4,636,957 A | 1/1987 | Vannier et al. |
| 4,675,851 A | 6/1987 | Savit et al. |
| 4,686,654 A | 8/1987 | Savit |
| 4,707,812 A | 11/1987 | Martinez |
| 4,715,020 A | 12/1987 | Landrum, Jr. |
| 4,766,574 A | 8/1988 | Whitmore et al. |
| 4,780,856 A | 10/1988 | Becquey |
| 4,823,326 A | 4/1989 | Ward |
| 4,924,390 A | 5/1990 | Parsons et al. |
| 4,953,657 A | 9/1990 | Edington |
| 4,969,129 A | 11/1990 | Currie |
| 4,982,374 A | 1/1991 | Edington et al. |
| 5,260,911 A | 11/1993 | Mason et al. |
| 5,469,062 A | 11/1995 | Meyer, Jr. |
| 5,504,678 A | 4/1996 | Juszczak et al. |
| 5,583,825 A | 12/1996 | Carrazzone et al. |
| 5,677,893 A | 10/1997 | de Hoop et al. |
| 5,715,213 A | 2/1998 | Allen |
| 5,717,655 A | 2/1998 | Beasley |
| 5,719,821 A | 2/1998 | Sallas et al. |
| 5,721,710 A | 2/1998 | Sallas et al. |
| 5,790,473 A | 8/1998 | Allen |
| 5,798,982 A | 8/1998 | He et al. |
| 5,822,269 A | 10/1998 | Allen |
| 5,838,634 A | 11/1998 | Jones et al. |
| 5,852,588 A | 12/1998 | de Hoop et al. |
| 5,878,372 A | 3/1999 | Tabarovsky et al. |
| 5,920,838 A | 7/1999 | Norris et al. |
| 5,924,049 A | 7/1999 | Beasley et al. |
| 5,999,488 A | 12/1999 | Smith |
| 5,999,489 A | 12/1999 | Lazaratos |
| 6,014,342 A | 1/2000 | Lazaratos |
| 6,021,094 A | 2/2000 | Ober et al. |
| 6,028,818 A | 2/2000 | Jeffryes |
| 6,058,073 A | 5/2000 | VerWest |
| 6,125,330 A | 9/2000 | Robertson et al. |
| 6,219,621 B1 | 4/2001 | Hornbostel |
| 6,225,803 B1 | 5/2001 | Chen |
| 6,311,133 B1 | 10/2001 | Lailly et al. |
| 6,317,695 B1 | 11/2001 | Zhou et al. |
| 6,327,537 B1 | 12/2001 | Ikelle |
| 6,374,201 B1 | 4/2002 | Grizon et al. |
| 6,381,543 B1 | 4/2002 | Guerillot et al. |
| 6,388,947 B1 | 5/2002 | Washbourne et al. |
| 6,480,790 B1 | 11/2002 | Calvert et al. |
| 6,522,973 B1 | 2/2003 | Tonellot et al. |
| 6,545,944 B2 | 4/2003 | de Kok |
| 6,549,854 B1 | 4/2003 | Malinverno et al. |
| 6,574,564 B2 | 6/2003 | Lailly et al. |
| 6,593,746 B2 | 7/2003 | Stolarcyzk |
| 6,662,147 B1 | 12/2003 | Fournier et al. |
| 6,665,615 B2 | 12/2003 | Van Riel et al. |
| 6,687,619 B2 | 2/2004 | Moerig et al. |
| 6,687,659 B1 | 2/2004 | Shen |
| 6,704,245 B2 | 3/2004 | Becquey |
| 6,714,867 B2 | 3/2004 | Meunier |
| 6,735,527 B1 | 5/2004 | Levin |
| 6,754,590 B1 | 6/2004 | Moldoveanu |
| 6,766,256 B2 | 7/2004 | Jeffryes |
| 6,826,486 B1 | 11/2004 | Malinverno |
| 6,836,448 B2 | 12/2004 | Robertsson et al. |
| 6,842,701 B2 | 1/2005 | Moerig et al. |
| 6,859,734 B2 | 2/2005 | Bednar |
| 6,865,487 B2 | 3/2005 | Charron |
| 6,865,488 B2 | 3/2005 | Moerig et al. |
| 6,876,928 B2 | 4/2005 | Van Riel et al. |
| 6,882,938 B2 | 4/2005 | Vaage et al. |
| 6,882,958 B2 | 4/2005 | Schmidt et al. |
| 6,901,333 B2 | 5/2005 | Van Riel et al. |
| 6,903,999 B2 | 6/2005 | Curtis et al. |
| 6,927,698 B2 | 8/2005 | Stolarczyk |
| 6,944,546 B2 | 9/2005 | Xiao et al. |
| 6,947,843 B2 | 9/2005 | Fisher et al. |
| 6,970,397 B2 | 11/2005 | Castagna et al. |
| 6,977,866 B2 | 12/2005 | Huffman et al. |
| 6,999,880 B2 | 2/2006 | Lee |
| 7,046,581 B2 | 5/2006 | Calvert |
| 7,050,356 B2 | 5/2006 | Jeffryes |
| 7,069,149 B2 | 6/2006 | Goff et al. |
| 7,072,767 B2 | 7/2006 | Routh et al. |
| 7,092,823 B2 | 8/2006 | Lailly et al. |
| 7,110,900 B2 | 9/2006 | Adler et al. |
| 7,184,367 B2 | 2/2007 | Yin |
| 7,230,879 B2 | 6/2007 | Herkenoff et al. |
| 7,271,747 B2 | 9/2007 | Baraniuk et al. |
| 7,330,799 B2 | 2/2008 | Lefebvre et al. |
| 7,337,069 B2 | 2/2008 | Masson et al. |
| 7,373,251 B2 | 5/2008 | Hamman et al. |
| 7,373,252 B2 | 5/2008 | Sherrill et al. |
| 7,376,046 B2 | 5/2008 | Jeffryes |
| 7,376,539 B2 | 5/2008 | Lecomte |
| 7,400,978 B2 | 7/2008 | Langlais et al. |
| 7,436,734 B2 | 10/2008 | Krohn |
| 7,480,206 B2 | 1/2009 | Hill |
| 7,584,056 B2 | 9/2009 | Koren |
| 7,599,798 B2 | 10/2009 | Beasley et al. |
| 7,602,670 B2 | 10/2009 | Jeffryes |
| 7,616,523 B1 | 11/2009 | Tabti et al. |
| 7,620,534 B2 | 11/2009 | Pita et al. |
| 7,646,924 B2 | 1/2010 | Donoho |
| 7,672,194 B2 | 3/2010 | Jeffryes |
| 7,672,824 B2 | 3/2010 | Dutta et al. |
| 7,675,815 B2 | 3/2010 | Saenger et al. |
| 7,679,990 B2 | 3/2010 | Herkenhoff et al. |
| 7,715,985 B2 | 5/2010 | Van Manen et al. |
| 7,725,266 B2 | 5/2010 | Sirgue et al. |
| 7,835,072 B2 | 11/2010 | Izumi |
| 7,840,625 B2 | 11/2010 | Candes et al. |
| 8,121,823 B2 * | 2/2012 | Krebs et al. .................... 703/10 |
| 8,223,587 B2 * | 7/2012 | Krebs et al. .................... 367/43 |
| 8,428,925 B2 * | 4/2013 | Krebs et al. .................... 703/10 |
| 8,437,998 B2 * | 5/2013 | Routh et al. .................... 703/10 |
| 2002/0099504 A1 | 7/2002 | Cross et al. |
| 2002/0120429 A1 | 8/2002 | Ortoleva |
| 2002/0183980 A1 | 12/2002 | Guillaume |
| 2004/0199330 A1 | 10/2004 | Routh et al. |
| 2006/0235666 A1 | 10/2006 | Assa et al. |
| 2007/0036030 A1 | 2/2007 | Baumel et al. |
| 2007/0274155 A1 | 11/2007 | Ikelle |
| 2008/0175101 A1 | 7/2008 | Saenger et al. |
| 2008/0306692 A1 | 12/2008 | Singer et al. |
| 2009/0067041 A1 | 3/2009 | Krauklis et al. |
| 2009/0070042 A1 | 3/2009 | Birchwood et al. |
| 2009/0083006 A1 | 3/2009 | Mackie |
| 2009/0164186 A1 | 6/2009 | Haase et al. |
| 2009/0164756 A1 | 6/2009 | Dukken et al. |
| 2009/0187391 A1 | 7/2009 | Wendt et al. |
| 2009/0248308 A1 | 10/2009 | Luling |
| 2009/0259406 A1 | 10/2009 | Khadhraoui et al. |
| 2010/0008184 A1 | 1/2010 | Hegna et al. |
| 2010/0018718 A1 | 1/2010 | Krebs et al. |
| 2010/0039894 A1 | 2/2010 | Abma et al. |
| 2010/0054082 A1 | 3/2010 | McGarry et al. |
| 2010/0088035 A1 | 4/2010 | Etgen et al. |
| 2010/0088494 A1 | 4/2010 | Elnozahy |
| 2010/0103772 A1 | 4/2010 | Eick et al. |
| 2010/0142316 A1 | 6/2010 | Keers et al. |

FOREIGN PATENT DOCUMENTS

| | | |
|---|---|---|
| GB | 2 390 712 | 1/2004 |
| GB | 2 391 665 | 2/2004 |
| WO | WO 2006/037815 | 4/2006 |
| WO | WO 2007/046711 | 4/2007 |
| WO | WO 2008/042081 | 4/2008 |
| WO | WO 2008/123920 | 10/2008 |

(56) References Cited

FOREIGN PATENT DOCUMENTS

| WO | WO 2009/067041 | 5/2009 |
|---|---|---|
| WO | WO 2009/117174 | 9/2009 |

OTHER PUBLICATIONS

Symes, William W. "Reverse time migration with optimal checkpointing." Geophysics 72.5 (2007): SM213-SM221.*

McDade, Melinda. "Sun F5100 and Seismic Reverse Time Migration with faster Optimal Checkpointing" (Oct. 24, 2009).*

Dai, W. et al. (2010), "3D Multi-source Least-squares Reverse Time Migration," SEG Denver 2010 Annual Meeting, pp. 3120-3124.

Delprat-Jannuad, F. et al. (2005), "A fundamental limitation for the reconstruction of impedance profiles from seismic data," *Geophysics* 70(1), pp. R1-R14.

Dunkin, J.W. et al. (1973), "Effect of Normal Moveout on a Seismic Pluse," *Geophysics* 38(4), pp. 635-642.

Igel, H. et al. (1996), "Waveform inversion of marine reflection seismograms for P impedance and Poisson's ratio," *Geophys. J. Int.* 124i, pp. 363-371.

Lancaster, S. et al. (2000), "Fast-track 'colored' inversion," 70$^{th}$ SEG Ann. Meeting, *Expanded Abstracts*, pp. 1572-1575.

Lazaratos, S. et al. (2009), "Inversion of Pre-migration Spectral Shaping," 2009 SEG Houston Int'l. Expo. & Ann. Meeting, *Expanded Abstracts*, pp. 2383-2387.

Lazaratos, S. (2006), "Spectral Shaping Inversion for Elastic and Rock Property Estimation," *Research Disclosure*, Issue 511, pp. 1453-1459.

Moghaddam, P.P. et al. (2010), "Randomized full-waveform inversion: a dimenstionality-reduction approach," 80$^{th}$ SEG Ann. Meeting, *Expanded Abstracts*, pp. 977-982.

Ostmo, S. et al. (2002), "Finite-difference iterative migration by linearized waveform inversion in the frequency domain," SEG Int'l. Expo. & 72$^{nd}$ Ann. Meeting, 4 pgs.

Pica, A. et al. (2005), "3D Surface-Related Multiple Modeling, Principles and Results," 2005 SEG Ann. Meeting, *SEG Expanded Abstracts* 24, pp. 2080-2083.

Rawlinson, N. et al. (2008), "A dynamic objective function technique for generating multiple solution models in seismic tomography," *Geophys. J. Int.* 178, pp. 295-308.

Shen, P. et al. (2003), "Differential semblance velocity analysis by wave-equation migration," 734d Ann. Meeting of Society of Exploration Geophysicists, 4 pgs.

Shih, R-C. et al. (1996), "Iterative pre-stack depth migration with velocity analysis," *Terrestrial, Atmospheric & Oceanic Sciences* 7(2), pp. 149-158.

van Groenestijn, G.J.A. et al. (2009), "Estimating primaries by sparse inversion and application to near-offset reconstruction," *Geophyhsics* 74(3), pp. A23-A28.

Verschuur, D.J. et al. (1992), "Adaptive surface-related multiple elimination," *Geophysics* 57(9), pp. 1166-1177.

Verschuur, D.J. (1989), "Wavelet Estimation by Prestack Multiple Elimination," *SEG Expanded Abstracts* 8, pp. 1129-1132.

Wang, Y. (2007), "Multiple prediction through inversion: Theoretical advancements and real data application," *Geophysics* 72(2), pp. V33-V39.

Wang, K. et al. (2009), "Simultaneous full-waveform inversion for source wavelet and earth model," SEG Int'l. Expo. & Ann. Meeting, *Expanded Abstracts*, pp. 2537-2541.

Wu R-S. et al. (2006), "Directional illumination analysis using beamlet decomposition and propagation," *Geophysics* 71(4), pp. S147-S159.

Anderson, J.E. et al. (2008), "Sources Near the Free-Surface Boundary: Pitfalls for Elastic Finite-Difference Seismic Simulation and Multi-Grid Waveform Inversion," 70$^{th}$ EAGE Conf. & Exh., 4 pgs.

Dickens, T.A. et al. (2011), RTM angle gathers using Poynting vectors, *SEG Expanded Abstracts* 30, pp. 3109-3113.

Hu, L.Z. et al. (1987), "Wave-field transformations of vertical seismic profiles," *Geophysics* 52, pp. 307-321.

Liu, F. et al. (2007), "Reverse-time migration using one-way wavefield imaging condition," *SEG Expanded Abstracts* 26, pp. 2170-2174.

Mora, P. (1987), "Elastic Wavefield Inversion," PhD Thesis, Stanford University, pp. 22-25.

Mora, P. (1989), "Inversion = migration + tomography," *Geophysics* 64, pp. 888-901.

Pratt, R.G. et al. (1998), "Gauss-Newton and full Newton methods in frequency-space seismic waveform inversion," *Geophys. J. Int.* 133, pp. 341-362.

Sheng, J. et al. (2006), "Early arrival waveform tomography on near-surface refraction data," *Geophysics* 71, pp. U47-U57.

Simard, P.Y. et al. (1990), "Vector Field Restoration by the Method of Convex Projections," *Computer Vision, Graphics and Image Processing* 52, pp. 360-385.

Tang, Y. (2008), "Wave-equation Hessian by phase encoding," *SEG Expanded Abstracts* 27, pp. 2201-2205.

Tang, Y. (2009), "Target-oriented wave-equation least-squares migration/inversion with phase-encoded Hessian," *Geophysics* 74, pp. WCA95-WCA107.

Tang, Y. et al. (2010), "Preconditioning full waveform inversion with phase-encoded Hessian," *SEG Expanded Abstracts* 29, pp. 1034-1037.

Tsvankin, I. (2001), "Seismic Signatures and Analysis of Reflection Data in Anisotropic Media," Elsevier Science, p. 8.

Xia, J. et al. (2004), "Utilization of high-frequency Rayleigh waves in near-surface geophysics," *The Leading Edge*, pp. 753-759.

Xie, X. et al. (2002), "Extracting angle domain information from migrated wavefield," *SEG Expanded Abstracts* 21, pp. 1360-1363.

Xie, X.-B. et al. (2006), "Wave-equation-based seismic illumination analysis," *Geophysics* 71(5), pp. S169-S177.

Yoon, K. et al. (2004), "Challenges in reverse-time migration," *SEG Expanded Abstracts* 23, pp. 1057-1060.

*International Search Report and Written Opinion*, dated May 5, 2011, PCT/US2011/028350.

Abt, D.L. et al. (2010), "North American lithospheric discontinuity structured imaged by Ps and Sp receiver functions", *J. Geophys. Res.*, 24 pgs.

Akerberg, P., et al. (2008), "Simultaneous source separation by sparse radon transform," 78th Annual International Meeting, SEG, Expanded Abstracts, pp. 2801-2805.

Aki, K. et al. (1980), "Quantitative Seismology: Theory and Methods vol. I—Chapter 7—Surface Waves in a Vertically Heterogenous Medium," W.H. Freeman and Co., pp. 259-318.

Aki, K. et al. (1980), "Quantitative Seismology: Theory and Methods vol. I," W.H. Freeman and Co., p. 173.

Beasley, C. (2008), "A new look at marine simultaneous sources," *The Leading Edge* 27(7), pp. 914-917.

Beylkin, G. (1985), "Imaging of discontinuities in the inverse scattring problem by inversion of a causal generalized Radon transform," *J. Math. Phys.* 26, pp. 99-108.

Beaty, K.S. et al. (2003), "Repeatability of multimode Rayleigh-wave dispersion studies," *Geophysics* 68(3), pp. 782-790.

Beaty, K.S. et al. (2002), "Simulated annealing inversion of multimode Rayleigh wave dispersion waves for geological structure," *Geophys. J. Int.* 151, pp. 622-631.

Becquey, M. et al. (2002), "Pseudo-Random Coded Simultaneous Vibroseismics," SEG Int'l. Exposition and 72th Annl. Mtg., 4 pgs.

Berkhout, A.J. (1987), "Applied Seismic Wave Theory," Elsevier Science Publishers, p. 142.

Berkhout, A.J. (1992), "Areal shot record technology," *Journal of Seismic Exploration* 1, pp. 251-264.

Berkhout, A.J. (2008), "Changing the mindset in seismic data acquisition," *The Leading Edge* 27(7), pp. 924-938.

Ben-Hadj-Ali, H. et al. (2009), "Three-dimensional frequency-domain full waveform inversion with phase encoding," SEG Expanded abstracts, pp. 2288-2292.

Bonomi, E. et al. (2006), "Wavefield Migration plus Monte Carlo Imaging of 3D Prestack Seismic Data," *Geophysical Prospecting* 54, pp. 505-514.

Boonyasiriwat, C. et al. (2010), "3D Multisource Full-Waveform Inversion using Dynamic Random Phase Encoding," SEG Denver 2010 Annual Meeting, pp. 1044-1049.

(56) References Cited

OTHER PUBLICATIONS

Boonyasiriwat, C. et al. (2010), "3D Multi-source Least-squares Reverse Time Migration," SEG Denver 2010 Annual Meeting, pp. 3120-3124.

Bunks, C., et al. (1995), "Multiscale seismic waveform inversion," Geophysics 60, pp. 1457-1473.

Chavent, G. et al. (1999), "An optimal true-amplitude least-squares prestack depth-migration operator," Geophysics 64(2), pp. 508-515.

Clapp, R.G. (2009), "Reverse time migration with random boundaries," SEG International Exposition and Meeting, Expanded Abstracts, pp. 2809-2813.

Dziewonski A. et al. (1981), "Preliminary Reference Earth Model," Phys. Earth Planet. Int. 25(4), pp. 297-356.

Ernst, F.E. et al. (2000), "Tomography of dispersive media," J. Acoust. Soc. Am 108(1), pp. 105-116.

Ernst, F.E. et al. (2002), "Removal of scattered guided waves from seismic data," Geophysics 67(4), pp. 1240-1248.

Esmersoy, C. (1990), "Inversion of P and SV waves from multicomponent offset vertical seismic profiles," Geophysics 55(1), pp. 39-50.

Fallat, M.R. et al. (1999), "Geoacoustic inversion via local, global, and hybrid algorithms," Journal of the Acoustical Society of America 105, pp. 3219-3230.

Fichtner, A. et al. (2006), "The adjoint method in seismology I. Theory," Physics of the Earth and Planetary Interiors 157, pp. 86-104.

Forbriger, T. (2003), "Inversion of shallow-seismic wavefields: I. Wavefield transformation," Geophys. J. Int. 153, pp. 719-734.

Gibson, B. et al. (1984), "Predictive deconvolution and the zero-phase source," Geophysics 49(4), pp. 379-397.

Griewank, A. (1992), "Achieving logarithmic growth of temporal and spatial complexity in reverse automatic differentiation," 1 Optimization Methods and Software, pp. 35-54.

Griewank, A. (2000), "Evaluating Derivatives: Principles and Techniques of Algorithmic Differentiation," Society for Industrial and Applied Mathematics, pp. 121-167.

Griewank, A. et al. (2000), "Algorithm 799: An implementation of checkpointing for the reverse or adjoint mode of computational differentiation," 26 ACM Transactions on Mathematical Software, pp. 19-45.

Griewank, A. et al. (1996), "Algorithm 755: A package for the automatic differentiation of algorithms written in C/C++," ACM Transactions on Mathematical Software 22(2), pp. 130-167.

Haber, E. et al. (2010), "An effective method for parameter estimation with PDE constraints with multiple right hand sides," Preprint—UBC http://www.math.ubc.ca/~haber/pubs/PdeOptStochV5.pdf.

Herrmann, F.J. (2010), "Randomized dimensionality reduction for full-waveform inversion," EAGE abstract G001, EAGE Barcelona meeting, 5 pgs.

Holschneider, J. et al. (2005), "Characterization of dispersive surface waves using continuous wavelet transforms," Geophys. J. Int. 163, pp. 463-478.

Ikelle, L.T. (2007), "Coding and decoding: Seismic data modeling, acquisition, and processing," 77th Annual Int'l. Meeting, SEG Expanded Abstracts, pp. 66-70.

Jackson, D.R. et al. (1991), "Phase conjugation in underwater acoustics," J. Acoust. Soc. Am. 89(1), pp. 171-181.

Jing, X. et al. (2000), "Encoding multiple shot gathers in prestack migration," SEG International Exposition and 70$^{th}$ Annual Meeting Expanded Abstracts, pp. 786-789.

Kennett, B.L.N. (1991), "The removal of free surface interactions from three-component seismograms," Geophys. J. Int. 104, pp. 153-163.

Krebs, J.R. (2008), "Full-wavefield seismic inversion using encoded sources," Geophysics 74(6), pp. WCC177-WCC188.

Krohn, C.E. (1984), "Geophone ground coupling," Geophysics 49(6), pp. 722-731.

Kroode, F.T. et al. (2009), "Wave Equation Based Model Building and Imaging in Complex Settings," OTC 20215, 2009 Offshore Technology Conf., Houston, TX, May 4-7, 2009, 8 pgs.

Kulesh, M. et al. (2008), "Modeling of Wave Dispersion Using Continuous Wavelet Transforms II: Wavelet-based Frequency-velocity Analysis," Pure Applied Geophysics 165, pp. 255-270.

Lecomte, I. (2008), "Resolution and illumination analyses in PSDM: A ray-based approach," The Leading Edge, pp. 650-663.

Levanon, N. (1988), "Radar Principles," Chpt. 1, John Whiley & Sons, New York, pp. 1-18.

Liao, Q. et al. (1995), "2.5D full-wavefield viscoacoustic inversion," Geophysical Prospecting 43, pp. 1043-1059.

Marcinkovich, C. et al. (2003), "On the implementation of perfectly matched layers in a three-dimensional fourth-order velocity-stress finite difference scheme," J. of Geophysical Research 108(B5), 2276.

Baumstein, A. et al. (2009), "Scaling of the Objective Function Gradient for Full Wavefield Inversion," SEG Houston 2009 Int'l. Expo. & Annual Meeting, pp. 2243-2247.

Burstedde, C. et al. (2009), "Algorithmic strategies for full waveform inversion: 1D experiments," Geophysics 74(6), pp. WCC37-WCC46.

Lee, S. et al. (2010), "Subsurface parameter estimation in full wavefield inversion and reverse time migration," SEG Denver 2010 Annual Meeting, pp. 1065-1069.

Malmedy, W. et al. (2009), "Approximating Hessians in unconstrained optimization arising from discretized problems," Computational Optimization and Applications, pp. 1-16.

Martin, G.S. et al. (2006), "Marmousi2: An elastic upgrade for Marmousi," The Leading Edge, pp. 156-166.

Nocedal, J. et al. (2006), "Numerical Optimization, Chapt. 7—Large-Scale Unconstrained Optimization," Springer, New York, 2$^{nd}$ Edition, pp. 165-176.

Sheen, D-H. et al. (2006), "Time domain Gauss-Newton seismic waveform inversion in elastic media," Geophysics J. Int. 167, pp. 1373-1384.

Tarantola, A. (1986), "A strategy for nonlinear elastic inversion of seismic reflection data," Geophysics 51(10), pp. 1893-1903.

Tarantola, A. (2005), "Inverse Problem Theory and Methods for Model Parameter Estimation," SIAM, p. 79.

Anderson, J.E. et al. (2012), "Time-reversal checkpointing methods for RTM and FWI," Geophysics 77(4), pp. S93-S103.

Yilmaz, O. (1987), "Seismic Data Processing," Society of Exploration Geophysicists, pp. 17-19.

\* cited by examiner

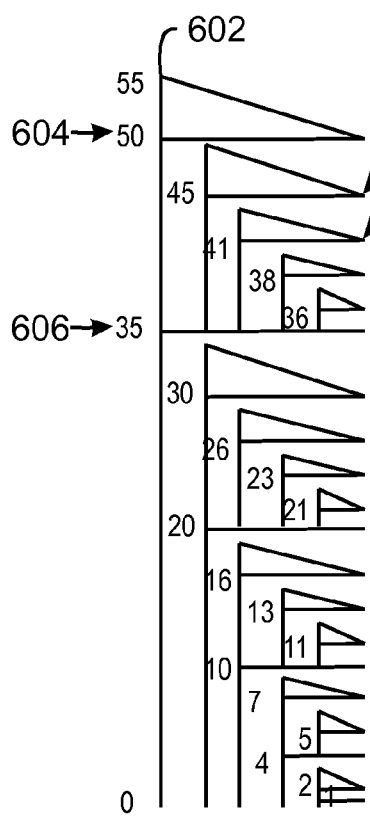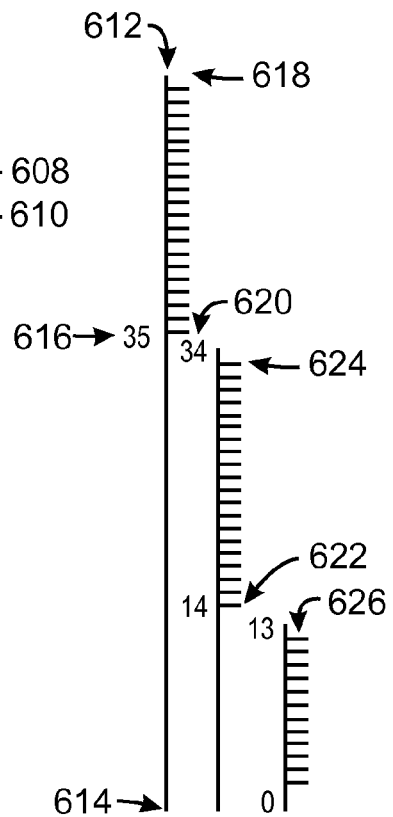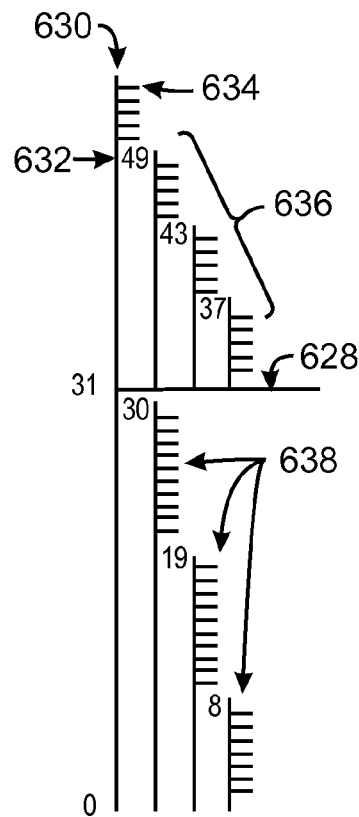
*FIG. 6A*  *FIG. 6B*  *FIG. 6C*

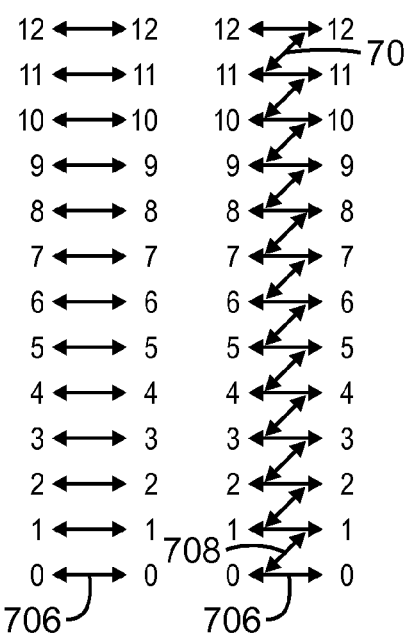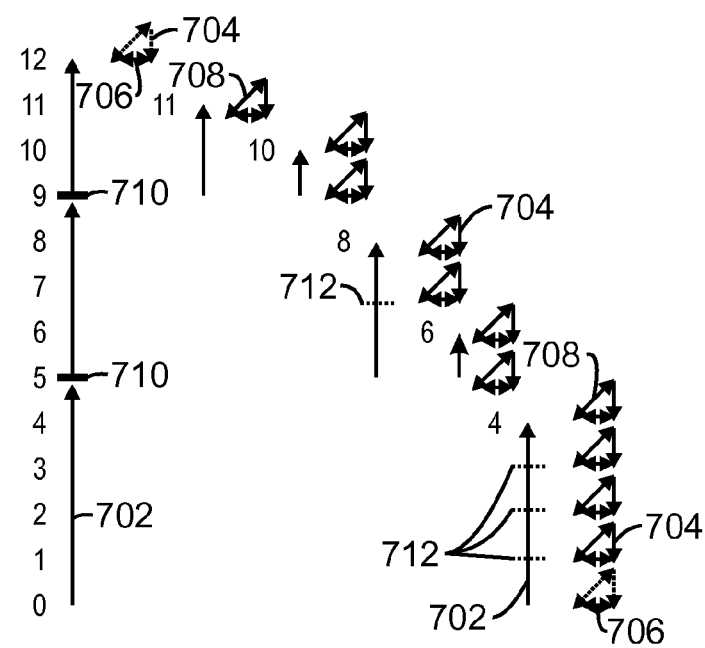
FIG. 7A   FIG. 7B          FIG. 7C

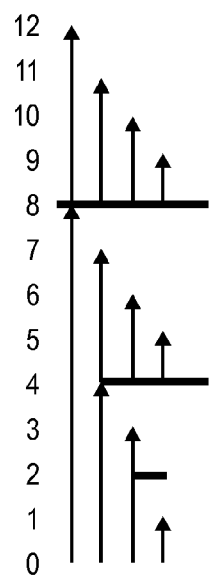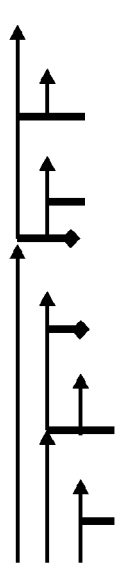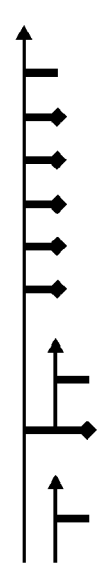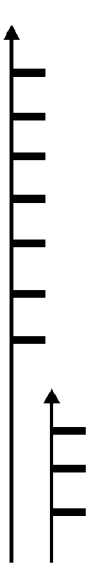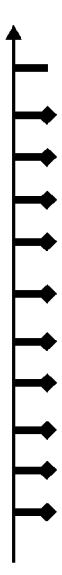
*FIG. 8A*   *FIG. 8B*   *FIG. 8C*   *FIG. 8D*   *FIG. 8E*

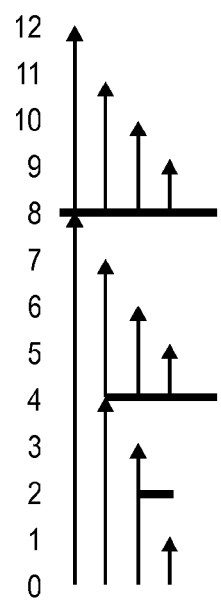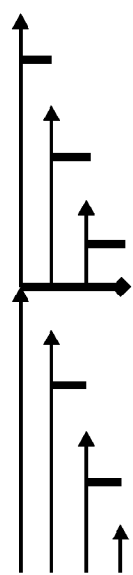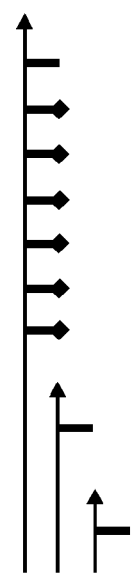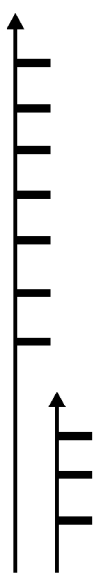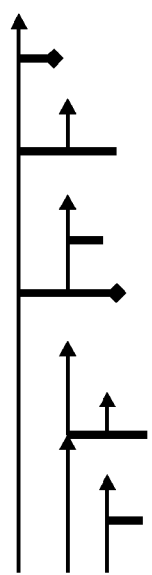
*FIG. 9A*  *FIG. 9B*  *FIG. 9C*  *FIG. 9D*  *FIG. 9E*

METHOD AND SYSTEM FOR CHECKPOINTING DURING SIMULATIONS

CROSS-REFERENCE TO RELATED APPLICATION

This application claims the benefit of U.S. Provisional Patent Application 61/346,298, filed May 19, 2010, entitled METHOD AND SYSTEM FOR CHECKPOINTING DURING SIMULATIONS, the entirety of which is incorporated by reference herein.

FIELD OF THE INVENTION

The invention relates generally to the field of geophysical prospecting, and more particularly to seismic data processing. Specifically, the invention relates to a method and system for storing checkpoints to improve the efficiency of computer simulations that access simulation data in reverse time order, such as in migration of seismic data.

BACKGROUND OF THE INVENTION

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

Many parameter estimation, inversion and imaging methods compute a forward simulation applying a sequence of steps extrapolating forward in time from an initial state. The associated inverse or imaging method applies an adjoint operator stepping backwards in time from a final time state. The method may then generate information about the system by cross correlating the forward simulation with the adjoint simulation at the same time steps. The information generated may then be used to improve the simulation parameters used to fit the available data, as well for other purposes. As an example, the information may be used to generate a gradient or a Hessian relating changes in an objective function to changes in the simulation parameters. In another example, the information may be used to create an image as done in Reverse Time Depth Migration (RTM).

These techniques require the forward-in-time simulation to be accessed in reverse time order for the cross-correlation computations. However, the size of the information needed to save the forward simulation for all time steps often exceeds the available memory storage.

For example, pre-stack Reverse Time depth Migration (RTM) is commonly used to image subsurface earth structures when doing hydrocarbon exploration with seismic data. During RTM, the receiver wavefield recorded in a seismic experiment is propagated backwards in time and cross-correlated with the forward-in-time simulation of the source wavefield. The means that the forward-in-time source simulation must be accessed in reversed time order. The straightforward approach would be to compute and save all time steps of the forward-propagated source wavefield at all subsurface locations. This can be impractical due to the huge data volumes involved. As an example, for a standard test project, the Society of Exploration Geophysicists (SEG) Advanced Modeling (SEAM) project, this could mean keeping 40,000 time steps of an 84-gigabyte subsurface volume for a total of about 3.36 petabytes of data. Not only is the amount of storage required problematic, but the access times required to move that amount of data may also be problematic.

To decrease the storage needed, a forward simulation wavefield state, termed herein a full state checkpoint, may be defined as including all the information needed to either perform a cross-correlation or to restart a forward simulation from a given time step. Full state checkpoints can then be saved at a smaller number of carefully chosen time steps so that the forward simulation can be restarted from the saved checkpoints and propagated to desired time steps. (The term checkpoint may also be used to refer to the aforementioned carefully chosen time steps, as contrasted with data saved at such time steps.) Thus, the forward simulation can be recomputed at time steps in reverse time order as needed starting from the saved checkpoints. The checkpoint memory is reused for new checkpoints whenever it is no longer needed. The trade-off is performing more computation to minimize the input/output and storage requirements. This technique may be useful whenever the data sizes involved are much larger than the memory storage available.

Griewank and Walther proposed an "optimal" way to choose which time steps should be checkpointed given that a specified amount of memory is available in which to save the checkpointed forward simulation wavefield states. See, e.g., Griewank, A., "Achieving logarithmic growth of temporal and spatial complexity in reverse automatic differentiation," 1 Optimization Methods and Software 35-54 (1992); Griewank, A., Evaluating Derivatives: Principles and Techniques of Algorithmic Differentiation, Society for Industrial and Applied Mathematics (Philadelphia, Pa., 2000); Griewank, A. and A. Walther, "Algorithm 799: An implementation of checkpointing for the reverse or adjoint mode of computational differentiation," 26 ACM Transactions on Mathematical Software 19-45 (2000).

In the SEAM example, it may be assumed that there are 40,000 time steps in the forward simulation. Using storage or memory to save 100-source wavefield state buffer checkpoints at any one time, the forward simulation can be accessed in reverse order using 114,747 forward simulation time steps, using the Griewank checkpointing scheme. Thus, a factor of roughly 400 in storage space is saved at an expense of doing 2.87 times as much computation for the forward simulation. For the RTM application, re-computing time steps for the forward simulation from checkpoints can often be faster than doing the input/output required to access the stored forward simulation time steps, even if sufficient disk space is available to store all of the forward simulation time steps in the case of slow disk and fast computation.

Symes applied Griewank optimal checkpointing as an effective implementation strategy for reverse time migration. Symes, W. W., 2007, Reverse time migration with optimal checkpointing, 72 Geophysics (No. 5), P.SM213-SM221. The checkpointing method may be particularly important for RTM that includes the physics of wavefield attenuation (e.g., imaging using both P-waves and S-waves), as the time reversal strategy of forward simulation using wavefield checkpointing is always stable. In comparison, an alternative RTM implementation strategy of saving boundary values and the final wavefield state and doing reverse time extrapolation of the source wavefield simulation can be unstable. Further, the instability in this technique makes it an inappropriate application strategy when attenuation is included as part of the physics in the forward simulation.

The checkpointing method for doing time reversal of a forward simulation has much more general application than just for RTM. Applications are quite general and associated with any time-stepping forward simulator. These include reservoir simulators, fluid flow, heat transfer, geologic basin modeling, as well as seismic full wavefield inversion (FWI). See, e.g., Tarantola, A., 1984, Inversion of seismic reflection data in the acoustic approximation: 49 Geophysics 1259-1266; Tarantola, A., Inverse Problem Theory: Method for Data Fitting and Model Parameter Estimation, Elsevier 125-133, 144-258 (1987); Plessix, R. E., "A review of the adjoint-state method for computing the gradient of a functional with geophysical applications," 167 Geophysical Journal International 495-503 (2006). Krebs, J. R., J. E. Anderson, D. Hinkley, R. Neelamani, S. Lee, A. Baumstein, M. D. Lacasse, "Fast Full-Wavefield Seismic Inversion Using Encoded Sources," 74 Geophysics P.WCC177-WCC188 (2009). The techniques may also apply to methods of automatic differentiation. See, e.g., Griewank, A., Juedes, D., and Srinivasan, "ADOL-C, a package for the automatic differentiation of algorithms written in C/C++," Preprint MCS-180-1190, Mathematics and Computer Science Division, Argonne National Laboratory, Argonne, Ill. (1990); Griewank, A., Evaluating Derivatives: Principles and Techniques of Algorithmic Differentiation, Society for Industrial and Applied Mathematics (Philadelphia, Pa., 2000).

SUMMARY OF THE INVENTION

An exemplary embodiment of the present techniques provides a method for lowering a computational cost of a computer simulation. The method includes performing a checkpointing strategy, wherein the checkpointing strategy includes storing a correlation checkpoint (sometimes called a "correlation buffer" herein) at a time step, wherein the correlation checkpoint comprises data used to correlate a forward propagated value generated by the computer simulation, and wherein the computer simulation cannot be restarted from the values stored in the correlation checkpoint. The checkpointing strategy also includes allocating a storage space for the correlation checkpoint, and running the computer simulation at each of a plurality of time steps. At each of the plurality of time steps a backwards propagated value from measured data is correlated to the forward propagated value from the computer simulation. The forward propagated value is stored in the correlation checkpoint.

The method may also include storing a full state checkpoint, and restarting the simulation from the full state checkpoint. Further, the method may include determining an optimum location for storing a checkpoint, wherein the optimum location is storage space allocated in a graphics processor unit (GPU) memory, a random access memory (RAM), a RAM disk, a disk drive, or any combinations thereof The determination of the optimum location is based, at least in part, on the access speed of the storage space. The storage space used for the correlation checkpoint may be less than a storage space used for a full state checkpoint. Optimizing the checkpointing strategy may include determining a computing cost associated with storing the correlation checkpoint. The computing cost may be minimized based, at least in part, on an access speed for each of a plurality of storage units and the ratio in a storage space required for a full state checkpoint to a storage space required for the correlation checkpoint. A table that includes the time steps and a type of checkpoint to be stored at each of the time steps may be generated.

Determining the computing cost may include computing a maximum number of correlation checkpoints that can be stored in a fast storage unit, and computing a maximum number of correlation checkpoints that can be stored in a slow storage unit. If any correlation checkpoints can be stored in fast storage, compute an optimal number of sweeps if only using fast storage and add to a list. A minimum number of sweeps if only using fast storage can be computed and added to the list. If any correlation checkpoints can be stored in slow storage a minimum number of sweeps if using all types of storage can be computed and added to the list. An optimal number of sweeps if using all of the fast storage and storing at least one correlation checkpoint in slow storage can be computed and added to list if less than the last value on the list. An integer value nearest to each value on the list can be added to the list. The cost for each value on the list can be computed and a minimum cost can be returned.

The method may include generating an image of a subsurface region from seismic data. The method may also include history matching reservoir data to a reservoir simulation.

Another exemplary embodiment provides a method for comparing collected data to simulated data. The method includes backwards propagating the collected data across a grid and running a computer simulation to generate forward propagated data across the grid. A number of correlation buffers can be stored during the computer simulation, wherein the simulation cannot be restarted from any of correlation buffers. The data stored in the correlation buffers may be compared to the backwards propagated data at each point in the grid.

The method may include storing a full state checkpoint (also called a "full state buffer" herein) during the simulation, wherein the simulation can be restarted from the full state checkpoint. The method may also include calculating a cost for storing a full state checkpoint, and determining a time step for storing a full state checkpoint based, at least in part, on the cost. The forward propagated data may be correlated to backwards-propagated data in a next time step.

The method may include storing a plurality of correlation checkpoints in a fast storage medium and storing at least one correlation checkpoint in a slow storage medium. Further, the method may include storing at least one full state checkpoint, wherein the simulation can be restarted from the full state checkpoint. The method may include storing the at least one full state checkpoint in a fast storage medium.

Another exemplary embodiment of the present techniques provides a system for correlating simulated data to collected data. The system includes a processor and a storage system, wherein the storage system includes data structures that represent measured data and a propagation algorithm configured to propagate the measured data backwards in time across a grid. The storage system also includes a computer simulation configured to generate forward-in-time simulated data across the grid. The system further includes a memory, wherein the memory includes code to direct the processor to propagate the measured data backwards-in-time across the grid, populate the grid with forward-in-time simulated data from the computer simulation, store a correlation checkpoint at a time step during the computer simulation, and correlate the backwards propagated data to the simulated data stored in the correlation checkpoint.

The processor may include a single core, a multiple core, a graphics-processing unit, or any combinations thereof The correlation checkpoint may be stored in the memory. The memory may include a random access memory (RAM), a RAM disk, a graphics processing unit memory, or any combinations thereof The memory may include code configured to store a full state checkpoint at a time step, wherein the computer simulation can be restarted from the full state checkpoint.

Another exemplary embodiment of the present techniques provides a method for migrating seismic data to generate seismic images. The method includes propagating measured seismic data backwards in time across a seismic grid, propagating simulated excitation pulses forwards in time across the seismic grid, and storing at least one correlation checkpoint, wherein the correlation checkpoint comprises only simulated excitation pulses used for a cross-correlation of interest. The intensity of the measured seismic data is cross-correlated with the simulated excitation pulses at each point in the seismic grid using the data from the correlation checkpoint.

The method may include storing at least one full state checkpoint at a time step, wherein the at least one full state checkpoint comprises all data needed to restart the propagation from the time step. The propagation of the simulated excitation pulses forwards in time may be performed using a full two-way, wave equation. The propagation of the simulated excitation pulses forwards in time may be performed using based on Kirchhoff, Beam or one-way wave equation migration techniques.

BRIEF DESCRIPTION OF THE DRAWINGS

The advantages of the present techniques are better understood by referring to the following detailed description and the attached drawings, in which:

FIGS. 6A-C are diagrams useful in illustrating the operation of the Griewank and optimal checkpointing schemes for a simplified simulation having 55 time steps, in accordance with exemplary embodiments of the present techniques;

FIGS. 7A-C are diagrams that compare checkpointing for standard correlations versus checkpointing when a past state in adjoint computation influences cross-correlation with a current state in forward computation, in accordance with exemplary embodiments of the present techniques;

FIGS. 8A-E are diagrams useful in illustrating a number of situations in which the amount of fast and slow memory is varied, while the storage space required by each type of checkpoint is assumed to be the same, in accordance with exemplary embodiments of the present techniques;

FIGS. 9A-E are diagrams useful in illustrating a number of situations in which the amount of fast and slow memory is varied, wherein the storage space required for a correlation checkpoint is two and a full state checkpoint is three, in accordance with exemplary embodiments of the present techniques;

DETAILED DESCRIPTION OF EXAMPLE EMBODIMENTS

Figure 1:
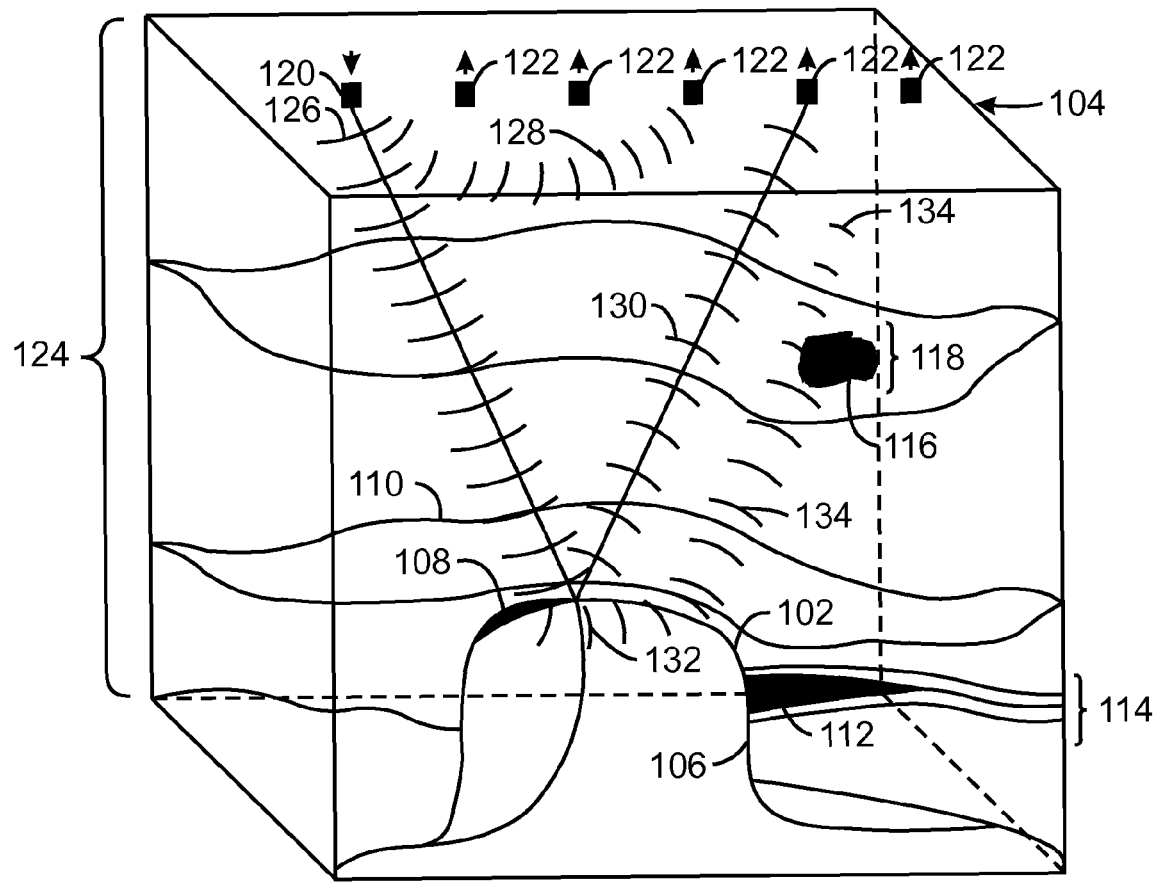
FIG. 1 is a diagram of a region of interest, illustrating a single seismic experiment in a land environment, in accordance with an exemplary embodiment of the present techniques.

In the following detailed description section, the specific embodiments of the present techniques are described in connection with example embodiments. However, to the extent that the following description is specific to a particular embodiment or a particular use of the present techniques, this is intended to be for exemplary purposes only and simply provides a description of the exemplary embodiments. Accordingly, the present techniques are not limited to the specific embodiments described below, but rather, such techniques include all alternatives, modifications, and equivalents falling within the true spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

"Algorithm" carries its normal meaning and refers without limitation to any series of repeatable steps that result in a discrete "Value." For example, an algorithm may include any mathematical, statistical, positional and/or relational calculation between any numbers of user-specified, preset, automatically-determined, and/or industry- or system-acceptable data elements. In several embodiments, various algorithms may be performed on subject data elements in relation to a previously defined data evaluation sample in order to produce a single, meaningful data value.

"Computer-readable medium" or "Non-transitory, computer-readable medium" as used herein refers to any non-transitory storage and/or transmission medium that participates in providing instructions to a processor for execution. Such a medium may include, but is not limited to, non-volatile media and volatile media. Non-volatile media includes, for example, NVRAM, or magnetic or optical disks. Volatile media includes dynamic memory, such as main memory. Common forms of computer-readable media include, for example, a floppy disk, a flexible disk, a hard disk, an array of hard disks, a magnetic tape, or any other magnetic medium, magneto-optical medium, a CD-ROM, a holographic medium, any other optical medium, a RAM, a PROM, and EPROM, a FLASH-EPROM, a solid state medium like a memory card, any other memory chip or cartridge, or any other tangible medium from which a computer can read data or instructions.

As used herein, a "Coordinate system" is a rectangular (Cartesian) coordinate domain with spatial coordinates (x, y, z) and time coordinate t. Seismic data is typically collected and stored in a coordinate system. The spatial coordinates x and y may represent orthogonal horizontal coordinate directions, such as the in-line and cross-line directions of the survey in which the data are acquired. The spatial coordinate z usually represents the vertical coordinate direction, such as depth measured positive downward.

"Cross-correlation" is a process that measures how much two time series of numbers resemble each other. The cross-correlation may be linear or non-linear, may consider aspects of mutual information (such as those based on entropy), or may be performed by any other technique deemed useful to a user. As used herein, a cross-correlation between an excitation pulse projected forward in time and a seismic trace projected back in time is used to migrate the received energy to a reflection point in the subsurface, identifying the location (see migration).

As used herein, "to display" or "displaying" includes a direct act that causes displaying of a graphical representation of a physical object, as well as any indirect act that facilitates displaying a graphical representation of a physical object. Indirect acts include providing a website through which a user is enabled to affect a display, hyperlinking to such a website, or cooperating or collaborating with an entity who performs such direct or indirect acts. Thus, a first party may operate alone or in cooperation with a third party vendor to enable the information to be generated on a display device. The display device may include any device suitable for displaying the reference image, such as without limitation a virtual reality display, a 3-d display, a CRT monitor, a LCD monitor, a plasma device, a flat panel device, a printer, a plotter, or any other type of output device. The display device may include a device, which has been calibrated with any conventional software intended to be used in evaluating, correcting, and/or improving display results.

"Exemplary" is used exclusively herein to mean "serving as an example, instance, or illustration." Any embodiment described herein as "exemplary" is not to be construed as preferred or advantageous over other embodiments.

"Formation" refers to a body of rock or other subsurface solids that is sufficiently distinctive and continuous that it can be mapped, for example, by seismic techniques. A formation can be a body of rock of predominantly one type or a combination of types. A formation can contain one or more hydrocarbon-bearing zones. Note that the terms formation, reservoir, and interval may be used interchangeably, but will generally be used to denote progressively smaller subsurface regions, zones or volumes. More specifically, a formation will generally be the largest subsurface region, a reservoir will generally be a region within the formation and will generally be a hydrocarbon-bearing zone (a formation, reservoir, or interval having oil, gas, heavy oil, and any combination thereof), and an interval will generally refer to a sub-region or portion of a reservoir. A hydrocarbon-bearing zone can be separated from other hydrocarbon-bearing zones by zones of lower permeability such as mudstones, shales, or shale-like (highly compacted) sands. In one or more embodiments, a hydrocarbon-bearing zone includes heavy oil in addition to sand, clay, or other porous solids.

"Geophone" refers to active elements, which are sensitive to seismic signals and a supporting body (or structure) which holds the active elements. Active elements typically comprise piezoelectric elements, but may also include optical elements, micro-machined electro-mechanical sensor elements, and the like.

"Hydrocarbons" are generally defined as molecules formed primarily of carbon and hydrogen atoms such as oil and natural gas. Hydrocarbons may also include other elements, such as, but not limited to, halogens, metallic elements, nitrogen, oxygen and/or sulfur. Hydrocarbons may be produced from hydrocarbon reservoirs through wells penetrating a hydrocarbon containing formation. Hydrocarbons derived from a hydrocarbon reservoir may include, but are not limited to, kerogen, bitumen, pyrobitumen, asphaltenes, oils or combinations thereof. Hydrocarbons may be located within or adjacent to mineral matrices within the earth. Matrices may include, but are not limited to, sedimentary rock, sands, silicilytes, carbonates, diatomites and other porous media.

"Hydrophone" refers to active elements that are sensitive to pressure (sound) waves in a marine environment. The hydrophone also includes a supporting body (or structure) which holds the active elements. Active elements typically comprise piezoelectric elements, but may also include other sound detecting elements.

"Impedance" is the product of seismic velocity and the density. Impedance typically varies among different rock layers, e.g., opposing sides of an interface have different impedances. Two types of impedance terms are generally defined, $I_p$ and $L_s$ wherein $I_p$ is P-wave impedance, also called acoustic impedance, and $L_s$ is S-wave impedance, also called shear impedance. The reflection coefficient of an interface generally depends on the contrast in these impedances and density of the rock on either side of the interface. Specifically, the contrast in these properties of geological layers affects the reflection coefficient at the boundary separating the two layers. One geophysical process for determining the impedance and/or the density structure of a subsurface region based on recorded seismic reflection data is seismic inversion.

"Inversion" or "Seismic inversion" is a process by which one attempts to find a model of subsurface properties that reproduces a measured seismic response within a tolerance and satisfies geological and geophysical constraints. There are a large number of well-known methods of seismic inversion. These well-known methods fall into one of two categories, iterative inversion and non-iterative inversion. Non-iterative inversion is accomplished by assuming some simple background model and updating the model based on the input data. In comparison, iterative inversion uses the updated model as input to another step of inversion. (See Migration).

"Kirchhoff migration" is an inverse backscattering method of inversion that relies on the statistical constructive interference of signal and the destructive interference of noise. It is a two-step operation that first upward projects or ray-traces from every depth point to the surface and builds a travel timetable of potential ray paths to surface locations. It then sums the samples for every surrounding trace at a time based on their source and receiver locations as defined by the travel timetable. Kirchhoff migration may be based on a one-way wave equation, and may be less accurate than a full two-way wave equation method, such as Reverse Time Migration (RTM), discussed herein.

"Marine environment" refers to any offshore location. The offshore location may be in shallow waters or in deep waters. The marine environment may be an ocean body, a bay, a large lake, an estuary, a sea, or a channel.

"Migration" is typically performed during the data processing stage of seismic imaging in order to accurately position the subsurface seismic reflectors. The need for seismic migration arises because variable seismic velocities and dipping reflectors cause seismic reflections in unmigrated seismic images to appear at incorrect locations. Seismic migration is an inversion operation in which the seismic reflections are moved or "migrated" to their true subsurface positions. There are many different seismic migration techniques. Some of these migration techniques are applied after common-midpoint (CMP) stacking of the data traces. As is known in the art, CMP stacking is a data processing procedure in which a number of seismic data traces having the same source-receiver midpoint but different offsets are summed to form a stacked data trace that simulates a zero-offset data trace for the midpoint in question. Such "poststack" migration can be done, for example, by integration along diffraction curves (known as "Kirchhoff" migration), by numerical finite difference or phase-shift downward-continuation of the wavefield, or by equivalent operations in frequency-wavenumber or other domains.

Other seismic migration techniques can be applied before stacking of the seismic data traces. These "prestack" migration techniques are applied to the individual nonzero-offset data traces and the migrated results are then stacked to form the final image. Prestack migration typically produces better images than poststack migration. However, prestack migration is generally much more expensive (i.e., computationally demanding) than poststack migration. Accordingly, the use of prestack migration has typically been limited to situations where poststack migration does not provide an acceptable result, e.g., where the reflectors are steeply dipping. In some cases, reflector dip can exceed 90 degrees. As is well known in the seismic prospecting art, it may be possible to image these "overturned" reflectors using data from seismic "turning rays."

There are two general types of prestack migration, prestack time migration and prestack depth migration. A background seismic wave-propagation velocity model to describe the seismic wave propagation velocity in the subsurface is needed in the seismic imaging. In a region where the subsurface seismic wave velocity varies only in the vertical direction, the seismic imaging method used is prestack time migration (PSTM). In a region where the subsurface seismic wave propagation velocity varies in both vertical and lateral (or horizontal) direction, prestack depth migration (PSDM), needs to be used to give accurate results.

A "mode-converted seismic wave" is a reflected P-wave or S-wave that has a different mode from the source seismic wave. Seismic waves have two modes. In a first mode, the seismic wave is a P-wave (or compression wave) that extends in the direction of propagation of the seismic wave. In a second mode, the seismic wave is an S-wave (or shear wave) oriented generally perpendicular to the direction of propagation of the seismic wave. A source seismic wave produced by a seismic source (e.g., an explosive, an air gun, etc.) is directed into a subterranean structure, which can have a subsurface reflector (e.g., an interface to a layer of hydrocarbons, a layer of water, or another layer of interest). The seismic wave is reflected from the subsurface reflector, where the reflected seismic wave can be measured by a seismic sensor (or plural seismic sensors) (e.g., geophones or other seismic sensors). In many cases, mode conversion can occur upon reflection from the subsurface reflector. For example, a source P-wave can be reflected as an S-wave, or alternatively, a source S-wave can be reflected as a P-wave. A reflected seismic wave that has a mode different from the mode of the source seismic wave is referred to as a mode-converted seismic wave. A seismic surveying technique according to some embodiments estimates absorption parameters for mode-converted seismic waves, which allows the seismic surveying technique to take into account absorption effects associated with mode-converted seismic waves. Considering absorption effects of reflected mode-converted seismic waves, as well as absorption effects of reflected pure (or single-mode) seismic waves, allows the seismic surveying technique to be more accurate than conventional surveying techniques (which typically just compute pure wave absorption parameters).

"Multicomponent survey" refers to seismic surveys that use multi-component receivers that record two or more components of the seismic energy incident on the receiver. For example, a 3-component (3-C) seismic receiver contains three orthogonal geophones and so can record the x-, y- and z-components of the particle motion at the receiver (the particle motion may be the particle displacement, particle velocity or particle acceleration or even, in principle, a higher derivative of the particle displacement). In a marine seismic survey, a 4-component (4-C) seismic receiver can alternatively be used. A 4-C receiver contains a pressure sensor such as a hydrophone in addition to three orthogonal sensors and so can record the pressure of the water column (which is a scalar quantity) in addition to the x-, y- and z-components of the particle motion.

A "one-way wave equation" is an evolution equation in one of the space directions that approximately describes the downward or upward propagation of a wavefield, but not both simultaneously. Similar equations exist to relate various types of electromagnetic data.

As used herein, the terms "optimal," "optimizing," "optimize," "optimality," and "optimization" (as well as linguistically related words and phrases) are not intended to be limiting in the sense of requiring the present invention to find the best solution or to make the best decision. Although a mathematically optimal solution may in fact arrive at the best of all mathematically available possibilities, real-world embodiments of optimization routines, methods, models, and processes may work towards such a goal without ever actually achieving perfection. Accordingly, one of ordinary skill in the art having benefit of the present disclosure will appreciate that these terms, in the context of the scope of the present invention, are more general. The terms can describe working towards a solution, which may be the best available solution, a preferred solution, or a solution that offers a specific benefit within a range of constraints. Further, the terms may refer to improving or refining a current solution. The terms may also refer to searching for a high point or a maximum for an objective function or processing to reduce a penalty function.

"Pixel" means the smallest addressable point in the image or simulation grid. For example, in seismic imaging, one computation cell in a seismic grid may represent a pixel in the image data.

"Poststack" refers to processing after individual sensor recordings have been summed or stacked. Poststack attributes include, for example, reflection intensity, instantaneous frequency, reflection heterogeneity, acoustic impedance, velocity, dip, depth and azimuth.

"PP" and "PS" represent mode conversion events that take place during seismic surveys. Acoustic energy emitted by the seismic source may predominantly be a pressure-wave (or P-wave). When the acoustic energy undergoes reflection an interface, it may also undergo a partial mode conversion to a shear wave (S-wave). As a result, the seismic wavefield acquired at the receivers may therefore contain both P-waves and S-waves.

Events arising from arrival of P-waves may be referred to as PP events, since they involve acoustic energy that is both emitted as a P-wave and recorded at the receiver as a P-wave. Events arising from arrival of S-waves may be referred to as PS events, since they involve acoustic energy that is emitted as a P-wave but underwent a mode conversion to an S-wave upon reflection and is therefore recorded on the receiver as an S-wave. PP events occur more prominently in vertical components of the acquired seismic data, whereas PS events appear more prominently in the horizontal components of the acquired seismic data.

"P-wave" and "S-wave" are types of seismic waves that occur in the subsurface. P waves are longitudinal compression waves that propagate with particle motion perpendicular to the wavefronts as alternate compression and rarefaction waves. P-wave receivers are responsive to vertical particle motion with respect to the surface of the earth. S-waves or shear waves are polarized parallel to the wavefronts and are classified as $S^H$ waves and as $S^V$ waves for isotopic media. In the context of this disclosure, for $S^H$ waves, particle motion is horizontal in a plane that is transverse with respect to the line of profile. The particle motion for $S^V$ waves is in a vertical plane that is perpendicular to the $S^H$ particle motion and parallel to the line of profile. Shear waves cannot propagate in a fluid because fluids have no shear strength. Some media are birefringent to S-waves because of being anisotropic. That is, the acoustic energy splits into ordinary and an extraordinary ray paths characterized by different propagation velocities as fast ($S^f$) and slow ($S^s$) waves) during transit through a medium and with different polarization directions than pure $S^H$ or $S^V$ waves.

P-wave exploration comprises the workhorse of seismic surveys. However, special studies, for example, using the techniques described herein, may allow for additional exploration of the anisotropic characteristics of selected rock formations due to stress and fracturing. These studies may be performed by combining S-wave and P-wave technology in a single survey.

"Receivers" are devices, usually placed in an array or grid-like pattern on the surface of the Earth or just beneath, used to detect reflections of vibrations from rock strata. Measurement of the amplitude and arrival time of an arriving reflected wave at numerous locations allows the mapping of rock strata, and provides information about the thickness and composition of the rock strata (e.g., layers). The receivers may include geophones, hydrophones, vibration detectors, accelerometers, or any other detector capable of accurately measuring the amplitudes of reflected waves. A three-dimensional receiver may, for example, have accelerometers along each of the x, y, and z-axes to determine motion in all three directions. A four dimensional receiver may combine a three-dimensional receiver with an amplitude detector, such as a hydrophone, to determine the intensity of a P-wave. Either three-dimensional or four-dimensional receivers may be used to detect both P-waves and S-waves propagated from the subsurface.

A "reservoir" or "hydrocarbon reservoir" is defined as a pay zone (for example, hydrocarbon-producing zones) that includes sandstone, limestone, chalk, coal and some types of shale. Pay zones can vary in thickness from less than one foot (0.3048 m) to hundreds of feet (hundreds of m). The permeability of the reservoir formation provides the potential for production.

"Reservoir properties" and "Reservoir property values" are defined as quantities representing physical attributes of rocks containing reservoir fluids. The term "Reservoir properties" as used in this application includes both measurable and descriptive attributes. Examples of measurable reservoir property values include impedance to p-waves, impedance to s-waves, porosity, permeability, water saturation, and fracture density. Examples of descriptive reservoir property values include facies, lithology (for example, sandstone or carbonate), and environment-of-deposition (EOD). Reservoir properties may be populated into a reservoir framework of computational cells to generate a reservoir model.

A "rock physics model" relates petrophysical and production-related properties of a rock formation to the bulk elastic properties of the rock formation. Examples of petrophysical and production-related properties may include, but are not limited to, porosity, pore geometry, pore connectivity volume of shale or clay, estimated overburden stress or related data, pore pressure, fluid type and content, clay content, mineralogy, temperature, and anisotropy and examples of bulk elastic properties may include, but are not limited to, P-impedance and S-impedance. A rock physics model may provide values that may be used as a velocity model for a seismic survey.

"Seismic attenuation" is the frequency-dependent reduction in amplitude or energy in a seismic wave as the wave passes farther away from a source due to microscopic frictional forces and scattering from thin layers. It is often described in terms of a seismic quality factor, Q. Seismic attenuation is affected by fluid saturations, clay content and thin-layering. If sufficient attenuation occurs, the improvement provided by increased spatial sampling of seismic data (e.g., measuring both P and S-waves) may be minimal Seismic quality factor, Q, estimates are valuable for seismic imaging, processing, and reservoir characterization applications. Examples of such applications include amplitude and phase compensation, wavelet processing, acquisition design, and lithology/fluid identification. Furthermore, unlike many other seismic attributes, seismic attenuation may be directly related to permeability (via a squirt flow mechanism, for example). In exemplary embodiments of the present techniques, rock physics models may be combined with recent advances in imaging to determine links between estimated seismic quality factors and reservoir parameters.

"Seismic data acquisition" means the sensing, processing and recording of the seismic waves.

A "seismic data trace" is the record of a selected seismic attribute (e.g., seismic amplitude or acoustic impedance) at a single x-y (map) location. A seismic trace can be represented as a stack of cells or by a continuous curve (known as a "trace") whose amplitudes reflect the attribute values at each z (or t) data point for the x-y location in question. For a three-dimensional or a four dimensional receiver, a trace is collected for each dimension. Accordingly, it will be clearly understood that the techniques described below apply to traces collected in all of the dimensions. However, for simplicity of explanation, the description herein focuses on a single trace for each receiver.

"Seismic data" refers to a multidimensional matrix containing information obtained about points in the subsurface structure of a field using seismic methods. At least three dimensions in the seismic data may represent the location of each point in space-time, for example, x, y, and t, where x and y represent to the location of the point in an x, y grid on the surface, and t represents the time for a reflected elastic wave to reach the surface. Depending on the properties of the geological layers, t may generally represent the depth of the point below the surface of the earth. The multidimensional matrix will contain at least one other dimensional representing the signal value at each location. For example, this dimension may represent any seismic data that may be connected to a particular point in the field, including such seismic data as offset gathers, offset stacks, angle gathers, angle stacks, $I_p$, $I_s$, $V_p$, $V_s$, $\rho$, and $\mu$, among others.

"Seismic reflection surveys" are the most common type of seismic survey, are performed by initiating a shock wave at the earth's surface and monitoring at a plurality of surface locations the reflections of this disturbance from the underlying subterranean formations. These reflections occur from regions where there is a change in the acoustic impedance of the earth, generally the interface between adjacent strata. The devices used to monitor the reflections are termed geophones or receivers. The signal recorded by each geophone represents as a function of time the amplitude of the reflections detected by that geophone. To a good approximation, the reflections detected by each geophone occur from a point on each reflective surface located on a vertical line passing through the midpoint between the source and geophone. Thus, for every seismic disturbance ("Shot"), each geophone records a signal ("Trace") which represents features of the formations vertically beneath a known point on the surface of the earth.

A "structured grid" is a grid in which each cell can be addressed by index (i, j) in two dimensions or (i, j, k) in three dimensions. All cells of a structural grid have similar shape and the same number of vertices, edges and faces. In this way, topological structure of the grid (i.e., boundary and adjacency relationships between cells, faces, edges, and vertices) is fully defined by the indexing (e.g., cell (i, j) is adjacent to cell (i+1, j)). The most commonly used structured grids are Cartesian or radial in which each cell has four edges in two dimensions or six faces in three dimensions. Structured grids typically are used with seismic data volumes.

Overview

In an exemplary embodiment of the present techniques, an optimal checkpointing scheme is implemented that distinguishes between a storage space used to save a complete forward simulation state that includes all the information needed to restart the forward simulator at a given time step (a full state checkpoint), versus that required only for doing a correlation calculation (a correlation checkpoint). Further, the techniques distinguish between the access speeds and storage capacity differences for multiple types of storage to optimize the mixture of full state and correlation checkpoints saved. The computational speedup associated with this invention over the traditional Griewank checkpointing strategy may range from twenty percent to over three-hundred percent, for seismic reverse time depth migration (RTM) and full wavefield inversion (FWI) applications in a cluster-computing environment. However, the techniques described herein are not limited to RTM or, indeed, any seismic imaging application, but may be used in any number of applications that need to correlate a first data stream, presented in reverse time order, with a second data stream, presented in forward time order.

Griewank checkpointing strategy does not involve saving correlation buffers. Griewank saves only full state checkpoints. To be precise, Griewank uses the full state checkpoint both for correlation and for restarting simulation. The technique disclosed herein gains an advantage relative to the Griewank checkpointing strategy by taking advantage of the fact that the storage required for performing a correlation can be lower, both in access speed and storage size, than that required for storing a complete forward simulation state. For example, a complete seismic data record may have nine components recorded: three representing particle velocities in each of three dimensions; and six stress tensor fields, from which information about P-waves and S-waves can be extracted. In a seismic forward simulation, the full state checkpoints include all parameters and variables needed to restart the computation of forward simulation time steps, which may require the saving of dense grids of many wavefield components plus additional buffers required for the implementation of boundary conditions. See, e.g., Marcinkovich, C. and K. Olsen, "On the implementation of perfectly matched layers in a three-dimensional fourth-order velocity-stress finite difference scheme," 108 JOURNAL OF GEOPHYSICAL RESEARCH (No. B5) 2276 (2003).

In contrast, the correlation wavefields (correlation checkpoints) may be only required on a less dense grid in a subset of the full model volume and may only include a subset of the wavefield components, and may requires less numerical precision. For example, if obtaining the P-P Image in RTM is the only goal for a specific application, there may only be a need to correlate one wavefield (i.e. the pressure component of the wavefield), even though nine components are used for computation. As another example, double precision may be desired for computation, but only single precision is needed for cross-correlation.

As computing resources become more complex, e.g., optimized for particular application, the present techniques also provide for calculating an optimal balance between saving full state checkpoints and correlation checkpoints. In exemplary embodiments, the present techniques distinguish between memory size and speed and, thus, the savings over Griewank techniques may be significantly more in a hierarchical environment that includes such technologies as graphical processing units (GPU) and solid state disk drives (SSD) as well as traditional random access memory (RAM) and disk storage. Accordingly, application software developed using this technology may be portable and flexible in changing computer environments.

The derived optimal checkpointing strategy applies to time-stepping methods in general. Therefore, it can be used for adjoint state gradient computation as required for doing time-domain full waveform inversion, as well as for reverse time depth migration. However, as noted above, the present techniques are not limited to RTM which is merely used as an example, herein. RTM is more clearly explained with respect to a single seismic source excitation, or "experiment," as illustrated in FIG. 1.

FIG. 1 is a drawing of a region of interest 100, illustrating a single seismic experiment in a land environment, in accordance with an exemplary embodiment of the present techniques. It will be understood by one of skill in the art that a large number of seismic experiments will be performed over the region of interest 100 to effectively image the subsurface structure. In the region of interest 100 shown in FIG. 1, a salt dome 102 is protruding towards the surface 104. The sides of the salt dome 102 may be vertical or even inverted, for example, side 106, making imaging by many techniques difficult.

The salt dome 102 may trap hydrocarbon deposits, such as oil 108, in oil sands or porous rock under a layer of cap rock 110, located above the salt dome 102. Other deposits, such as oil and or gas 112, may be located in layers of rock 114 along the side, e.g., side 106, of the salt dome 102. Still other hydrocarbons, such as deposit 116, may be located in layers of rock 118 that are more remote from the salt dome 102.

A seismic experiment may be performed by placing one or more sources 120 along the surface 104 of the region of interest 100 along with one or more receivers 122. In embodiments, each of the receivers 122 may be a three-dimensional or four dimensional receiver cables to detect both P-waves and S-waves. When triggered, the source 120 creates a pulse, which may be conducted into the subsurface 124 as a wave 126. Although the pulse wave 126 propagates in all directions, the illustration in FIG. 1 is simplified, for example, to show only the propagation of the pulse wave 126 towards the salt dome 102. Part of the energy of the pulse wave 126 may reach the receivers 122 having not been reflected from any surface, but, instead, having traveled directly through the subsurface 124 to the receivers 122, for example, as a direct wave 128.

When the pulse wave 126 impinges on a reflector, e.g., a layer with different impedance, such as the salt dome 102, a reflected wave 130 may be created from the wave 126. The reflected wave 130 may be partly or fully mode converted, e.g., an impinging P-wave may have S-wave components. If the reflected wave 130 has S-wave components, the S-waves may be attenuated by rocks containing substantial concentrations of fluids, for example, deposit 116. This attenuation may be termed Q attenuation. The effective determination of Q attenuation of S-waves may be useful for enhancing the accuracy of the seismic imaging, allowing the location of layers, e.g., rock layers 118 that hold fluids, such as hydrocarbons, aquifers, and the like. Simpler imaging techniques often use only the P-wave reflections for the imaging. However, in exemplary embodiments of the present techniques, both P-waves and S-waves are used for the imaging, allowing the determination and quantification of Q attenuation.

The use of two-way wave calculations in RTM allows other effects to be determined For example, a portion of the pulse wave 126 may not be reflected at the surface of the salt dome 102, but may, instead, be refracted into the salt dome 102. The refracted wave 132 may travel through the salt dome 102, prior to being refracted back towards the receivers 122, as wave 134, by another surface of the salt dome 102. Simpler imaging techniques, such as Kirchhoff migration, or migrations based on one-way wave equations, may not be able to capture this anisotropy. Thus, these techniques may miss components of the subsurface 124, such as steep reflectors (side 106), refractive subsurface layers (salt dome 102), and the like.

For purposes of the seismic imaging computations, the area of interest 102 may be divided into a three-dimensional grid of computational cells. In seismic calculations, the grid will generally be a regular grid, allowing the computational cells to be assigned to coordinates that indicate the location. The techniques are not limited to regular grids, as unstructured computational meshes may be used. However, unstructured computational meshes may add significant overhead, as each computational cell may contain location information. Each computational cell may represent, or contain, a seismic data volume that has associated properties, such as velocity, impedance, and the like. Further, the speeds and directions of seismic wave fronts, such as P-waves or S-waves, may be calculated in each seismic data volume, using the properties for that seismic data volume. In effect, the migration process "moves" the source and receiver to associate a reflection with the computational cell in which it originated. This technique can be used to generate an image of the subsurface. The RTM process can be more clearly seen by examining a cross section of the area of interest 100 along the seismic source and receivers, as discussed in further detail with respect to FIG. 2.

Figure 2:
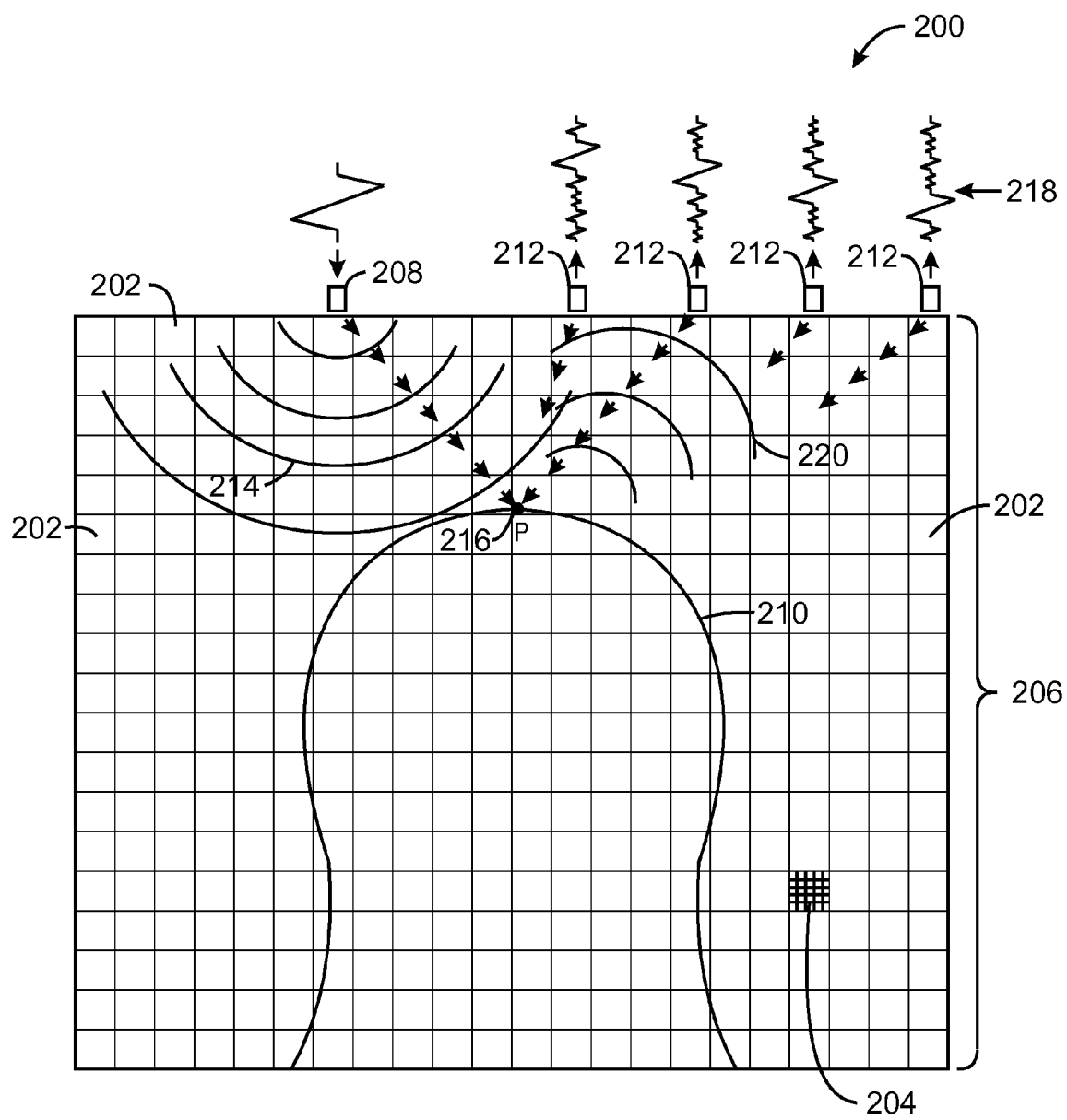
FIG. 2 is a schematic diagram illustrating the operation of reverse time migration (RTM), in accordance with an exemplary embodiment of the present techniques.

FIG. 2 is a schematic 200 illustrating the operation of reverse time migration (RTM), in accordance with an exemplary embodiment of the present techniques. Each of the computational cells may be illustrated as computational cells 202 in the schematic 200. The computational cells 202 may not be the minimum size on which the seismic data is collected or modeled, but may represent groups of smaller volumes 204 that have been combined, for example, to ease the computational complexity, or separated for computation, for example, to improve the accuracy of the image. The size of the computational cells 202 is discussed in greater detail below.

In a basic form, RTM treats each seismic experiment separately and migrates the data by simulating the physical process used to collect it. As shown in FIG. 2, the algorithm utilizes a velocity model 206 of the wave propagation velocity of the area being imaged. The velocity model 206 generally comprises the rock properties in each of the computational cells 202, such as density, impedance, and the like, which may be used by a wave propagation algorithm to calculate velocity and direction of a wave.

A wave propagation algorithm, usually finite-difference or pseudospectral, can be used to propagate a pulse from a location of a source 208 into the subsurface. As discussed herein, this may be performed using computational cells that are on a finer timescale than the computational cells 202. This propagation may provide an approximation, as a function of time, of the energy that may be reflected from each subsurface reflector, e.g., saltdome 210, and recorded at the receivers 212. Since the source wavefield 214 travels primarily downward it may be labeled as $D(x_S, x, t)$, where $x_S$ is a vector in three-dimensional space representing the location of the source, x is a vector in three-dimensional space representing the location of an image point 216, and t is a value representing the time from the start of the seismic experiment (i.e., $t_0$ represents the initial generation of the pulse wave).

Just as the source wavefield is propagated forward in time to simulate illumination of the reflectors, the data traces 218 recorded at the receivers 212 may be propagated backward in time to simulate the motion of energy from, as yet unknown, reflection points to the receivers 212. The backwards propagation can be performed by an adjoint operator, which maps the traces as wavefields 220 into the subsurface. As the receiver wavefields 220 generally travel upwards, they may be labeled as $U(x_S, x_R, x, t)$, where $x_S$ is a vector in three-dimensional space representing the location of the source, $x_R$ is a vector in three-dimensional space representing the location of the receiver, x is a vector in three-dimensional space representing the location of the image point 216, and t is a value representing the time from the start of the seismic experiment ($t_{max}$ represents the end of the data collection experiment).

The imaging principle used in RTM is that energy recorded by the receivers 212 at a time must have reflected from a location, e.g., image point 216, such that the source wavefield 214 was nonzero and the back-propagated receiver wavefield 220 was nonzero at the same propagation time t. Its ability to image locations that have been illuminated by overturned energy distinguishes RTM from other wave-equation based migration algorithms. To compute the image at a given subsurface location x, for a given shot at $x_S$, there must be a quantity that is nonzero when energy from the source that could have reflected from x and reached the receivers at a time t when a received wavefield is also nonzero. The total time of the experiment is $t_{max}$ so the event time t ranges from 0 to $t_{max}$. Mathematically, this can be expressed as the cross-correlation of the source wavefield 214 and receiver wavefield 220.

$$I(x) = \sum_{x_R} \sum_{x_S} \int_0^{t_{max}} D(x_S, x, t) \times U(x_S, x_R, x, t)\, dt \qquad \text{Eqn. 1}$$

In Eqn. 1, I(x) is the migrated image at subsurface location x, e.g., image point 216. The weighting function in Eqn. 1 indicates that the source wavefield 214 (D) is forward propagated along time t, and the receiver wavefield 220 (U) may be backward propagated from final time $t_{max}$ (thus, the name Reverse Time Migration). The product of the two wavefields 214 and 220 (e.g., the cross-correlation) may be summed at each image point 216 (x). This is done for each source location $x_s$ and each receiver location $x_R$. The resulting image may be summed for all source and receiver locations to provide a final image.

The computation of the imaging condition requires that the value of the source wavefield 214 and receiver wavefield 220 be available at the same time t. The most straightforward approach would be to compute and store one of the wavefields (e.g., the source wavefield 214), for all t of interest (e.g., $t_0$ to $t_{max}$). The other wavefield (e.g., the receiver wavefield 220) could then be computed and multiplied with the source wavefield 214. However, for most problems, this approach can be impractical, since a great deal of data storage would be required to store the source wavefield 214. Therefore, the practical application of RTM requires that one recompute the source wavefield 214 periodically.

The image, I(x), where x is a location vector (x, y, z), represents the reflectivity of the subsurface as a function of position. The reflectivity is large at locations where the impedance changes appreciably. However, as can be seen from Eqn. 1, the RTM algorithm will yield nonzero image values at any point where there is any correlation between source and receiver wavefields 214 and 220. This may occur at locations other than those corresponding to true reflections, e.g., image point 216, leading to image artifacts that appear as a low-frequency noise superimposed upon the true reflectors. A number of methods for removing these artifacts, among them low-cut filtering, application of Laplacian filters, etc, are available for this purpose.

As mentioned previously, RTM uses the full wave equation to propagate energy through the subsurface and, thus, it is a computationally expensive migration algorithm. Prestack RTM, in which individual shots are migrated separately, has only become computationally feasible in the last few years, due to the advent of cost-effective computing clusters. Typically, clusters of many thousands of multi-CPU nodes may be linked together to form a computing cluster. Each shot to be migrated can be assigned to a set of nodes in the cluster, and the property models (velocity, density, etc) for the area surrounding the shot can be read into the memory associated with the assigned nodes. The shot can then be migrated, using the forward and backward solutions of the wave equation described above and the result can be stored on disk to be summed with results of the other migrated shots. In an exemplary embodiment of the present techniques, an optimization scheme is used to calculate a tradeoff between computer memory and computational overhead. As discussed below, this scheme may store full state checkpoints (from which either a correlation may be performed or from which the propagation operation may be resumed), correlation checkpoints (including only the data needed for the cross-correlation calculation at a particular time), or a combination thereof The use of checkpointing makes the practical implementation of RTM feasible. Further, checkpointing is even more important for embodiments that take into account inelastic propagation effects ("Q") or compute many wavefield components such as both the S-wavefield and the P-wavefield.

The computational model can be divided into computation cells 202, or smaller volumes 204. The spacing of the computational cells is such that there are several grid blocks per minimum wavelength. For typical models, the spacing may be about 25 meters. Thus, with models of regions of interest having dimensions on the order of tens of kilometers, the number of grid cells in each dimension may be several hundred to more than one thousand. Thus, the total number of computational cells 202 may be, for example, greater than one billion. The computations may be performed by running a finite-difference stencil over the entire grid, in order to compute the wavefield derivatives required for modeling the wave equation at each computational cell 202. Therefore, many billions of floating point operations can be performed at each time step.

The required grid spacing Δx, e.g., the size for the computational cells 202, or smaller volumes 204, can be computed using the formula shown in Eqn. 2.

$$\Delta x \leq \frac{v_{min}}{f_{max}} \frac{1}{N} \qquad \text{Eqn. 2}$$

In Eqn. 2, $v_{min}$ is the minimum velocity, $f_{max}$ is the maximum frequency, and N is the number of points per minimum wavelength, which may be about 5-10 points. This spacing, or smaller, may avoid the introduction of numerical dispersion into the propagated wavefield.

The total number of time steps may also be very large. Seismic data are recorded for a total time of about ten seconds. The data are typically stored with a sample interval of 2-4 milliseconds, meaning that each trace 218 may include about 2500-5000 samples. However, the RTM wave-equation solution must be computed on a much finer time step, given by the Courant-Friedrichs-Levy (CFL) stability condition shown in Eqn. 3.

$$\Delta t \leq k \frac{\Delta x}{v_{min}} \qquad \text{Eqn. 3}$$

In Eqn. 3, k is a constant of order one that depends on the dimension and the exact algorithm used. For example, k may be $1/\sqrt{2}$ for two-dimensional equations or $1/\sqrt{3}$ for three-dimensional equations. Further, k may be larger if the equations are higher order in time or smaller if the equations are lower order in time. For typical conditions, Δt~0.5 msec, and, thus, a ten-second total propagation time requires 20000 time steps. This indicates that each expensive time step must be computed very many times. Furthermore, using Eqns. 2 and 3 it can be noted that the total computational cost is proportional to $f^4_{max}$, so doubling the maximum frequency to be migrated increases the computational cost by a factor of 16. Since the interpretability of seismic images is normally better when the frequency bandwidth is larger, the dependence of cost on frequency tends to quickly drive up the time required to obtain high quality images.

Figure 3A:
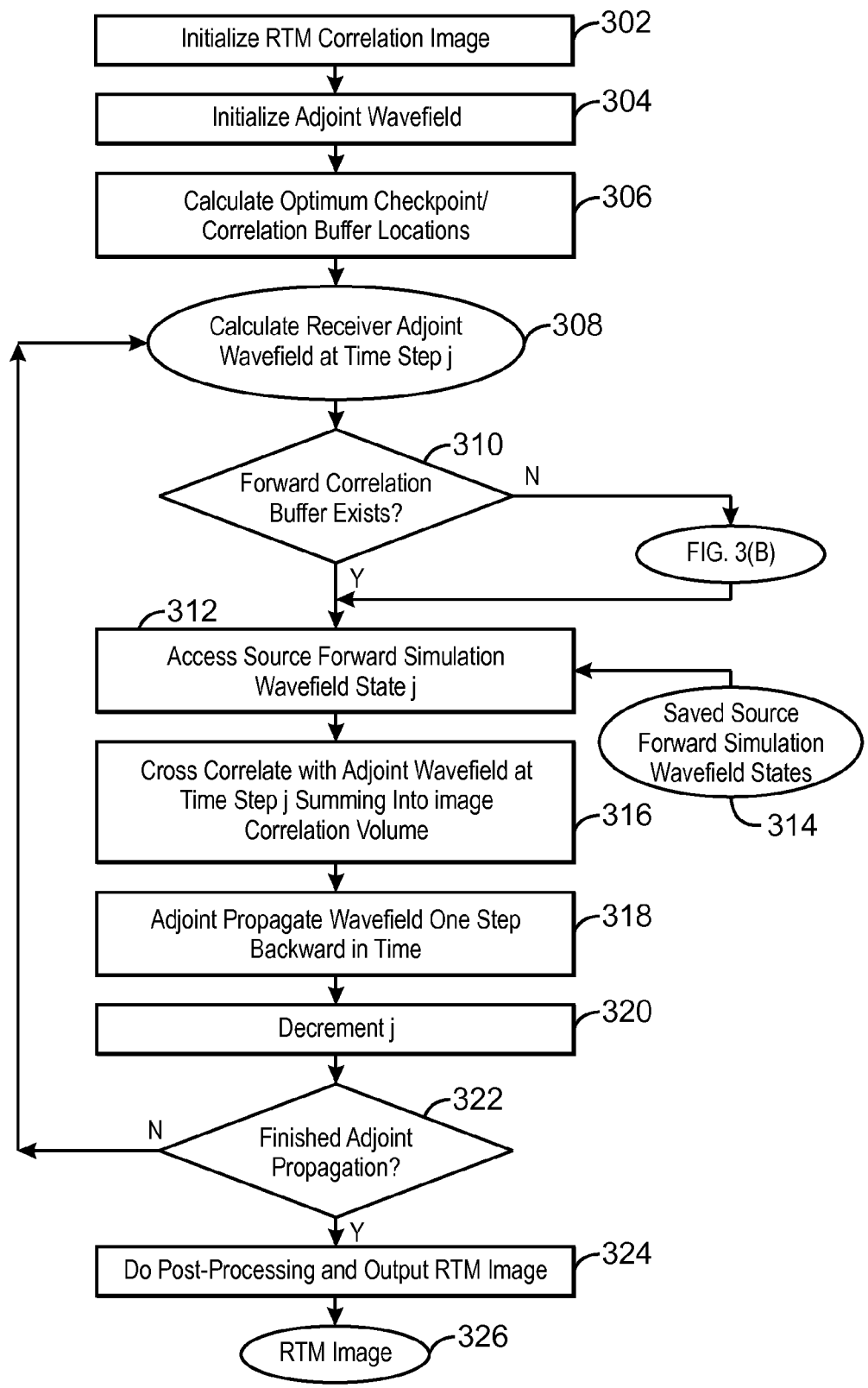
FIG. 3A is a process flow diagram showing a method for performing a reverse time cross-correlation, such as RTM, in accordance with an exemplary embodiment of the present techniques.

FIG. 3A is a process flow diagram showing a method for performing a reverse time cross-correlation, such as RTM, in accordance with an exemplary embodiment of the present techniques. In this embodiment, the process can begin at block 302 with the initialization of a reverse time migration (RTM) correlation image, for example, by setting all points in the image volume to zero. At block 304, an adjoint wavefield can be initialized, for example, by setting the adjoint wavefield to match a receiver wavefield at the maximum recording time. At block 306, the optimum time locations for storing checkpoint buffers and/or full state buffers can be calculated. The optimal time locations may also be calculated prior to running the simulation, and stored in a table for use in later simulations.

The adjoint wavefield may then be calculated at a first time step j, as shown at block 308. The first time step j may correspond to the final time in the simulation. At block 310, a determination is made as to whether a forward correlation buffer exists for time step j. If the correlation buffer exists, either as an independent correlation checkpoint, or as part of a full state checkpoint, process flow proceeds to block 312. If at block 310, it is determined that a correlation buffer does not exist at a particular time step j, flow may proceed to the steps shown in FIG. 3B to calculate the necessary information associated with the forwardly propagating source excitation wavefield necessary to do the correlation at this time step.

At block 312, the wavefield in the correlation buffer is accessed from a database of stored forward simulation states 314, contained in a storage unit (such as a memory or hard drive). At block 316, the forward simulation wavefield state is cross-correlated with the adjoint wavefield for time step j, wherein the results are summed into a correlation volume within the correlation image. The correlation image may then be generated by the formula $$g = \sum_{i=0}^{n} \Re(c_i, \bar{s}_i),$$

wherein $\Re$ is the "cross-correlation" operation, and $c_i$ is the correlation information subset of the full source excitation wavefield state $s_i$, which is expressed as $c_i = p(s_i)$. The correlation operator $\Re(c_i, \bar{s}_i)$ can represent a more general operator than just a simple mathematical cross-correlation for some applications. The important feature is that this operator requires the subset of the forward simulation state $c_i$ and the adjoint state $\bar{s}_i$ at the same time step j as input.

At block 318, the adjoint wavefield may be back-propagated one-step backward in time, i.e., j=j−1. Then another sequence of (n+1) adjoint states $\bar{s}_i$ may be generated with terminal $\bar{s}_n$ and n procedure calls $\bar{f}_i$ at $\bar{s}_i$ that are generated according to $\bar{s}_{i-1} \leftarrow \bar{f}_i(\bar{s}_i)$, e.g., back-propagated from the recorded traces. At block 320, j may be decremented, and, at block 322, a determination may be made as to whether the adjoint propagation is finished. If not, process flow returns to block 308 to continue at the next time step.

If at block 322, the adjoint propagation is finished, process flow proceeds to block 324, at which various post-processing and output steps may be performed. For embodiments that are used to generate seismic images, such post-processing may include, for example, forming sub-surface offset gathers from the migrated points. The offset gathers may be converted to reflection angle gathers to form a final image. Further, filtering calculations may be implemented to decrease noise, such as a Laplacian algorithm, as discussed above. The process ends at block 326, wherein a data representation of the image is output or stored. The data representation may include an image of a sub-set of the results. For example, in seismic imaging, the output may include only reflection angle gathers. In other embodiments, generating the data representation may include other steps to form a complete image. For example, in seismic imaging, mute and stack operations may be performed to generate a full seismic image. However, one of ordinary skill in the art will recognize that the present techniques are not limited to seismic imaging, and may be used for any number of other simulations that cross-correlate forward simulation data with data projected in a reverse-time order.

Figure 3B:
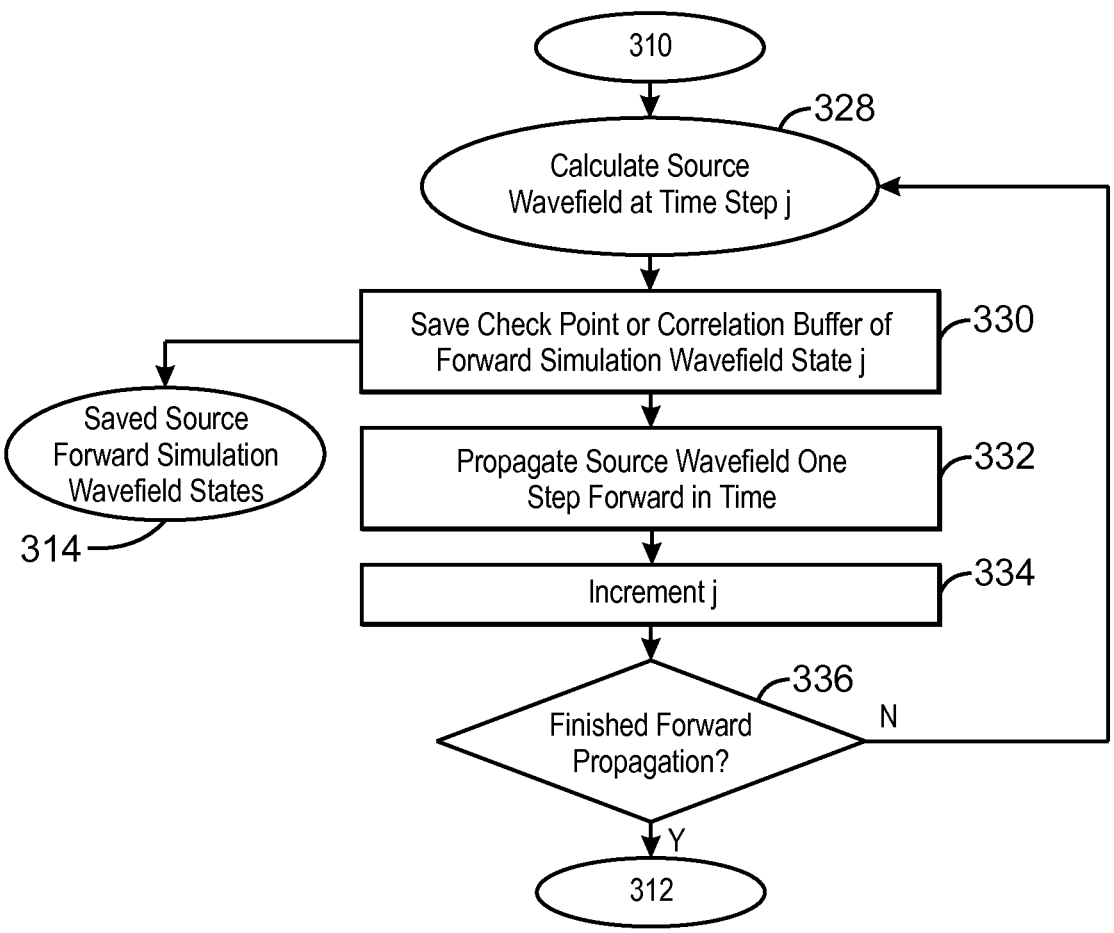
FIG. 3B is a process flow diagram showing a forward propagation of a wavefield for a reverse time cross-correlation, in accordance with an exemplary embodiment of the present techniques.

FIG. 3B is a process flow diagram showing a forward propagation of a wavefield for a reverse time cross-correlation, in accordance with an exemplary embodiment of the present techniques. The steps in FIG. 3B may be executed if no correlation buffer is found at block 310. At block 328, the wave equations for the forward simulation may be propagated across the grid. The propagation may be performed by taking a sequence of (n+1) states $s_i$ starting with $s_0$ and n procedure calls $f_i$ at $s_i$ that are generated according to $s_{i+1} \leftarrow f_i(s_i)$, e.g., the propagation of the forward excitation pulse.

As indicated in the equations above, the receiver wavefield can be propagated backwards in time and cross-correlated at each computational cell (x) with the forward-in-time simulation of a source wavefield. This means that the forward-in-time source simulation must be accessed in reversed time order. Since storing all of the forward in time points for a cross-correlation may not be feasible, due to memory and access time limitations, at block 330, forward simulation wavefields 314 can be stored for various time steps, as discussed herein. These forward simulation wavefields can be considered checkpoints that contain correlation buffers for the cross-correlation with the reverse data projection. Each of the checkpoints in the database 314 may be a full state checkpoint, which may be used to restart a propagation calculation, or only a smaller correlation checkpoint used for determine the cross-correlation at a particular time step. At block 332, the source wavefield may be propagated one-step forward in time. At block 336, a determination is made as to whether the forward propagation is finished. If not, flow proceeds to block 328 to continue the calculation. If so, flow returns to block 312 (FIG. 3(A)) at which the cross-correlation is resumed. The determination of the time steps (e.g., the checkpointing process at block 306) at which to save full state checkpoints versus only correlation checkpoints is discussed below.

In exemplary embodiments of the present techniques, a number of assumptions are made to improve the checkpointing process, and are used in the discussion to follow. Specifically, that each full state checkpoints requires the same amount of memory of size S. Further, that each correlation checkpoint $c_i$ requires the same amount of memory of size C. In addition, that each procedure call $f_i$ requires the same amount of computation effort 1, and that there is no computation effort for $\Re(c_i, s_i)$ or $c_i = p(s_i)$. The additional memory requirement during the process of $\Re(c_i, s_i)$, $c_i = p(s_i)$, $f_i$ or $\bar{f}_i$ is not considered part of the memory constraint.

The Griewank checkpointing strategy assumes that the memory required to save a full state checkpoint (the variable S) is identical to that required to save the information necessary to do a cross-correlation (the variable C) for the imaging step. For example, if a reverse time migration based on velocity-stress propagators is being performed, there may only be a need to correlate pressure, instead of all components of particle velocity and stress. This can easily increase the ratio of S/C to 4 or even up to 9. If perfectly matched layer (PML) boundary conditions are used, the S/C ratio may increase by another factor of two or three near the boundary of the earth model. Thus, propagation of waves may take place on a fine grid, but imaging may be performed on a coarser grid. For the case where correlation can also be done on every other sample in every spatial dimension, the resulting S/C ratio would be eight. If some accuracy in the cross-correlation step may be sacrificed by storing a compressed correlation checkpoint, the S/C ratio can be increased by another factor of two. The S/C ratio components mentioned here would be multiplied together to yield the S/C ratio needed for this algorithm. Therefore, indeed, there could be a substantial difference between S and C. Given that reverse time depth migration is very computationally expensive, the present techniques may provide a substantial decrease in computational overhead by exploiting the difference between S and C.

The Optimal Strategy without Memory Constraints

If there is no memory constraint, then the optimal strategy (in the sense of least computation effort) could be detailed as:

For i=0, n−1

$c_i = p(s_i)$, Store $c_i$ $s_{i+1} \leftarrow f_i(s_i)$ $g = \mathfrak{R}(p(s_n), \bar{s}_n)$ For i=n−1,1

$\bar{s}_i \leftarrow \bar{f}_{i+1}(\bar{s}_{i+1})$, $g = g + \mathfrak{R}(c_i, \bar{s}_i)$ In this strategy, the total memory cost is (n−1)C and the total forward computation effort is n (the total forward computation effort is 2n−1 assuming each adjoint step requires the same effort as a forward step). It may be noted that the correlation at state zero is ignored, since state 0 usually corresponds to zero wavefields for reverse time migration applications. However, the techniques described herein can be easily modified to accommodate nonzero initial wavefields.

In the discussion to follow, the notation J(n,M) may be used to represent the computation effort or cost for correlating n states (state 1 to state n) under memory constraint M. In this case, it may be assumed that the adjoint state n is known, and state 0 can always be recovered during computation with no computation effort, by either resetting everything to zero or loading state 0 from memory (which is not part of M). After computation, the adjoint state at adjoint state 1 is used (instead of at adjoint state 0).

Further, the notation $J_{no\_cp}(n,M)$ is used herein to represent the computation effort for correlating n states under memory constraint M without using any full state checkpoints (i.e., storing only correlation checkpoints). In the case where M is large and there is sufficient memory to hold all of the correlation checkpoints in appropriate buffers, this can be simply expressed as $J_{no\_cp}(n,M)=n$ for $M \leq (n-1)C$.

The Optimal Strategy with Memory Constraints

In general, in one sweep of computation, $n_c=1+M/C$ correlation buffers may be held in memory, i.e. $n_c$ is the number of correlations possible given memory M and correlation buffer size C. This assumes that the function call to $f_i$ does not put a constraint on memory or that the state buffer results from the forward simulation may be used to perform the correlation. Therefore, the computation required while saving correlation buffers but without checkpointing any forward simulation states can be calculated by the formula shown in Eqn. 4.

$$n_c = 1 + M/C, t = n/n_C, r = n - tn_C$$
$$J_{no\_cp}(n, M) = \frac{t(t+1)}{2}n_C + r \times (t+1) \quad \text{for } M < (n-1)C \quad \text{Eqn. 4}$$

In Eqs. 4, t=the number of sweeps to do using all $n_c$ correlation buffers, and r=remainder=the number of correlations to do on the last pass where only a portion or none of the correlation buffers are used. Note that if r is equal to zero, then this last partial pass does not need to be done. It should be understood that in Eqn. 4, and other similar equations, integer arithmetic is used instead of floating point arithmetic.

Figure 4:
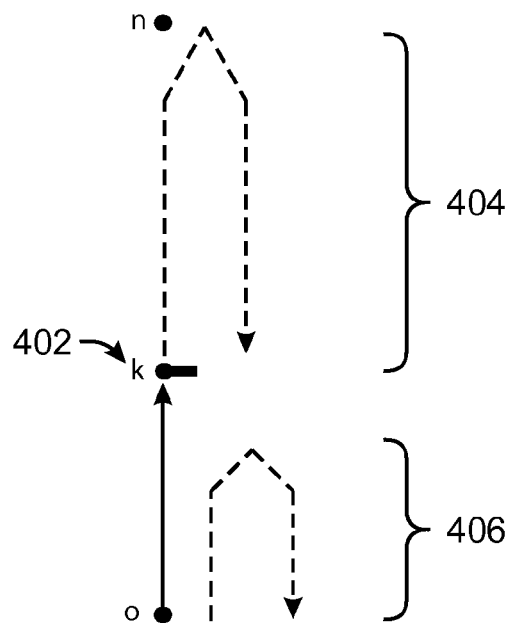
FIG. 4 is a diagram useful in illustrating the minimum computational effort using a full state checkpoint at time index k, in accordance with exemplary embodiments of the present techniques.

FIG. 4 is a schematic diagram illustrating the minimum computational effort using a full state checkpoint at time index k, in accordance with exemplary embodiments of the present techniques. If an optimization goal assumed herein is the minimization of J(n,M) using one checkpoint 402 at time step k, then for the correlation step 404 at and above time step index k, k forward steps can be used to get to the checkpoint location plus J(n−k,M−S) for the time forward and adjoint stepping needed for time step indices k+1 to n. The memory available is reduced by S due to the checkpoint 402 of the state buffer at time step index k. The computational effort 406 for both forward and adjoint time stepping for indices 0 to k−1 would be J(k−1,M), as shown in Eqn. 5.

$$J_{add\_one\_cp}(n,M,k)=k+J(n-k,M-S)+J(k-1,M) \quad \text{Eqn. 5}$$

Further, Eqn. 6 allows for minimizing J(n,M) under the restriction that there is either no checkpoint used or at least one checkpoint at some state k (state k is between state 0 and state n).

$$J(n, M) = \min\left\{J_{no\_cp}(n, M), \min_{k=1,n-1}[J_{add\_one\_cp}(n, M, k)]\right\} \quad \text{Eqn. 6}$$

As can be seen in the above formulation, the memory constraint size is always changing in units of S and there are an integral number of checkpoint state buffers $n_s$ with memory equal to $n_s S$. The memory associated with the $n_c$ correlation buffers is equal to $(n_c-1)C$. The total memory associated with the combination of both checkpoint state buffers and correlation buffers is shown in Eqn. 7.

$$n_s S + (n_c-1)C \leq M \quad \text{Eqn. 7}$$

In an exemplary embodiment, the above equation is iteratively solved to find a numerical solution for a desired problem size and memory footprint.

Figure 5A:
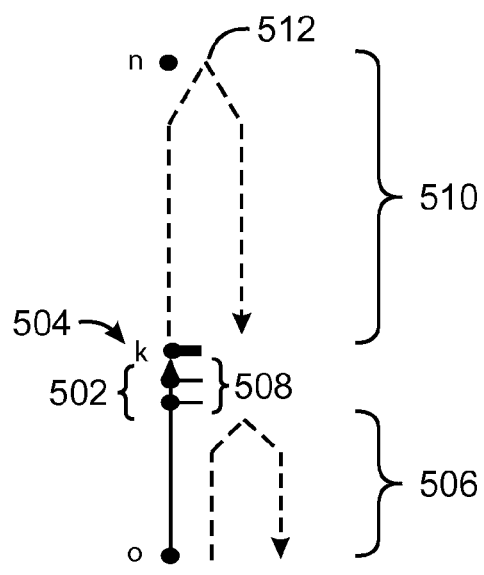
FIGS. 5A-B are diagrams useful in illustrating the time steps at which full state or correlation checkpoints may be stored, in accordance with exemplary embodiments of the present techniques.
Figure 5B:
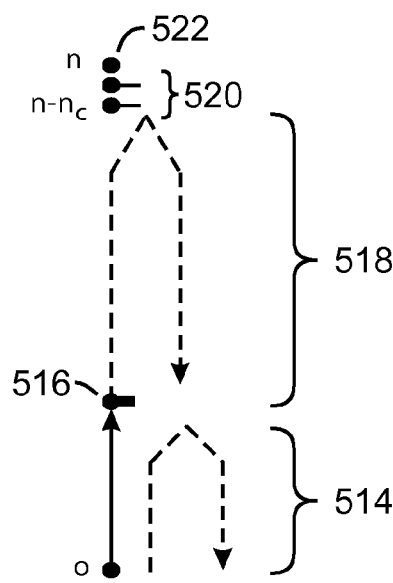

FIGS. 5A-B are schematic diagrams illustrating the time steps at which full state or correlation checkpoints may be stored, in accordance with exemplary embodiments of the present techniques. For example, as shown in FIG. 5A correlation checkpoints 502 may be stored before a full state checkpoint 504 at time step k. However, for any case using a correlation checkpoint before a full state checkpoint, there is a corresponding case that does not use correlation checkpoints before full state checkpoints that is at least as efficient. In FIG. 5A, the cost 506 to reach the first of $n_c$ correlation checkpoints 508 before the state checkpoint 504 at k can be expressed as $J=J(k-1-n_c,M)$. The cost of the correlation checkpoints 508 can be expressed as $J=n_c+2$. Finally, the cost 510 to reach the end time step 512 from the full state checkpoint 504 may be represented as $J=J(n-k,M-S-n_c C)$. Based on these, if the optimal case stores $n_c$ buffers before a full state checkpoint 504 at some time step k, as illustrated in FIG. 5A, then the total computation effort may be given in Eqn. 8.

$$\Sigma J = k + n_c + 2 + J(k-1-n-M) + J(n-k, M-S-n_c C) \quad \text{Eqn. 8}$$

In FIG. 5B, the cost 514 to reach a full state checkpoint 516 at $k-n_c$ can be expressed as $J=J(k-1-n-M)$. The cost 518 to reach the first of $n_c$ correlation checkpoints 520 stored before the end time step 522, from the full state checkpoint 516, may be represented as $J=J(n-k,M-S)$. Thus, in a case in which no correlation checkpoints are stored before the full state checkpoint 516, the total computation effort is shown in Eqn. 9.

$$\Sigma J = k + n_c + 2 + J(k-1-n-M) + J(n-k, M-S). \quad \text{Eqn. 9}$$

As can be seen by the formulations in Eqns. 8 and 9, the latter case is at least as good as the previous case (which stores correlation checkpoints before a full state checkpoint). Therefore, in exemplary embodiments, only the latter case needs to be considered.

Optimal Checkpointing Versus Griewank Checkpointing

The storage ratio (S/C) of full state checkpoints to correlation checkpoints may often be around 10, thus, this provides a convenient ratio to use for comparing the computational effort for optimal checkpointing, described herein, to Griewank checkpointing. In Table 1, below, n provides the number of time steps required for the forward and adjoint computations. The column labeled "ideal" provides the computational cost for time-stepping to enable correlation of the forward and adjoint simulations in an environment where memory is plentiful and the cost is the minimum possible. The column labeled "Griewank checkpointing" assumes that $n_s=M/S$ state buffers are available and no correlation checkpoints are used. The column labeled "optimal checkpointing" shows the results obtained using both full state checkpoints and correlation checkpoints. The column labeled "ratio" is calculated by the ratio of the Griewank computation results divided by the Optimal checkpointing results, and provides the speedup possible with this new method compared to using only the Griewank optimal checkpointing strategy.

Two observations may be made from the results in Table 1. First, that by exploiting the difference between state buffer and correlation buffer, the computational effort can be reduced. Further, actual application of this optimal checkpointing strategy requires some pre-computation to find the optimal strategy. However, the pre-computation effort is negligible compared with the total computation effort in applications such as reverse time migration and gradient computation.

Further, it may be noted that typical parameters that apply to common Linux cluster applications of 3-D reverse time migration could correspond to the line with 4000 time steps, 10 state buffers and M=100 where the ratio (speed increase) is roughly 1.28. If a company were to have a $20 million computer system working exclusively on reverse time migration, then the economic value of this algorithm change would be on the order of $5.6 million in increased production.

TABLE 1

Costs for Optimal Checkpointing versus Griewank Checkpointing

| Total computational effort (Forward + Adjoint) | Ideal | Griewank Check-pointing | Optimal Check-pointing | Ratio |
|---|---|---|---|---|
| n = 55, 2 state buffers (M = 20) | 109 | 264 | 156 | 1.6923 |
| n = 1000, 2 state buffers (M = 20) | 1999 | 13171 | 9901 | 1.3303 |
| n = 1000, 10 state buffers (M = 100) | 1999 | 4548 | 3392 | 1.3408 |
| n = 2000, 10 state buffers (M = 100) | 3999 | 10184 | 7545 | 1.3501 |
| n = 4000, 10 state buffers (M = 100) | 7999 | 22184 | 17311 | 1.2815 |
| n = 1000, 100 state buffers (M = 1000) | 1999 | 2898 | 1999 | 1.4497 |
| n = 2000, 100 state buffers (M = 1000) | 3999 | 5898 | 4998 | 1.1801 |
| n = 4000, 100 state buffers (M = 1000) | 7999 | 11898 | 11025 | 1.0792 |

FIGS. 6A-C are schematic diagrams illustrating the operation of the Griewank and optimal checkpointing schemes for a simplified simulation having 55 time steps, in accordance with exemplary embodiments of the present techniques. For each of the examples, the number of steps (55) and the amount of storage space (20) is the same. FIG. 6A illustrates a Griewank checkpointing strategy having a cost J of 210 for the case of n=55, M=20, S=10 (i.e., no correlation checkpoints). FIG. 6B illustrates an optimal checkpointing strategy with J=102 for the case of n=55, M=20, C=1, S=10. FIG. 6C illustrates an optimal checkpointing strategy with J=148 for the case of n=55, M=20, C=2, S=10 (middle). In a Griewank checkpointing algorithm, shown in FIG. 6A, only full states (indicated by horizontal lines) are saved, allowing a complete restart of the propagation algorithm from each saved state. In operation, the algorithm performs multiple iterations of the forward simulation. For example, in a first run 602, full states are saved during the forward propagation of the excitation pulse at time step 35 (606) and at time step 50 (604). This fully utilizes the available memory M=20. The algorithm then advances forward propagation time steps to time step 55 and performs the cross-correlation with the backwards propagated wavefield from the receivers. Then the backwards propagated wavefield is run backward in time one time step to time step 54. The forward propagation wavefield is restored at time step 50 (64) and advanced to time step 54, and the cross-correlation is again performed. This procedure is repeated for time steps 53, 52, 51, and the correlation is performed using the full state checkpoint itself at time step 50 (604).

The memory used for time step 50 is then released, and the cross-correlation proceeds with the forward simulations run from time step 35 (606). The released memory is used for storing checkpoints from time step 35 (606), such as a checkpoint at time step 45 (608). The checkpoint at time step 45 (608) is used to run forward simulations for time steps 49 through 46 wherein at each time step, the forward propagated wavefield is cross correlated with the backwards propagated wavefield from the receiver. After the cross-correlation is done using the full state checkpoint at time step 45 (608), the memory is released, and used for another checkpoint at time step 41 (610). The procedure is repeated until the cross-correlation has been performed for all time steps. It may be noted that the spacing between checkpoints is not uniform in FIG. 6A; in the first sweep for example, the checkpoints are at 50, 45, 41, 38 and 36, rather than for example 50, 45, 40 and 36. This is because the numbers shown in the drawing were determined to be optimal using an optimization algorithm (Griewank optimization in the case of FIG. 6A), whereas other possible choices of checkpoint location may or may not be optimal. Although the amount of memory utilized is decreased, it can be seen that the amount of calculations is substantially increased. Since the amount of memory and the access time for the memory are often limiting, the procedure may substantially improve the running time, making the full RTM feasible. However, the number of calculations and amount of memory used in Griewank checkpointing may still be problematic for complex seismic imaging calculations, such as RTM.

In an exemplary embodiment of the present techniques, two distinct types of checkpoints are saved, a full state checkpoint from which the simulation may be restarted (or a cross-correlation may be performed) and a smaller checkpoint that only holds the wavefield data needed for the cross-correlation. This may provide significant benefits for both calculation and memory. For example, the optimal memory utilization shown in FIG. 6B may result if it is assumed that the memory used to hold a correlation checkpoint is 1/10 the size of the memory used to hold a full state checkpoint. In this condition, far fewer full simulation runs may be needed. As used in FIG. 6C, longer lines indicate full state checkpoints while shorter lines indicate correlation checkpoints. During a first run in FIG. 6B, a full simulation run 612 is started from the zero point 614. During the full simulation run 612, a correlation checkpoint (or correlation buffer) is saved at every point from time step 35 (616) to time step 54, thus exhausting the available memory M=20 with 20 correlation buffers. There is no need to store correlation information in step 55, as the information is contained in the forward simulation data itself. The cross-correlation may then be performed with the backwards propagated wavefield from the receiver at each of these points. Once the cross-correlation is completed for time steps 55 to 35, a second run 620 of the full simulation is performed from the zero time step. During the second run 620 of the full simulation, a correlation checkpoint is saved at every time step from time step 14 (622) to time step 33 (624), again exhausting M=20. The cross-correlation is repeated at each of these time steps using the correlation checkpoint at that time step, and then the procedure is repeated for a third run 626 of the full simulation. As can be seen, for equal resources, the optimal checkpointing strategy provides a substantial savings in calculation time, with only 101 forward wave propagation steps performed, versus 209 forward wave propagation steps for the Griewank checkpointing procedure.

In summary of FIG. 6B, the optimum strategy of the present invention for C=1, which may be determined by trying all combinations of $n_S$ and $n_C$ that that satisfy Eqn. 7, and selecting the one (or one of several) that gives the lowest value for J using Equation 6, turns out to be satisfied by using no full state buffers at all, but rather using the available memory M=20 entirely for correlation buffers. As will be seen next in discussion of FIG. 6C, an optimum strategy for a greater value of C (C=2) involves using one full state buffer and five correlation buffers at a time.

Even if the storage space for a correlation checkpoint is closer in size to that required for a full state checkpoint, the optimal checkpointing procedure may provide a substantial savings. For example, FIG. 6C shows an optimal checkpointing run in the same amount of memory as in 6A and 6B, but with a 5 to 1 relationship in size between a full state checkpoint and a correlation checkpoint. The procedure is generally the same as in 6B, but a full state checkpoint 628 is saved during a first full simulation run 630. During the first full simulation run, correlation checkpoints are saved between time step 49 (632) and time step 54 (634). The cross-correlation may then be performed at time step 55, and then with each of the values between time steps 54 and 49. The full simulation run is repeated from time step 31 (628) three more times, as indicated by reference number 636, and the cross-correlation is run at each time step. The memory is freed and three final full simulation runs 638 are performed from the zero time step, with cross-correlations performed for each of the saved correlation checkpoints. As can be seen from 6C, the forward wave propagation steps is only 147 for this situation, which is still significantly less that 209 forward wave propagation steps of Griewank checkpointing.

The optimal checkpointing technology may provide between 10 percent to over 400 percent speedup for RTM over the earlier Griewank checkpointing strategy, depending on the computer hardware environment and problem size for a given RTM application. Further, the checkpointing strategy discussed herein is not limited to direct correlations, but may be used for correlations in which a current state is dependent on a past state, as may be needed with respect to some FWI gradient computations and some automatic differentiation formulae.

FIGS. 7A-C are schematic diagrams comparing checkpointing for a standard correlation versus checkpointing when a past state in adjoint computation influences cross-correlation with a current state in forward computation, in accordance with exemplary embodiments of the present techniques. FIG. 7A illustrates a standard correlation condition, while FIG. 7B illustrates a standard correlation condition in addition to a shifted correlation condition, for example, when running reservoir simulations in which past conditions influence current conditions. FIG. 7C illustrates the application of the optimal checkpointing strategy for a case having 12 steps, a memory of 6, and in which C=2 and S=3. In FIGS. 7A-C, an upward arrow 702 represents forward computation and a downward arrow 704 represents an adjoint simulation, e.g., in which values calculated at a previous time step influences values calculated at a later time step. A horizontal bi-direction arrow 706 represents a standard correlation condition and a diagonal bi-direction arrow 708 represents a shifted correlation condition. Further, a bold horizontal line 710 represents a full state checkpoint with size S, and a dotted horizontal line 712 represents a correlation checkpoint with size C.

For many applications (e.g., reverse time migration or some of the gradient computation algorithms), it is only required to correlate the corresponding states $$\text{(i.e., } g = \sum_{i=0}^{n} \Re_1(s_i, \bar{s}_i)\text{)}$$

as shown in FIG. 7A). However, in some cases (such as for some gradient computation algorithms used in reservoir simulations), we need to correlate not only the corresponding state but also the neighboring state $$\text{(i.e., } g = \sum_{i=0}^{n} [\Re_1(s_i, \bar{s}_i) + \Re_2(s_i, \bar{s}_{i+1})]\text{)}$$

as shown in FIG. 7B). In exemplary embodiments of the present technique, the optimal checkpointing strategy is modified to work for the latter case as demonstrated in FIG. 7C.

Implementation of the optimal checkpointing strategy in the way described in FIG. 7C provides a minimum memory use. However, three types of correlation are used, i.e., correlating the adjoint wavefield with a forward wavefield, correlating the adjoint wavefield with a snapshot buffer in storage, and correlating the adjoint wavefield with a correlation buffer in storage). This may be better understood by considering the cross-correlation problem as a chain-reverse problem. Embodiments of the present techniques may provide a more efficient way to reverse a chain calculation that correlates results from a forward simulation with results from a backward, or adjoint, simulation, e.g., a reversed chain. It can be applied for standard cross-correlation as illustrated in FIG. 7A. It can also be applied to modified cross-correlation as illustrated in FIG. 7B and more detail in FIG. 7C. Other cross-correlation conditions may also benefit from the present technique so long as the implementation is based on using a reversed chain.

Extension of the Optimal Checkpointing to Two Levels of Storage with Different Access Speeds In addition to allowing for the storage of either full state checkpoints or correlation checkpoints, exemplary embodiments of the present techniques can also optimize the storage of checkpoints based on the speed of the storage available. In present computing architectures, it is common to have multiple levels of storage with different access rates. For example, computations may be performed on graphical processing units (GPUs) using the GPU memory (the fastest storage), or in CPU memory, solid state disk memory, and disk storage (the slowest storage). To simplify the explanation of this concept, two levels of storage may be assumed, e.g., CPU memory and disk.

In determining the optimal distribution of checkpoints, two assumptions may be made. First, it can be assumed that the fast storage with size $M^F$ requires a cost of $W_S^F$, $W_C^F$ for writing a full state checkpoint or a correlation checkpoint, respectively, and a cost of $R_S^F$, $R_C^F$ for reading a full state checkpoint or a correlation checkpoint, respectively. Further, it can be assumed that the slow storage (with size $M^S$) requires cost $W_S^S$, $W_C^S$ for writing a full state checkpoint or a correlation checkpoint, respectively, and cost $R_S^S$, $R_C^S$ for reading a full state checkpoint or a correlation checkpoint, respectively. In addition, it may be assumed that the computational effort for evolving any state to the next state is one, the full state checkpoint is of size S, and the correlation checkpoint is of size C.

Similar to before, the cost function may be defined as shown in Eqn. 10. The cost function on the left side of the equation is the minimum of the three choices listed on the right hand side.

$$J^*(n, M^F, M^S) = \min \begin{cases} J^*_{no\_cp}(n, M^F, M^S) \\ \min_{k=1,n-1} [k + W_S^F + J^F(n-k, M^F - S, M^S) + R_C^F + R_S^* + J^*(k-1, M^F, M^S)] \\ \min_{k=1,n-1} [k + W_S^S + J^S(n-k, M^F, M^S - S) + R_C^S + R_S^* + J^*(k-1, M^F, M^S)] \end{cases}$$

Eqn. 10

In Eqn. 10, * can be replaced with F or S to indicate whether the starting checkpoint is in fast storage or slow storage. Thus, $J^F(n,M^F,M^S)$ is the cost of cross-correlating n states with $M^F$ fast storage and $M^S$ slow storage for the case in which the first state in fast storage (i.e. if the first state needs to be recovered for recomputation, that information is in fast storage). The term, $J^S(n,M^F,M^S)$, is similar except that the first state in slow storage $J_{no\_cp}^F(n,M^F,M^S)$, and $J_{no\_cp}^S(n,M^F,M^S)$, follow the same definitions with the constraint that no full state checkpoints are allowed and, thus, only correlation checkpoints are stored. In addition, it can be noted that $R_C^F$ or $R_C^S$ is used for the fourth term in the second and third lines, instead of $R_S^F$ or $R_S^S$, because even though a full state checkpoint is in storage, only the correlation buffer portion of the full state checkpoint is read if the purpose is not to restart the simulation. However, this may depend on the actual implementation cost of recovering a correlation buffer of a stored full state checkpoint.

The computation of the cost function, $J^*_{no\_cp}(n,M^F,M^S)$, is more complicated than for the explicit form $J_{mo\_cp}(n,M)$, used in the one storage case. However, it may be performed using a similar recursion technique, as shown in Eqn. 11.

$$J^*_{no\_cp}(n, M^F, M^S) = \min_{i=0,M^F/C, j=0,M^S/C} \begin{pmatrix} n + i + j + i(W_c^F + R_c^F) + j(W_s^F + R_s^F) + \\ R_s^* + J^*_{no\_cp}(n-1-i-j, M^F, M^S) \end{pmatrix}$$

Eqn. 11

In Eqn. 11, i and j are the number of correlation buffers we want to use. The formulation is simplified by not expressing the fact that n−1−i−j≥0. Moreover, for the case that n−1−i−j=0, the second line in the minimum equation would not be counted any more. As discussed further below, $J^*_{no\_cp}(n,M^F, M^S)$ can be explicitly evaluated instead of relying on the above recursive formulation.

The results of determining optimal checkpoints in storage having two different access speeds are shown in FIGS. 8 and 9. For the example shown in FIGS. 8 and 9, the cost of accessing fast memory is assumed to be zero (i.e., $W_c^F=R_c^F=W_s^F=R_s^F=0$) for simplicity of explanation. However, the techniques described herein work for any implementations having a non-zero access cost to fast storage. Further, a long horizontal line represents a full state checkpoint, a short horizontal line represents a correlation checkpoint, and any line having a diamond at the end is stored in slow memory.

FIGS. 8A-E are schematic diagrams illustrating a number of situations in which the amount of fast and slow memory is varied, while the storage space used for each type of checkpoint remains the same, in accordance with exemplary embodiments of the present techniques. In FIGS. 8A-E, the speed for the slow memory is assumed to be $W_c^S=R_c^S=W_s^S=R_s^S=0.2$. The amount of storage space each type of checkpoint uses is assumed to be C=S=2 (matching the Griewank assumption). In FIG. 8A, the amount of memory is $M^F=3$ and $M^S=0$. In 8B, $M^F=2$ and $M^S=3$. In 8C, $M^F=2$ and $M^S=12$. In 8D, $M^F=14$ and $M^S=0$. Finally, in 8E, $M^F=3$ and $M^S=20$. As can be seen in FIGS. 8A-E, the amount and types of storage present can have a substantial effect on the outcome of the optimization. For example, in FIGS. 8C and 8D, the amount of total storage is the same, but the difference in storage speed causes a difference in the obtained optimal checkpointing strategy.

Generally, the costs for accessing storage (i.e. time for I/O) will differ based on the size of information. For example, as discussed herein, the storage used for a full state checkpoint may be substantially greater than that used for a correlation checkpoint in the case S is substantially greater than C.

FIGS. 9A-E are schematic diagrams illustrating a number of situations in which the amount of fast and slow memory is varied, wherein the storage space used for a correlation checkpoint is two and a full state checkpoint is three, in accordance with exemplary embodiments of the present techniques. Thus, in FIGS. 9A-E, $W_c^S = R_c^S = 1.0$, $W_s^S = R_s^S = 1.5$, C=2, and S=3. In FIG. 9A the amount of memory is $M^F$=3 and $M^S$=0. In 9B, $M^F$=2 and $M^S$=3. In 9C, $M^F$=2 and $M^S$=12. In 9D, $M^F$=14 and $M^S$=0. Finally, in 9E, $M^F$=3 and $M^S$=20. It can be noted that the amounts of memory used in each of FIGS. 9(a) through (e) corresponds to the amount of memory used in each of FIGS. 8A through E, showing the change in strategy that occurs when the memory utilization is different for full state checkpoints versus correlation checkpoints.

The comparison of FIGS. 8E and 9E illustrates that the penalty of using the slow storage can completely change the strategy, even though the total storage is apparently large enough for both cases. Thus, performing RTM with checkpointing to a very large disk can be slower than the same using checkpointing to a much smaller number of distributed RAM buffers on a parallel computer.

Table 2 provides a comparison of the solution time (including both forward and adjoint computation) between the optimal checkpoint techniques disclosed herein and the Griewank checkpoint strategy. In this example, 1000 states are being cross-correlated, C=1 Gb and S=10 Gb. Further, different combinations of storage are shown, and the access costs are assumed to be $W_c^S = R_c^S = 2s$ and $W_s^S = 5s$.

TABLE 2

Solution costs comparison between optimal checkpointing and Griewank checkpointing with ($W_c^S = R_c^S = 2s$, $W_s^S = R_s^S = 5s$), C = 1 Gb, S =10 Gb, and n = 1000.

| Hardware Storage | Checkpointing Strategy | Solution time |
| --- | --- | --- |
| 20 G memory | Griewank | 3.66 hours |
| 20 G memory | Optimal | 2.75 hours |
| 200 G disk | Griewank | 3.47 hours |
| 200 G disk | Optimal | 1.89 hours |
| 20 G memory & 200 G disk | Optimal | 1.07 hours |
| 200 G memory | Griewank | 1.04 hours |
| 200 G memory | Optimal | 47 minutes |
| Infinite memory | | 33 minutes |

Explicit Evaluation of Costs

Instead of using a recursive formulation, $J^*_{nocp}(n, M^F, M^S)$ can be determined explicitly. To reach the solution, consider $J^*_{nocp}(n, m, M^F, M^S)$, which is the cost of cross-correlating n steps by m forward sweeps using no full state checkpoints with state 0 in * storage (either F or S) and a memory constraint of $M^F, M^S$. Thus, the procedure shown in Eqn. 12 can be used to determine the cost with storing full state checkpoints.

$$n_C^F = M^F/C, n_C^S = M^S/C,$$ Eqn. 12

$$n^F = \min(n-m, mn_C^F), t^F = n^F/n_C^F, r^F = n^F - S^F n_C^F$$

$$n^S = \min(n-m-n^F, mn_C^S), t^S = n^S/n_C^S, r^S = n^S - t^S n_C^S$$

$$J_0 = (m-1)R_S^* + \frac{m(m+1)}{2}$$

$$J_1 = J_0 + \frac{t^F(t^F+1)}{2}n_C^F + r^F(t^F+1) + n^F(W_C^F + R_C^F)$$

-continued $$J^*_{nocp}(n, m, M^F, M^S) = J_1 + \frac{t^S(t^S+1)}{2}n_C^S + r^S(t^S+1) + n^S(W_C^S + R_C^S)$$

The minimum may then be determined from the formulae shown in Eqn. 13, as shown in Eqn. 13.

$$J^*_{nocp}(n, M^F, M^S) = \min_m J^*_{nocp}(n, m, M^F, M^S)$$ Eqn. 13

To minimize $J^*_{nocp}(n,m,M^F,M^S)$, three cases can be considered. First, no storage at all may be used, in which m=n. Second, using only fast storage may be used, which provides the formula in Eqn. 14.

$$m \geq \frac{n}{n_C^F + 1},$$ Eqn. 14

$$J^*_{nocp}(n, m, M^F, M^S) \approx (m-1)R_S^* + \frac{m(m+1)}{2} +$$

$$\frac{(n-m)(n+n_C^F-m)}{2n_C^F} + (n-m)(W_C^F + R_C^F) =$$

$$\left(\frac{1}{2} + \frac{1}{2n_C^F}\right)m^2 + \left(-R_S^* + \frac{1}{2} - \frac{2n+n_C^F}{2n_C^F} - (W_C^F + R_C^F)\right)m + \ldots \Rightarrow$$

$$m_{opt}^F \approx \frac{\left(R_S^* + \frac{n}{n_C^F} + (W_C^F + R_C^F)\right)}{\left(1 + \frac{1}{n_C^F}\right)}.$$

In a third case, both fast storage and slow storage are used and $$m \geq \frac{n}{n_C^F + n_C^S + 1}.$$

In this case, the speed is improved by using as much fast storage as possible (otherwise there is no need to use the slow storage). This case provides the formula in Eqn. 15.

$$n_C^F = M^F/C, n_C^S = M^S/C,$$ Eqn. 15

$$n^F = \min(n-m, mn_C^F), t^F = n^F/n_C^F, r^F = n^F - S^F n_C^F$$

$$n^S = \min(n-m-n^F, mn_C^S), t^S = n^S/n_C^S, r^S = n^S - t^S n_C^S$$

$$J^*_{nocp}(n, m, M^F, M^S) \approx$$

$$(m-1)R_S^* + \frac{m(m+1)}{2} + \frac{m(m+1)}{2}n_C^F + mn_C^F(W_C^F + R_C^F) +$$

$$\frac{[n - (1+n_C^F)m][n + n_C^S - (1+n_C^F)m]}{2n_C^S} + [n - (1+n_C^F)m]$$

$$(W_C^S + R_C^S) \ldots = \left(\frac{1}{2} + \frac{1}{2}n_C^F + \frac{(1+n_C^F)^2}{2n_C^S}\right)m^2 +$$

$$\left(-R_S^* + \frac{1}{2} + \frac{1}{2}n_C^F + n_C^F(W_C^F + R_C^F) - \frac{(2n+n_C^S)(1+n_C^F)}{2n_C^S} - \right.$$

$$\left. (1+n_C^F)(W_C^S + R_C^S)\right)m + \ldots \Rightarrow m_{opt}^{F\&S} \approx$$

-continued $$\frac{\left(R_S^* + \frac{n(1+n_C^F)}{n_C^S} + (1+n_C^F)(W_C^S + R_C^S) - n_C^F(W_C^F + R_C^F)\right)}{\left(1 + n_C^F + \frac{(1+n_C^F)^2}{n_C^S}\right)}$$

Based on these cases, m can be searched around the 5 critical values shown in Eqn. 16.

$$n \geq m_{opt}^F \geq \frac{n}{n_C^F + 1} \geq m_{opt}^{F\&S} \geq \frac{n}{n_C^F + n_C^S + 1} \qquad \text{Eqn. 16}$$

Eqn. 16 may be used to get the best m and correspond) $J^*_{nocp}(n,M^F,M^S)$. Proper bounds should be considered while applying these above formulations. For example if $m_{opt}^F$ is not between $$\frac{n}{n_C^F + 1}$$

and n, then it doesn't need to considered.

Efficient Computation of the Optimal Checkpointing Strategy.

Although $J^*_{no\_cp}(n,M^F,M^S)$ can be explicitly determined, a recursive formulation is still used to find $J^*(n,M^F,M^S)$. Using the recursive formulation, the cost for correlating n states using $n^F$ fast storage buffers ($n^F=M^F/S$) and $n^S$ ($n^S=M^S/S$) slow storage buffers can be pre-determined with an effort $\sim n^2 \times n^F \times n^S$. Here the symbol "~" is used to mean "on the order of". This pre-tabulated data needs a storage of size $\sim n \times n^F \times n^S$. Once we have the pre-tabulated cost data, we only need effort $\sim n^2$ to compute the optimal two-level storage checkpointing strategy for given capacity constraints of the two types of storage. The most computational intensive step is the pre-computation of cost table, $J^*(n,M^F,M^S)$(for correlating up-to n states with storage constraint $M^F,M^S$), with effort $\sim n^2 \times n^F \times n^S$. Although it is only a one time effort, it is of value to make this step efficient. In an exemplary embodiment, this may be performed using an additional tabulation of k (the first full state checkpoint location). After the additional tabulation of k, the actual determination of checkpointing strategy will take an effort of $\sim n$, instead of $\sim n^2$. The techniques and formulations discussed above may be used to determine optimal numbers and locations for checkpoints, as discussed with respect to the methods shown in FIGS. 10-14.

Figure 10:
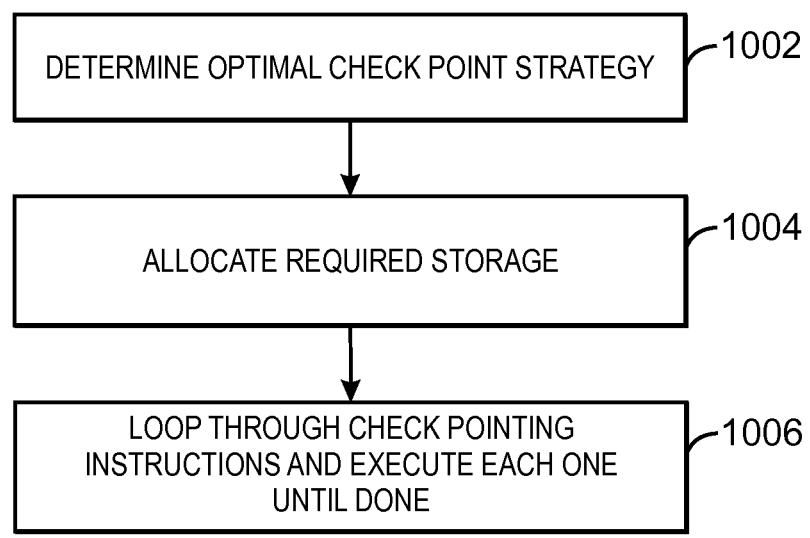
FIG. 10 is a process flow diagram of a method for implementing a simulation which uses correlation checkpoints, in accordance with exemplary embodiments of the present techniques.

FIG. 10 is a process flow diagram for implementing a simulation, which uses correlation checkpoints, in accordance with exemplary embodiments of the present techniques. The process begins at block 1002 with the calculation of the optimal checkpointing strategy. This calculation may be performed using the formulations discussed above. At block 1004, the required storage is allocated. This may be limited by the storage available, the size of the full state checkpoints and correlation checkpoints, and the like. At block 1006, the checkpointing strategy and correlation calculations are implemented, for example, by looping through a series of checkpointing instructions.

For example, a checkpointing strategy may be expressed in the form of an ordered list of instructions. Table 3, below, provides an example of an instruction set that may be used for implementing a checkpointing strategy. In this example, an "instruction number" is associated with a sequence of operations to be done when that "instruction number" is encountered. There can be multiple ways to define such an instruction set but having one version such as given below is sufficient to enable the technology.

TABLE 3

Exemplary instructions for implementing a checkpointing strategy

| Instruction number | Instruction |
|---|---|
| −1 | Exit the instruction loop. All done. |
| 0 | Do a forward time step N times and then save a state buffer in the specified memory type.<br>For example, (0 74 S) says do instruction type zero and forward time step 74 steps and then save a state buffer in slow memory. |
| 1 | Do an adjoint backward time step and correlate with the correlation part of the forward simulation state information that is in memory for the specified storage type. Release storage space for this memory type. Reload the forward simulation state from the specified memory type.<br>For example, (1 S F) means do an adjoint time step and correlate. Then release storage space from slow memory from the last state buffer saved there. Then reload the forward simulation from the last state buffer saved in fast memory. |
| 2 | Do a forward time step N times and store the specified number of buffers in fast and slow storage choosing the intervals at the end of the forward simulation time steps. Then do adjoint time steps and correlate information for each of the saved correlation buffers. The release the storage space for the saved correlation buffers.<br>For example, (2 55 10F 4S) means forward compute 55 time steps and save fast correlation buffers for steps 45-54 in fast storage and save correlation buffers for steps 41-44 in slow storage. Note that the correlation information for step 55 is available in the forward simulation data for step 55 and does not have to be saved separately. |
| 3 | Reload the forward wavefield from the last saved state buffer in the specified storage type.<br>For example, (3 F) reloads the forward wavefield state from the last state buffer stored in fast storage. |

An example of the use of the instructions to implement a checkpointing procedure is presented below. In this case, the correlation has 266 time steps with S=12, C=1, $M_F$=10, $M_S$=40, an access cost of $R_s$=$W_s$=2 and $R_c$=$W_c$=0.6 for slow storage, and zero access cost to fast storage.

(0 74 S), (0 71 S), (0 66 S), (2 55 10F 4S), (3 S), (2 40 10F 4S), (3 S), (2 25 10F 3S), (3 S), (2 11 10F 0S), (1 S S), (2 65 10F 16S), (3 S), (2 38 10F 16S), (3 S), (2 11 10F 0S), (1 S S), (2 70 10F 28S), (3 S, 2 31 10F 9S), (3 S), (2 11 10F 0S), (1 S F), (2 73 10F 40S), (3 F), (2 22 10F 0S), (3 F), (2 11 10F 0S),

Appendices A and B are source code listings of two examples of a computer program that could be used to generate an optimal checkpointing strategy such as that embodied by the above list of instructions, given only the parameters specified above, i.e. S, C, etc. The programs of Appendices A and B use the checkpointing strategy of the present invention; however, where it would be optimal, the program will select Griewank checkpointing.

Figures 11, 11A, 11B:
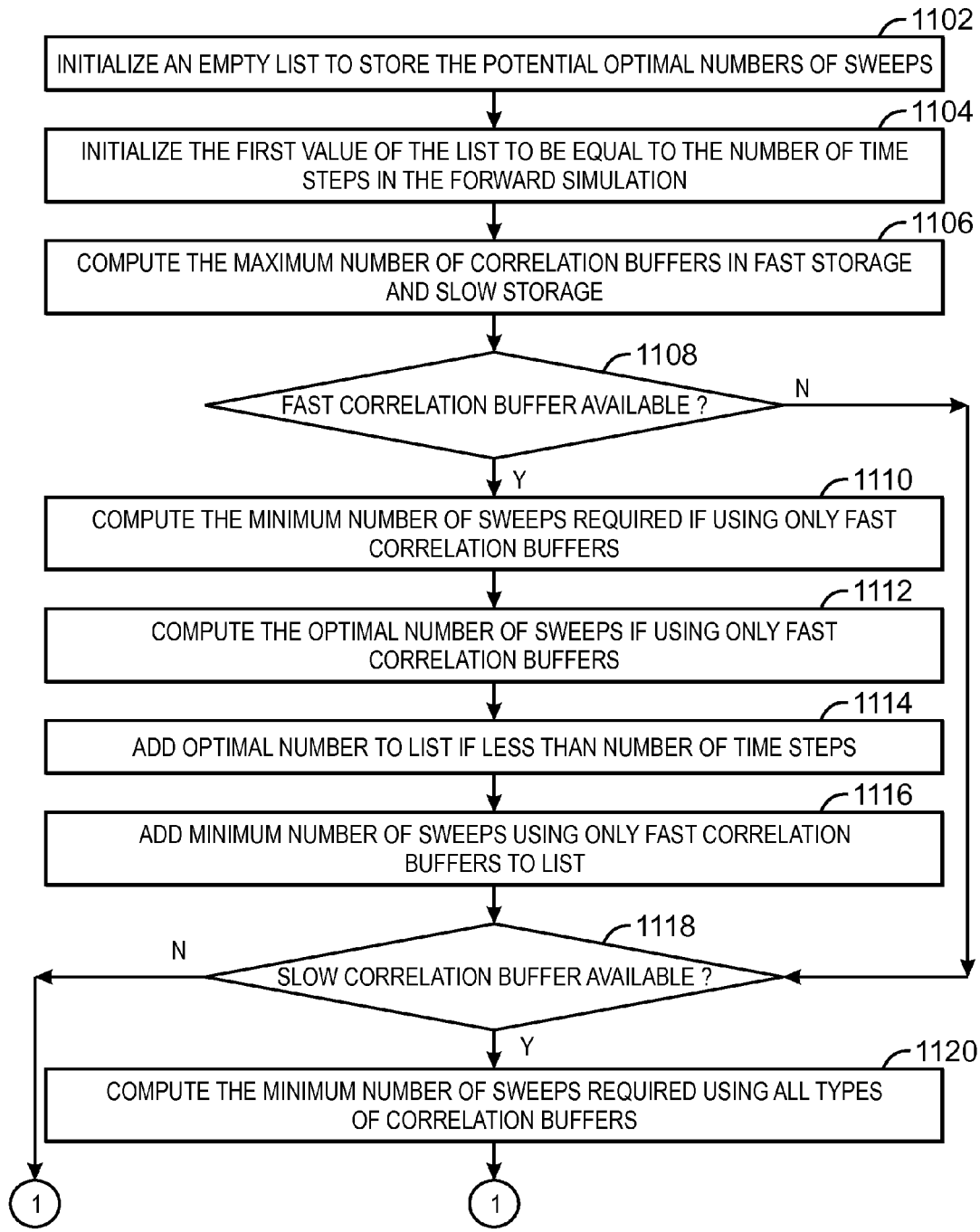
FIG. 11 is a process flow diagram of a method for computing a minimum cost without any checkpoints, in accordance with exemplary embodiments of the present techniques.
Figure 11B:
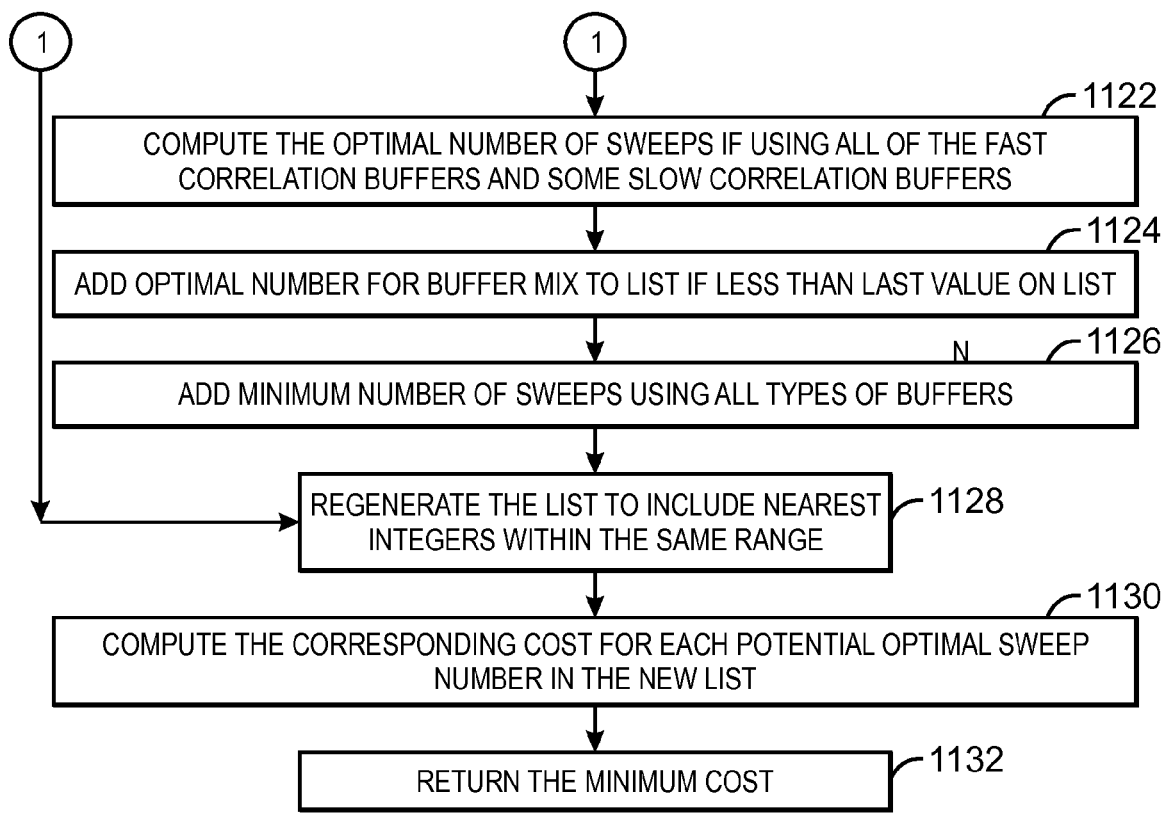

FIG. 11 is a process flow diagram of a method for computing a minimum cost without any full state checkpoints, in accordance with exemplary embodiments of the present techniques. The method begins at block 1102 with the initialization of an empty list to store the potential optimal number of sweeps. At block 1104, the first value of this list is initialized to be equal to n, the number of time steps in the forward simulation.

At block 1106, the maximum number of correlation buffers that can be held in fast storage and slow storage is calculated by the formulas $n_c^F = M^F/C$ and $n_c^S = M^S/C$. At block 1108, a determination is made as to whether at least one fast correlation checkpoint buffer is available, i.e., $n_c^F \geq 1$. If no fast correlation checkpoint buffers are available, process flow proceeds to block 1118.

If there is at least one fast correlation buffer available, then at block 1110, the minimum number of sweeps required if using only fast correlation buffers is computed using the formula $m^F = \lceil n/(n_c^F+1) \rceil$. At block 1112, the optimal number of sweeps if using only fast correlation buffers is computed using the formula $$m_{opt}^F = \frac{\left(R_S^* + \frac{n}{n_C^F} + (W_C^F + R_C^F)\right)}{\left(1 + \frac{1}{n_C^F}\right)}.$$

At block 1114, the value of $m_{opt}^F$ is added to the list if and only if $m^F < m_{opt} < n$. At block 1116, $m^F$ is added to the list.

At block 1118, a determination is made as to whether at least one slow correlation checkpoint buffer is available, i.e., $n_c^S \geq 1$. If no slow correlation checkpoint buffers are available, process flow proceeds to block 1128.

If there is at least one slow correlation buffer available, at block 1120, the minimum number of sweeps required using all types of correlation buffers is computed using the formula $m^{F\&S} = \lceil n/(n_c^F+n_c^S+1) \rceil$. At block 1122, the optimal number of sweeps if all of the fast correlation buffers and at least one correlation buffer is computed using the formula $$m_{opt}^{F\&S} = \frac{\left(R_S^* + \frac{n(1+n_C^F)}{n_C^S} + (1+n_C^F)(W_C^S + R_C^S) - n_C^F(W_C^F + R_C^F)\right)}{\left(1 + n_C^F + \frac{(1+n_C^F)^2}{n_C^S}\right)}.$$

At block 1124, $m_{opt}^{F\&S}$ is added to the list if and only if $m^{F\&S} < m_{opt}^{F\&S} <$ last value in list. At block 1126, $m^{F\&S}$ is added to the list.

At block 1128, the list is regenerated to include the nearest integers within the same range. For example, if the original list is (17, 10, 1), then the new list should be (17,16, 11,10,9, 2,1). This may help to account for the rounding of real numbers to integer numbers.

At block 1130, the corresponding cost of each potential optimal sweep number in the new list is computed using the following formulations.

$$n^F = \min(n-m, mn_C^F), t^F = n^F/n_C^F, r^F = n^F - S^F n_C^F$$

$$n^S = \min(n-m-n^F, mn_C^S), t^S = n^S/n_C^S, r^S = n^S - t^S n_C^S$$

$$J_0 = (m-1)R_S^* + \frac{m(m+1)}{2}$$

$$J_1 = J_0 + \frac{t^F(t^F+1)}{2} n_C^F + r^F(t^F+1) + n^F(W_C^F + R_C^F)$$

$$J_{nocp}^*(n, m, M^F, M^S) = J_1 + \frac{t^S(t^S+1)}{2} n_C^S + r^S(t^S+1) + n^S(W_C^S + R_C^S)$$

where $m^{F\&S}$ is used to define $M^F$ and $M^S$ before using the preceding formulations. At block 1132, the minimum cost is returned.

Figure 12:
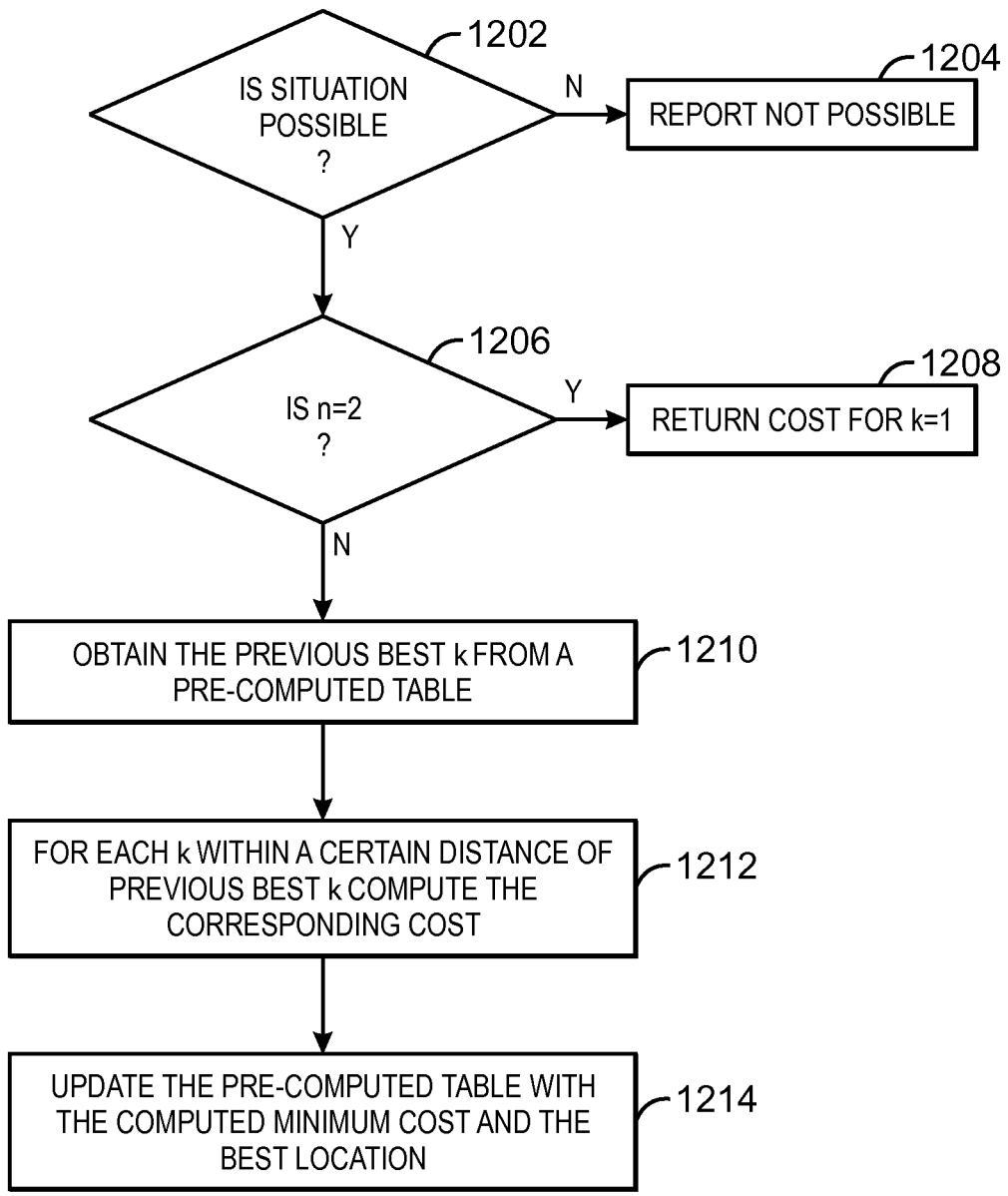
FIG. 12 is a process flow diagram of a method for computing a minimum cost and a best location for cross-correlating n states, in accordance with exemplary embodiments of the present techniques.

FIG. 12 is a process flow diagram of a method for computing the minimum cost and the best location for cross-correlating n states, in accordance with exemplary embodiments of the present techniques. The method assumes that nf_used fast memory checkpoint state buffers and ns_used slow memory checkpoint state buffers are already used and that the starting full state checkpoint is stored in StartType storage and the first full state checkpoint in stored in KType storage. (The italicized terms are used in C and C++ implementations of the present inventive method, and appear again in equations below.) StartType denotes the type of storage, fast or slow, associated with the full state checkpoint from which the forward simulation is initiated. KType denotes the type of storage, fast or slow, associated with the full state checkpoint to be stored at time index k. "StartType" can take on two values, F for fast memory or S for slow memory. "nf_used" is the number of fast memory checkpoint state buffers currently in use. The currently available fast memory for new checkpoints of either state or correlation information does not include the space for fast memory checkpoint state buffers currently in use. Likewise, "ns_used" is the number of slow memory checkpoint state buffers currently in use and the currently available slow memory does not include the space for the slow memory checkpoint state buffers currently in use.

At block 1202, a determination is made as to whether the situation is possible. If the situation is not possible, process flow proceeds to block 1204 where a huge cost (e.g., 1e10) is returned to identify that it is impossible.

At block 1206, a determination is made as to whether n=2. If so, then the best first full state checkpoint location must be 1, and the corresponding cost is returned at block 1208.

At block 1210, the previous best k is obtained from a pre-computed table. This value in the table is calculated for correlating n−1 states with the same memory constraint and the same starting full state checkpoint and first full state checkpoint storage-type requirement.

At block 1212, for each k within a certain distance, e.g., S/C+1, away from the previous best k, the corresponding cost should the first full state checkpoint be put at location k is computed. If the first full state checkpoint is required to be in fast storage (i.e., KType=F), the cost is given by the formula:

$$k+W_S^F+\bar{J}^F(n-k, nf\_used+1, ns\_used)+R_C^F+$$
$$R_S^{StartType}(k-1, nf\_used, ns\_use)]$$

If the first full state checkpoint is not required to be in fast storage, the cost is given by the formula:

$$k+W_S^S+\bar{J}^S(n-k, nf\_used, ns\_used+1)+R_C^S+$$
$$R_S^{StartType}+\bar{J}^{StartType}(k-1, nf\_used, ns\_used)]$$

In the equations above, the following definition:

$$\bar{J}(n, nf\_used, ns\_used)=J^*(n, M^F-nf\_used\times S, M^S-ns\_used\times S)$$

has been used to indicate that the storage is reduced by unit of S. At block 1214, the pre-computed table is updated with the computed minimum cost and the best location of the first checkpoint.

Figure 13:
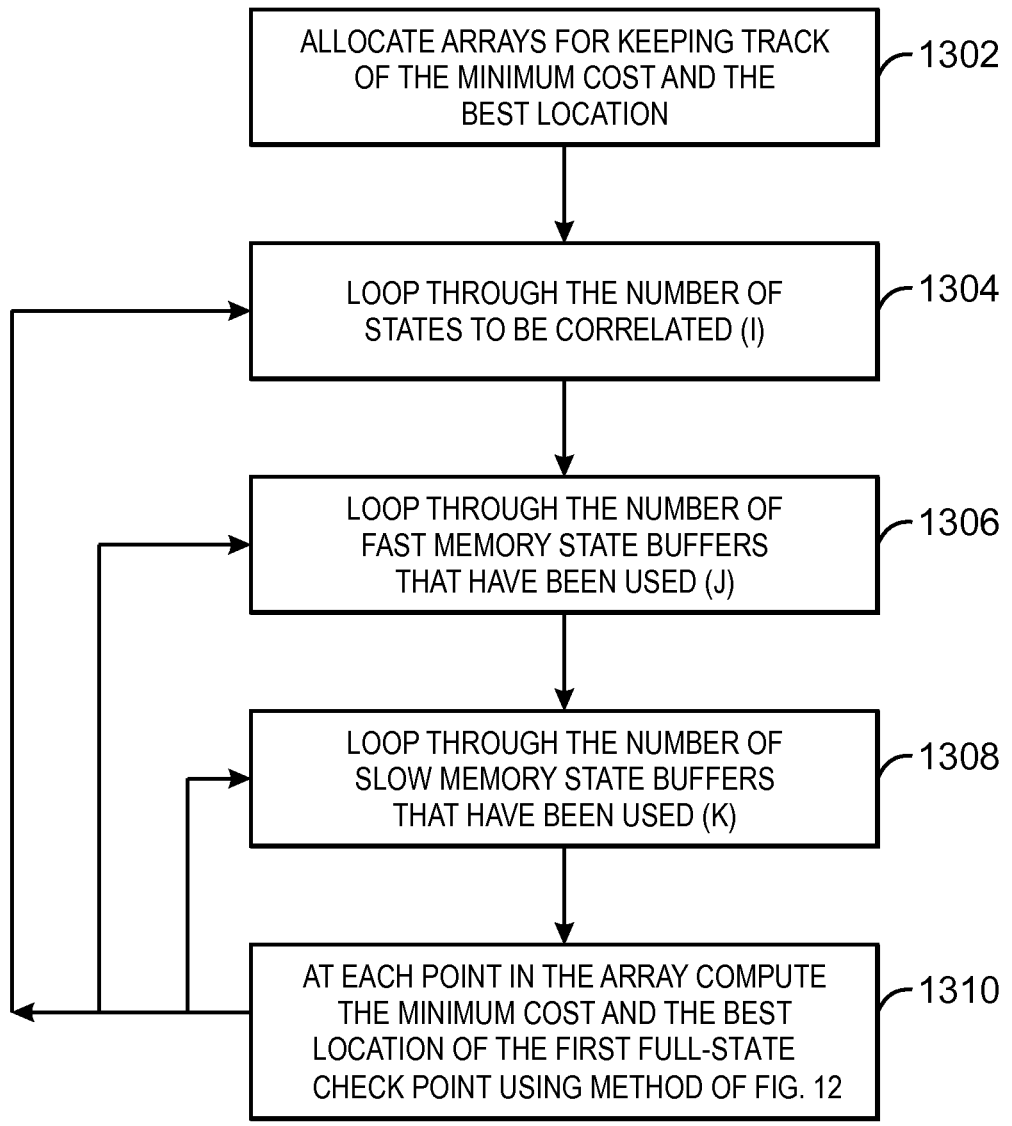
FIG. 13 is a process flow diagram showing how to pre-compute a table of minimum costs associated with a checkpoint taken at the optimal k location, in accordance with exemplary embodiments of the present techniques.

FIG. 13 is a process flow diagram showing how to pre-compute the table of minimum costs associated with a full state checkpoint taken at the optimal k location, in accordance with exemplary embodiments of the present techniques. The method begins at block 1302 with the allocation of arrays to store the table. For example, two five dimension arrays: J_with_cp[2][2][n][nfMax][nsMax] and BestK[2][2][n][nfMax][nsMax], may be allocated to keep track of the minimum cost and the best location of the first checkpoint. As part of the allocation, all values in the array are initialized to −1. In both arrays, the first dimension represents the storage type for the starting checkpoint. The second dimension represents the storage type for the first checkpoint. The third dimension represents the number of states to be correlated. The fourth dimension represents the maximum number of checkpoints in fast storage. The fifth dimension represents the maximum number of checkpoints in slow storage.

At block 1304, a counter is tracked for looping through I from 2 to n, where I represents the number of states to be correlated. At block 1306, another counter is tracked for looping through J from 0 to nfMax, where nfMax is the number of fast memory state buffers that have been used. At block 1308, a third counter is tracked for looping through K from 0 to nSMax, where nsMax is the number of slow memory state buffers that have been used.

At block 1310, the minimum cost and the best location of the first checkpoint are computed for cross-correlating I states with J fast memory full state checkpoint buffers, and with K slow memory full state checkpoint buffers already used for the 4 cases: 1) Starting with a full state checkpoint in fast storage, calculate the cost for a first full state checkpoint in slow storage. 2) Starting with a full state checkpoint in fast storage, calculate the cost for a first full state checkpoint in slow storage. 3) Starting with a checkpoint in slow storage, calculate the cost for a first full state checkpoint in fast storage. 4) Finally, starting with a full state checkpoint in slow storage, calculate the cost for a first full state checkpoint in slow storage. The obtained results are used to update the corresponding table entry for J_with_cp and BestK. Each of these four steps for block 1304 can be computed using the method of FIG. 12. The cost calculation 1212 requires knowledge of the cost of a full state store for the specified storage type, how many restores will be done for a given full state checkpoint at the specified time step, and the cost of a full state restore for the specified storage type. When $n_S \geq 2$, the above outlined process may be applied recursively to optimally locate additional full state checkpoints.

Figure 14:
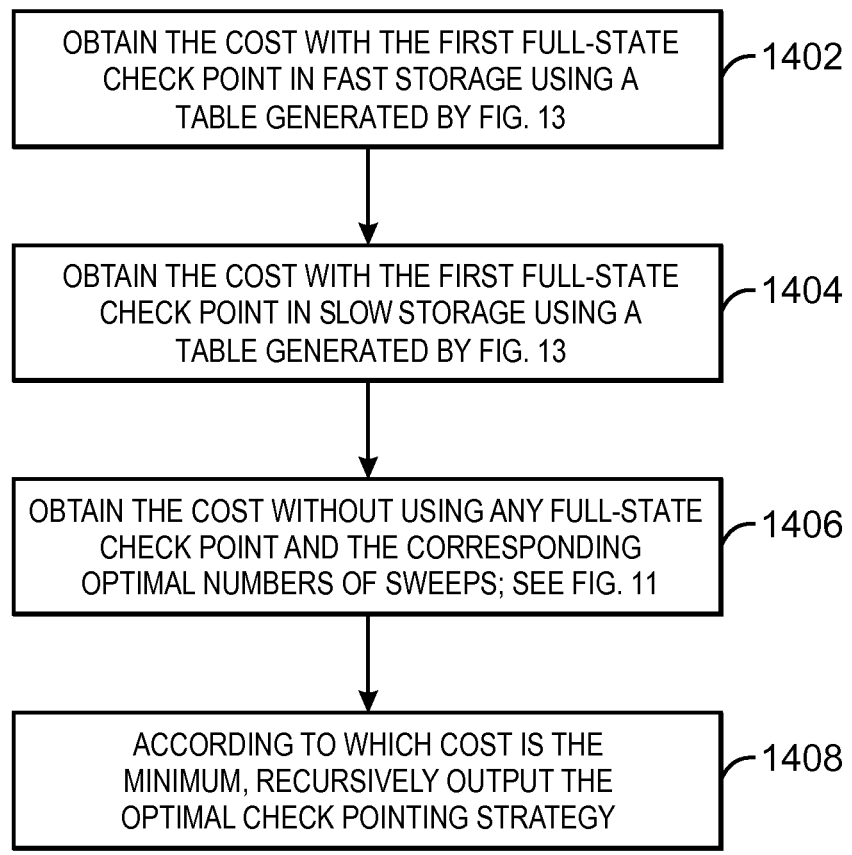
FIG. 14 is a process flow diagram of a method for computing minimum cost and optimal checkpointing strategy for correlating n states with of used fast memory state buffers and ns_used slow memory state buffers in the situation that the starting checkpoint is in StartType storage, in accordance with exemplary embodiments of the present techniques.

FIG. 14 is a process flow diagram of a method for computing minimum cost and optimal checkpointing strategy for correlating n states with nf_used fast memory state buffers and ns_used slow memory state buffers in the situation that the starting checkpoint is in StartType storage, in accordance with exemplary embodiments of the present techniques. The method begins at block 1402, where the cost associated with the first full state checkpoint in fast storage is obtained from table J_with_cp, and the corresponding best location of the full state checkpoint from table BestK. At block 1404, the cost with the first full state checkpoint in slow storage is obtained from table J_with_cp, and the corresponding best location of the checkpoint is obtained from table BestK. Tables generated by the method of FIG. 13 may be used at both block 1402 and block 1404. At block 1406, the cost without using any checkpoint, and the corresponding optimal number of sweeps, is determined (see FIG. 11). At block 1408, According to which cost (from step 1, 2 or 3) is the minimum, the optimal checkpointing strategy is recursively output.

Identification of Minimum Costs in Checkpointing Calculations

Figure 15:
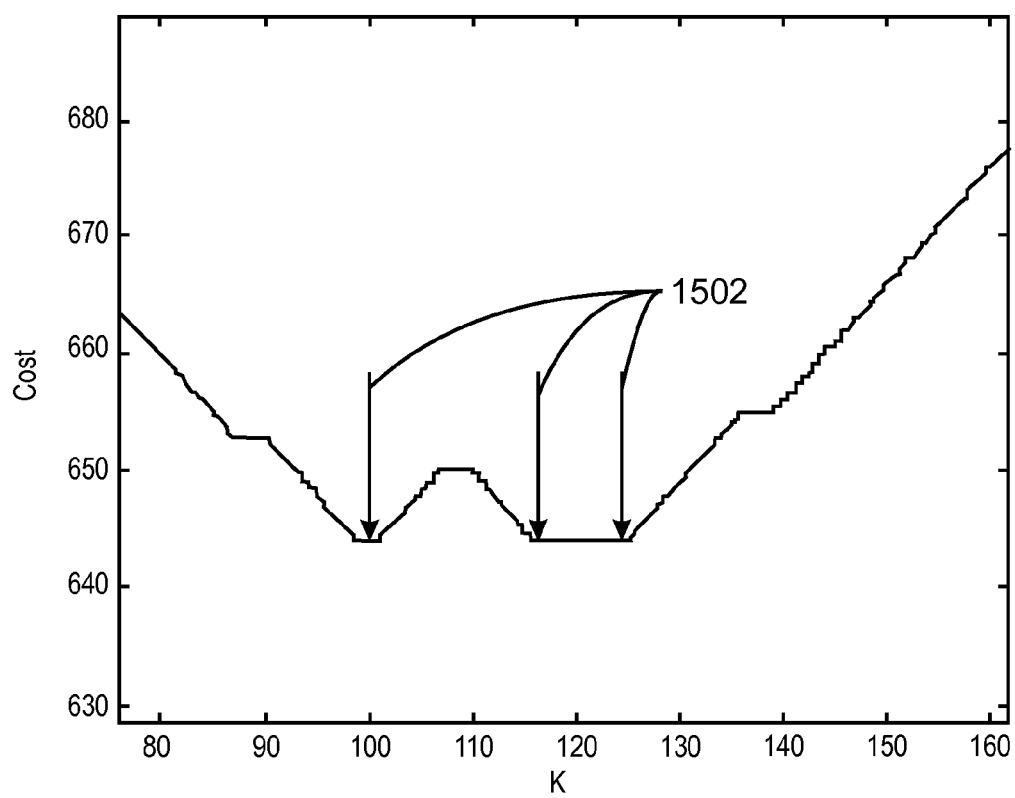
FIG. 15 is a graph showing the relation between the minimum cost and location of the first full state checkpoint (k) for the cross-correlation of 266 steps using four buffers when S/C=12, and Rs=Ws=Rc=Wc=0, in accordance with exemplary embodiments of the present techniques.

FIG. 15 is a graph showing the relation between the minimum cost and location of the first full state checkpoint (k) for the cross-correlation of 266 steps using four buffers when S/C=12, and Rs=Ws=Rc=Wc=0, in accordance with exemplary embodiments of the present techniques. In the special case of S/C=1 and Rs=Ws=Rc=Wc=0, the location of the optimal first checkpoint has an explicit form (as determined by the Griewank checkpointing strategy). However, once we have S>C, the location of the optimal first checkpoint becomes complicated even in the simple case that Rs=Ws=Rc=Wc=0 still holds. In the example shown in FIG. 15, there are three local minima 1502 for the choice of first checkpoint. When Rs, Ws, Rc, and Wc are not 0 anymore, the behavior becomes even more nonlinear as shown in FIG. 16.

Figure 16:
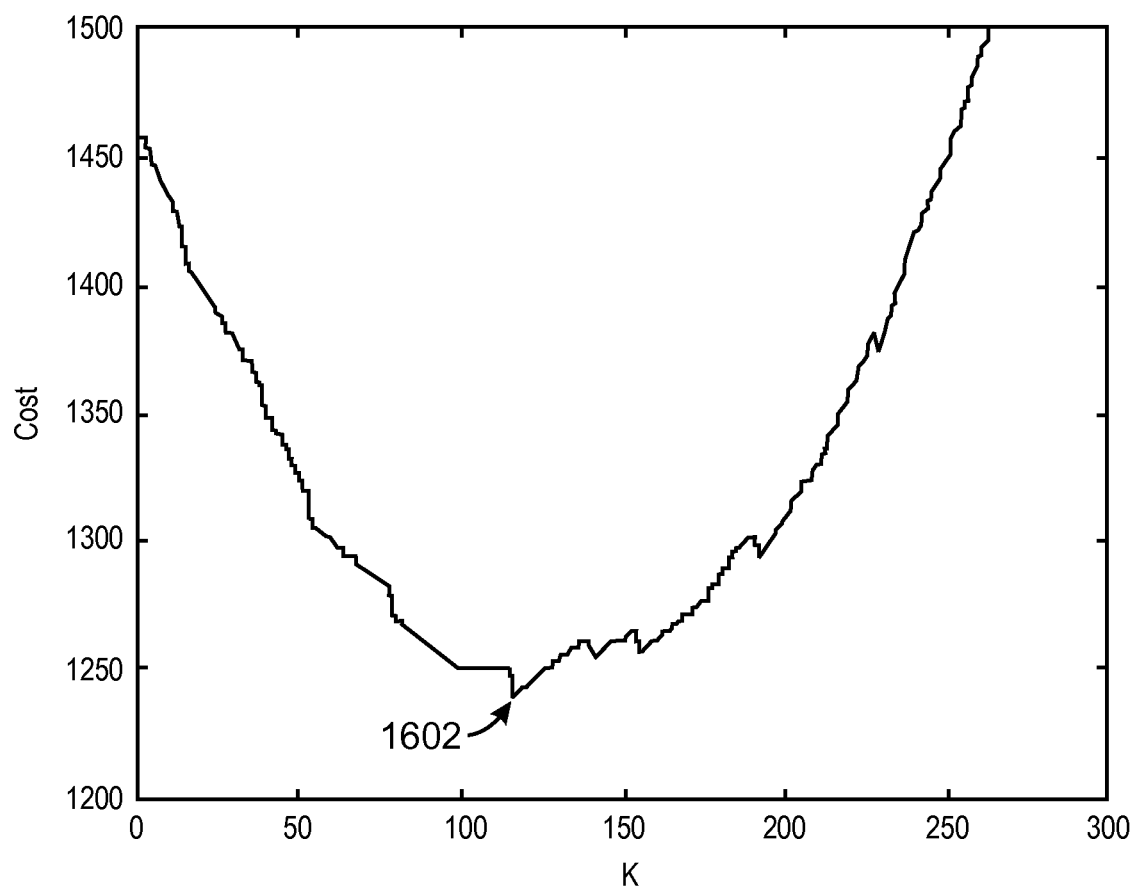
FIG. 16 is a graph showing the relation between the minimum cost and location of the first full state checkpoint for the cross-correlation of 266 steps using four buffers when S/C=12, Rs=Ws=12, and Rc=Wc=1, in accordance with exemplary embodiments of the present techniques.

FIG. 16 is a graph showing the relation between the minimum cost and location of the first full state checkpoint for the cross-correlation of 266 steps using four buffers when S/C=12, Rs=Ws=12, and Rc=Wc=1, in accordance with exemplary embodiments of the present techniques. In this example, the graph was generated assuming that recovering from forward simulation state zero required no effort. As can be seen from the graph in FIG. 16, the identification of a minimum 1602 may be complicated. One important observation from the numerical experiments with the recursive formulation is that while (1) keeping the available storage the same (i.e., $M^F$ and $M^S$ are the same) and (2) the starting full state checkpoint type and the first full state checkpoint type (i.e., in fast or slow storage) the same, the second local minimum gradually becomes the global minimum when increasing n. Another important observation is that the distance between the two local minimum is roughly within distance ~S/C+1 away. With these two observations, we can search the first checkpoint location (k) among a small number of possibilities. This leads to an algorithm, which pre-computes a cost table with an effort of only $\sim n \times n^F \times n^S$ as compared to $\sim n^2 \times n^F \times n^S$.

Searching only near the expected checkpoint location significantly reduces the strategy computation cost by a factor of ~n with some sacrifice of the strategy quality. However, this technique may provide a check-pointing strategy with additional cost less than 1% away from the optimal checkpointing strategy obtained from a full search.

For very large n, memory for cost and BestK tables and table computation time can become large. A practical implementation strategy for very large n can be to compute optimal tables for a reasonable size of $n_{max\_table}$ and then to switch to the Griewank full state checkpointing strategy to find BestK if $n > n_{max}$ table and to use the tables if $n < n_{max\ table}$. The Griewank value for BestK can be estimated without the need for a table. Usually this yields a check-pointing strategy that is only a few percent more expensive than the optimal one found with a full-sized table.

The Performance Uplift Obtained from the Optimal Checkpointing Strategy.

Figure 17:
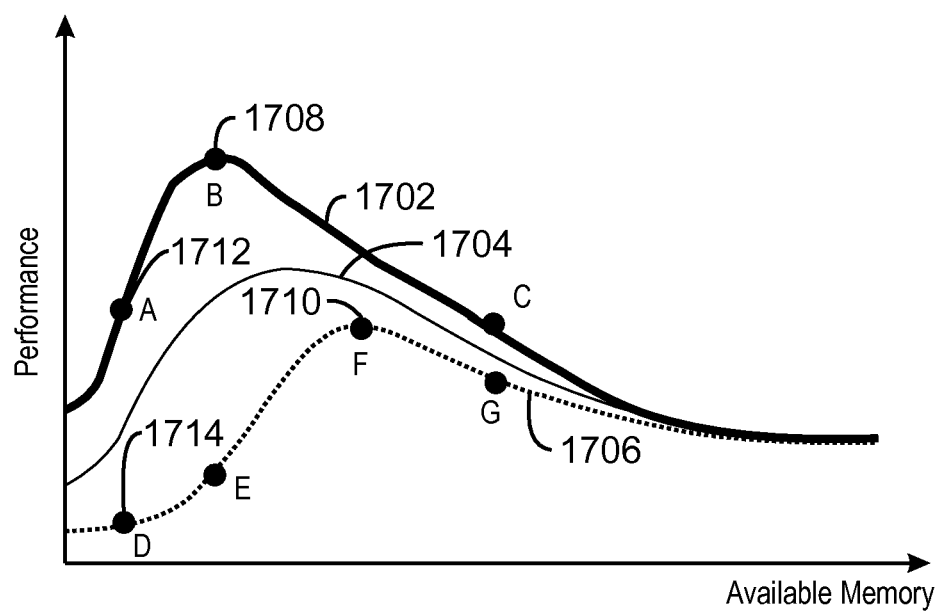
FIG. 17 is a graph showing the performance improvement of the optimal checkpointing strategy with both fast and slow storage, over optimal checkpointing strategy with only fast storage, and over Griewank checkpointing strategy, in accordance with exemplary embodiments of the present techniques

FIG. 17 is a graph 1700 showing the performance improvement of the optimal checkpointing strategy over checkpointing using the Griewank procedure, in accordance with exemplary embodiments of the present techniques. The relation between performance and available memory typically has a shape shown in FIG. 17. In the graph 1700, the top solid line 1702 is the optimal performance calculated for using two levels of storage, e.g., a fast storage and a slow storage. The middle solid line 1704 is the optimal performance calculated for using a single level of storage. The lower dotted line 1706 is the performance calculated for using Griewank checkpointing. As shown in the graph 1700, performance initially increases with more available storage (usually as more computational nodes are added), since less re-computation of full state checkpoints will be required.

However, after the available storage is beyond a certain point (e.g., point A 1708 or point F 1710), the scaling loss becomes dominant, and performance falls off. Scaling loss is a result of adding more computing units to a problem, wherein the efficiency of each computing unit is reduced due to the increased overhead caused by using multiple units, for example, communication between the units or between the units and storage systems. Scaling loss may be due to a lack of ideal scalability of the application. Further, the benefit from reduction of re-computation becomes marginal. The performance uplift from the optimal checkpointing strategy depends on the available storage. For example, if sufficient storage is available, the performance uplift of the optimal checkpointing over Griewank checkpointing can be the ratio between point A 1708 and point F 1710. If storage is constrained (which is usually the case), the performance uplift may be the ratio between point A 1712 and point D 1714.

Applications

The optimal checkpointing strategy of the present techniques may be used to obtain enhanced efficiency for any number of computationally-intensive large-storage processes, for example, using a table-driven software implementation. Generally, the processes that will benefit from the techniques involve a time-stepping forward simulation that is accessed in reverse-time order to correlate with a backward time stepping computation.

For example, in exemplary embodiments the optimal checkpointing procedure is used in seismic imaging applications. In these embodiments, the optimal checkpointing procedure may provide improved computational efficiency for prestack shot-record RTM, Prestack simultaneous source RTM, Prestack shot-record FWI Gradient, Prestack shot-record FWI Hessian, Prestack simultaneous source FWI Gradient, Prestack simultaneous source Hessian, and similar seismic calculations. The computer simulator in each of these applications may be based on a seismic wave equation, for example, using anisotropic visco-elastic physics. The recorded data may include particle velocity, pressure, stress, acceleration, or any combinations thereof Some tables for the time-reversal optimal checkpointing strategy can be precomputed and saved. In each of these applications, the forward time-stepping seismic simulation can apply different levels of physics ranging from simple constant-density acoustic, variable-density acoustic, visco-anisotropic acoustic, isotropic elastic, anisotropic elastic and up to fully anisotropic-visco-elastic simulation. The correlation of the forward simulation with adjoint simulations states generated from the measured data may be used to generate seismic images, to correct velocity models, estimate stiffness coefficients, estimate source wavelets, and estimate attenuation quality factors, among others.

It may be noted that the correlation step only requires that the source-excitation wavefield and the receiver backward-in-time propagated wavefield at the same time be cross-correlated and summed for all time steps. Thus, a propagation or simulation may be performed in a reverse time step order or in a forward time step order and the result is the same. The RTM example discussed above has a source excitation wavefield that is naturally accessible in a forward-time order accessed in reverse-time order while the receiver wavefield is marched backward in time. Alternatively, the optimal checkpointing strategy can also apply to implementations in which the receiver wavefield is checkpointed during backward-in-time propagation and then accessed in forward-time order to match the source excitation wavefield being forwardly propagated in time. Both implementations are covered by the methods described here.

In addition to these applications, the present techniques may be used for any number of other applications. For example, in an embodiment the optimal checkpointing strategy can be used for history matching of hydrocarbon reservoir simulations. In this application, the data collected from the reservoir may include fluid volumes and types produced from a well, bottom hole temperatures, and stratigraphic rock records, among others. The computer simulation may be based on a multi-phase expression of Darcy's law for fluid flow. The correlation may be used to adjust parameters such as porosity, permeability, fluid saturations, and pressure distributions, among others. The correlation may also be used to generate production predictions for the reservoir and for reservoir management tasks. Such tasks may include determining locations for new wells, and determining whether to converting producers to injectors, among others.

In another embodiment, the present techniques may be used for basin modeling. In this application, the stratigraphic rock record may be one of the measured parameters. The computer simulation is based on tectonic deformation of a basin and a model of the sedimentation processes that formed the basin. The output from the correlation may assist with the determination of sedimentation rates and accommodation space available as a function of position and geologic time. Further, the output may include the historical shape of the basin over geologic time and the history of depth of burial and thermal history for target reservoirs and source rocks.

Another embodiment of the present techniques may be used in determining heat transfer in a heavy oil reservoir, such as the bitumen reservoirs in Cold Lake in Canada. In this application, the measured data may include temperature measurements, rock type and hydrocarbon type measurements, thermal expansion, subsidence associated with hydrocarbon production, and the like. The computer simulation may be based on diffusion equation for heat transfer, coupled with equations for rock, and heavy oil stiffness coefficients as a function of temperature, coupled with heavy oil phase relationships as a function of temperature and pressure, among others. The results of the correlation may be used to determine thermal conductivity and subsurface temperature in the overburden, and reservoir intervals and changes in phase for the hydrocarbon components, among others.

The techniques are not limited to hydrocarbon systems. For example, embodiments of the present techniques may be used to determine heat transfer through or across objects. For example, in an atmospheric reentry of a spacecraft, the techniques may be used to compare temperature at the skin of the spacecraft with simulated results generated from a forward finite element analysis. The techniques may also benefit other diverse applications as climate simulations, simulations of nuclear weapon detonations, and the like.

Exemplary Cluster Computing System

Figure 18:
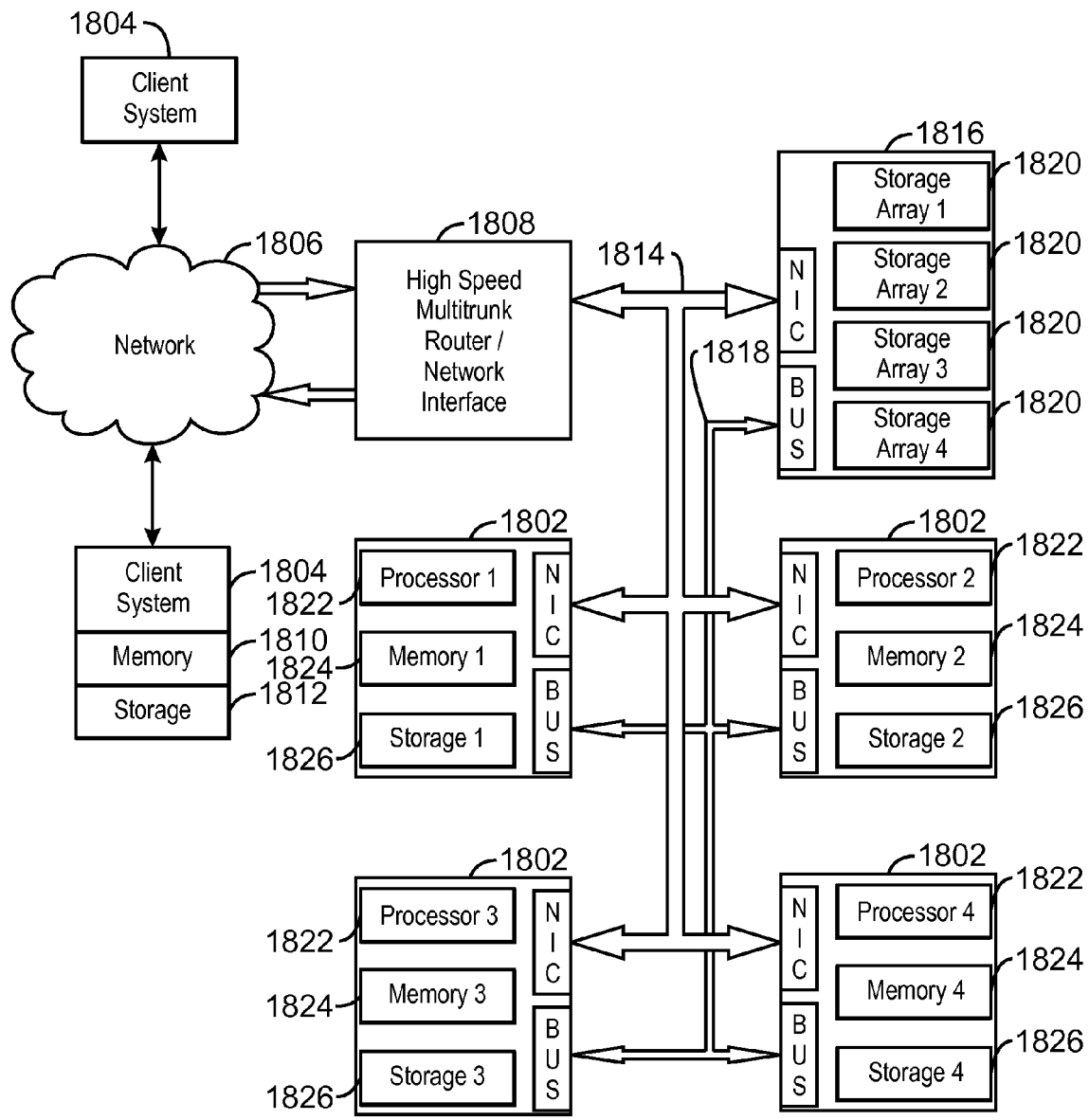
FIG. 18 is a block diagram of an exemplary cluster computing system 1800 that may be used to implement the present techniques, in accordance with exemplary embodiments of the present techniques.

FIG. 18 is a block diagram of an exemplary cluster computing system 1800 that may be used to implement the present techniques, in accordance with exemplary embodiments of the present techniques. The cluster computing system 1800 illustrated has four computing units 1802, each of which may perform calculations for part of the seismic imaging. However, one of ordinary skill in the art will recognize that the present techniques are not limited to this configuration, as any number of computing configurations may be selected. For example, a smaller simulation, such as a seismic imaging calculation, may be run on a single computing unit 1802, such as a workstation, while a large simulation may be run on a cluster computing system 1800 having 10, 100, 1000, or even more computing units 1802.

The cluster computing system 1800 may be accessed from one or more client systems 1804 over a network 1806, for example, through a high speed network interface 1808. The network 1806 may include a local area network (LAN), a wide area network (WAN), the Internet, or any combinations thereof. Each of the client systems 1804 may have non-transitory, computer readable memory 1810 for the storage of operating code and programs, including random access memory (RAM) and read only memory (ROM). The operating code and programs may include the code used to implement all or any portions of the methods discussed herein, for example, as discussed with respect to FIGS. 3 and 10-14. Further, the non-transitory computer readable media may hold full state checkpoints, correlation checkpoints, and simulation results, such as a data representation of a subsurface space. The client systems 1804 can also have other non-transitory, computer readable media, such as storage systems 1812. The storage systems 1812 may include one or more hard drives, one or more optical drives, one or more flash drives, any combinations of these units, or any other suitable storage device. The storage systems 1812 may be used for the storage of checkpoints, code, models, data, and other information used for implementing the methods described herein. For example, the data storage system may hold checkpoints for the optimal checkpointing strategy.

The high speed network interface 1808 may be coupled to one or more communications busses in the cluster computing system 1800, such as a communications bus 1814. The communication bus 1814 may be used to communicate instructions and data from the high speed network interface 1808 to a cluster storage system 1816 and to each of the computing units 1802 in the cluster computing system 1800. The communications bus 1814 may also be used for communications among computing units 1802 and the storage array 1816. In addition to the communications bus 1814 a high speed bus 1818 can be present to increase the communications rate between the computing units 1802 and/or the cluster storage system 1816.

The cluster storage system 1816 can have one or more non-transitory, computer readable media devices, such as storage arrays 1820 for the storage of checkpoints, data, visual representations, results, code, or other information, for example, concerning the implementation of and results from the methods of FIGS. 3 and 10-14. The storage arrays 1820 may include any combinations of hard drives, optical drives, flash drives, holographic storage arrays, or any other suitable devices.

Each of the computing units 1802 can have a processor 1822 and associated local tangible, computer readable media, such as memory 1824 and storage 1826. Each of the processors 1822 may be a multiple core unit, such as a multiple core CPU or a GPU. The memory 1824 may include ROM and/or RAM used to store code, for example, used to direct the processor 1822 to implement the methods discussed with respect to FIGS. 3 and 10-14. The storage 1826 may include one or more hard drives, one or more optical drives, one or more flash drives, or any combinations thereof. The storage 1826 may be used to provide storage for checkpoints, intermediate results, data, images, or code associated with operations, including code used to implement the method of FIGS. 3 and 10-14.

The present techniques are not limited to the architecture or unit configuration illustrated in FIG. 18. For example, any suitable processor-based device may be utilized for implementing all or a portion of embodiments of the present techniques, including without limitation personal computers, networks personal computers, laptop computers, computer workstations, GPUs, mobile devices, and multi-processor servers or workstations with (or without) shared memory. Moreover, embodiments may be implemented on application specific integrated circuits (ASICs) or very large scale integrated (VLSI) circuits. In fact, persons of ordinary skill in the art may utilize any number of suitable structures capable of executing logical operations according to the embodiments.

EXAMPLES

The Society of Exploration Geophysicists (SEG) Advanced Modeling (SEAM) example described in the "Background" section can be worked using Griewank "optimal" check-pointing and using the present invention for different computer configurations.

The straightforward, i.e. no checkpointing at all, method that saves all time steps of the forward simulation could mean keeping 40,000 time steps of an 84 gigabyte subsurface volume or roughly 3.36 petabytes of data. Examples for doing RTM on SEAM data demonstrate that the present invention provides the largest advantages over Griewank check-pointing to RAM when RAM is very limited in size compared to the size of the application problem.

These SEAM RTM application examples use RAM for "fast memory" and disk for "slow memory" and assume that the cost of reading or writing a restart state buffer to disk is five cost units, the cost of reading or writing a correlation buffer from disk is two, and that the cost of computing a forward time step is one and the cost of doing a backward time step is one. The cost of reading or writing a restart state buffer or correlation buffer using RAM is taken to be zero. Also, an S/C ratio of 12 is assumed. The "Forward Cost" is the number of cost units required to provide the forward simulation information in time-reversal order and includes both the cost of forward time stepping and the cost of doing store and restore operations. The "Total Cost" is the number of cost units required to do both the forward simulation time reversal and backward time stepping to implement RTM.

The following information is tabulated for each example. The algorithm used needs to compute the number of store and restore operations for each type of memory and for each type of operation. This information is used to compute the cost of the forward simulation time reversal. The algorithm used provides a Griewank solution whenever C is greater than or equal to S. In that case, the full state check-points done by Griewank that could have been done by only storing the information needed for doing a correlation are reported by the algorithm as if they were stores of correlation information.

| | |
|---|---|
| nReadc[F] | The number of restores of information needed for doing the correlation computation from fast memory |
| nWritec[F] | The number of stores of information needed for doing the correlation computation to fast memory |
| nReads[F] | The number of restores of full restart states from fast memory |
| nWrites[F] | The number of stores of full restart states to fast memory |
| nReadc[S] | The number of restores of information needed for doing the correlation computation from slow memory |
| nWritec[S] | The number of stores of information needed for doing the correlation computation to slow memory |
| nReads[S] | The number of restores of full restart states from slow memory |
| nWrites[S] | The number of stores of full restart states to slow memory |

The three examples labeled A, B and C compare (1) the computer cost of a time-reversal strategy using Griewank check-pointing to RAM, (2) the present invention using only check-pointing to RAM, and (3) the present invention using check-pointing to both RAM and disk. These examples assume that n is equal to 40,000 time steps and a computer environment that can support 100 restart state buffers in RAM and 100 restart state buffers on disk. The present invention can provide a speedup of 1.30× over the Griewank check-pointing strategy with all Griewank check-points going to RAM.

Example A

Griewank in Memory

S=84 G
Fast Memory=8316 G (99 state buffers)
Forward Cost=114750
Total Cost=154646
nReadc[F]=39248 nWritec[F]=38540 nReads[F]=751 nWrites[F]=708 nReadc[S]=0 nWritec[S]=0 nReads[S]=0 nWrites[S]=0

Example B

Optimal in Memory

S=84 G
C=7 G
Fast Memory=8316 G (use as either state or correlation buffers)
Forward Cost=79262
Total Cost=119261
nReadc[F]=39957 nWritec[F]=39916 nReads[F]=42 nWrites[F]=41,nReadc[S]=0 nWrite[S]=0 nReads[S]=0 nWrites[S]=0

The use of correlation buffers provides a 1.44× speedup for the forward simulation time reversal and an overall speedup of 1.29× over using "Griewank in Memory" for doing RTM.

Example C

Optimal in Memory and Disk

S=84 G
C=7 G
Fast Memory=8316 G (use as either state or correlation buffers)
Slow Memory=8400 G (use as either state or correlation buffers)
Forward Cost=79163
Total Cost=119162
nReadc[F]=39934 nWritec[F]=39934 nReads[F]=1 nWrites[F]=0 nReadc[S]=32 nWritec[S]=0 nReads[S]=32 nWrites[S]=32

Although the disk space available can hold 100 restart state buffers or 1200 correlation buffers, the algorithm of the invention chooses to use only 32 restart state buffers on disk. The high cost of doing input and output operations to disk discourages the algorithm from using all of the disk space that is available. Most of the speedup in this case comes from the S/C ratio and only an incremental speedup is gained from having disk available. Example C provides an overall speedup of 1.30× over using "Griewank in Memory" for doing RTM.

The next three examples assume that n is equal to 40,000 time steps and a computer environment that can support 20 restart state buffers in RAM and 100 restart state buffers on disk. Note that the RAM available is smaller than in the examples above and that the advantage associated with this invention is greater. The present invention applied in Example G can provide a speedup of 1.67× over the Griewank check-pointing strategy with all Griewank check-points going to RAM in Example D and an even larger speedup over the Griewank check-pointing strategy with all Griewank check-points going to disk in Example E.

Example D

Griewank in Memory

S=84 G
Fast Memory=1680 G (20 restart state buffers)
Forward Cost=185055
Total Cost=225054
nReadc[F]=33275 nWritec[F]=27439 nReads[F]=6724 nWrites[F]=5836 nReadc[S]=0 nWritec[S]=0 nReads[S]=0 nWrites[S]=0

Example E

Griewank on Disk

S=84 G
Slow Memory=8400 G (100 restart state buffers)
Forward Cost=513685
Total Cost=553684
Griewank in disk: S=84 G, C=84 G, n=40,000, M[F]=0, M[S]=8400 G (100 Buffers)
Forward cost=513685=114750+(39248+38540+751+708) *5 (Computed from adding the I/O cost from a previous case)

Note that Griewank checkpointing to disk is more expensive than Griewank checkpointing to RAM in this example due to the cost of input and output operations to disk.

Example F

Optimal in Memory and Disk

S=84 G
C=7 G
Fast Memory=1680 G (use as either state or correlation buffers)
Slow Memory=8400 G (use as either state or correlation buffers)
Forward Cost=94655
Total Cost=134654
nReadc[F]=39710 nWritec[F]=39692 nReads[F]=33 nWrites[F]=18 nReadc[S]=100 nWrite[S]=0 nReads[S]=156 nWrites[S]=100

This solution saves 100 restart state checkpoints to disk and does 156 restores of restart checkpoint information from disk. An additional 18 restart state checkpoints are done in RAM. A total of 33 restore operations are done on the restart state checkpoints in RAM. No correlation buffers are saved to disk.

The next two examples assume a computer environment that can support only 10 restart state buffers in RAM and 50 restart state buffers on disk. In this environment, the present invention can provide a speedup of 1.97× over a Griewank check-pointing strategy with all check-points saved in RAM.

Example G

Griewank in Memory

S=84 G
Fast Memory=840 G (10 restart state buffers)
Forward Cost=269620
Total Cost=309619
nReadc[F]=24586 nWritec[F]=14547 nReads[F]=15413 nWrites[F]=10039 nReadc[S]=0 nWritec[S]=0 nReads[S]=0 nWrites[S]=0

Example H

Optimal in Memory and Disk

S=84 G
C=7 G
Fast Memory=840 G (use as either state or correlation buffers)
Slow Memory=4200 G (use as either state or correlation buffers)
Forward Cost=116736
Total Cost=156735
nReadc[F]=39356 nWritec[F]=39327 nReads[F]=44 nWrites[F]=29 nReadc[S]=266 nWrite[S]=0 nReads[S]=333 nWrites[S]=266

The cost of the time reversal of the forward propagating excitation pulse wavefield for Example H has a speedup of 2.3× over that in Example G. The full RTM application for Example H has a speedup of 1.97× over that in Example G.

The next two examples assume a computer environment that can support only 5 restart state buffers in RAM and 25 restart state buffers on disk. In this environment, the present invention can provide a speedup of 2.9× over a Griewank check-pointing strategy with all check-points saved in RAM.

Example J

Griewank in Memory

S=84 G
Fast Memory=420 G (5 restart state buffers)
Forward Cost=483735
Total Cost=523734
nReadc[F]=12113 nWritec[F]=3224 nReads[F]=27886 nWrites[F]=8889 nReadc[S]=0 nWritec[S]=0 nReads[S]=0 nWrites[S]=0

Example K

Optimal in Memory and Disk

S=84 G
C=7 G
Fast Memory=420 G (use as either state or correlation buffers)
Slow Memory=2100 G (use as either state or correlation buffers)
Forward Cost=138318
Total Cost=178317
nReadc[F]=38915 nWritec[F]=38830 nReads[F]=176 nWrites[F]=85 nReadc[S]=350 nWrite[S]=0 nReads[S]=558 nWrites[S]=350

The next two examples assume a computer environment that can support only 2 restart state buffers in RAM and 10 restart state buffers on disk. In this environment, the present invention can provide a speedup of 5.7× over a Griewank check-pointing strategy with all check-points saved in RAM.

Example L

Griewank in Memory

S=84 G
Fast Memory=168 G (2 restart state buffers)
Forward Cost=1804685
Total Cost=1844684
nReadc[F]=1914 nWritec[F]=62 nReads[F]=38085 nWrites[F]=1852 nReadc[S]=0 nWritec[S]=0 nReads[S]=0 nWrites[S]=0

Example M

Optimal in Memory and Disk

S=84 G
C=7 G
Fast Memory=168 G (use as either state or correlation buffers)
Slow Memory=840 G (use as either state or correlation buffers)
Forward Cost=280124
Total Cost=320123
nReadc[F]=37505 nWritec[F]=37295 nReads[F]=757 nWrites[F]=210 nReadc[S]=461 nWritec[S]=0 nReads[S]=1276 nWrites[S]=461

The next two examples assume a computer environment that can support only 1 restart state buffers in RAM and 5 restart state buffers on disk. In this environment, the present invention can provide a speedup of 20× over a Griewank check-pointing strategy with all check-points saved in RAM.

Example N

Griewank in Memory

S=84 G
Fast Memory=84 G (1 restart state buffers)
Forward Cost=7502798
Total Cost=7542797
nReadc[F]=282 nWritec[F]=1 nReads[F]=39717 nWrites[F]=281 nReadc[S]=0 nWritec[S]=0 nReads[S]=0 nWrites[S]=0

Example O

Optimal in Memory and Disk

S=84 G
C=7 G
Fast Memory=84 G (use as either state or correlation buffers)
Slow Memory=420 G (use as either state or correlation buffers)
Forward Cost=336109
Total Cost=376108
nReadc[F]=35758 nWritec[F]=35758 nReads[F]=9 nWrites[F]=0 nReadc[S]=1262 nWritec[S]=0 nReads[S]=2970 nWrites[S]=1262

The final two examples assume a computer environment that can support only 0.5 restart state buffers in RAM and 2.5 restart state buffers on disk, the present invention can provide a speedup of 893× over a Griewank check-pointing strategy with all check-points saved in RAM.

Example P

Griewank in Memory

S=84 G
Fast Memory=42 G (0 restart state buffers)
Forward Cost=8000200
Total Cost=8000600
nReadc[F]=0 nWritec[F]=0 nReads[F]=39999 nWrites[F]=0 nReadc[S]=0 nWritec[S]=0 nReads[S]=0 nWrites[S]=0

Example Q

Optimal in Memory and Disk

S=84 G
C=7 G
Fast Memory=42 G (use as correlation buffers)
Slow Memory=210 G (use as either state or correlation buffers)
Forward Cost=855154
Total Cost=895153
nReadc[F]=21768 nWritec[F]=21768 nReads[F]=27 nWrites[F]=0 nReadc[S]=14604 nWritec[S]=14254 nReads[S]=3600 nWrites[S]=350

Thus an algorithm of the present invention is able to use storage less than a restart state buffer if it is enough to contain a correlation buffer.

While the present techniques may be susceptible to various modifications and alternative forms, the exemplary embodiments discussed above have been shown only by way of example. However, it should again be understood that the present techniques are not intended to be limited to the particular embodiments disclosed herein. Indeed, the present techniques include all alternatives, modifications, and equivalents falling within the true spirit and scope of the appended claims.

APPENDIX A

The source code shown below is a naïve implementation of the optimal check pointing strategy of the present invention with just the addition of the concept of a "correlation buffer" to that of the "state buffer" for demonstration of the idea.

```
class Analyzer{
private:
    int n,C,S,M;
    int** j;
    int dimension1, dimension2;
public:
    Analyzer(int n_, int C_, int S_, int M_):n(n_),C(C_),S(S_),M(M_)
    {
        dimension1 = n+1;
        dimension2 = n+1; if(dimension2<M/S+1) dimension2 = M/S+1;
        j = new int*[dimension1];
        for(int a=0; a<dimension1; a++)
        {
            j[a] = new int[ dimension2 ];
            for(int b=0; b<dimension2; b++){
                j[a][b] = -2;
            }
        }
    }
    ~Analyzer( ){ /*code for deallocating buffer j not shown here for simplicity*/ }
    int J(int n, int ns, bool bPrint=false, int nstart=0)
    {
        if(n<dimension1 && ns<dimension2 &&j[n][ns]!=-2 && !bPrint) return j[n][ns];
        if( M-ns*S>=n*C ) return 2*n;
        if( M-ns*S< 0 ) return -1;
        intcost1 = J_nocp(n, ns);
        long cost2 = -1;
        intbestk = -1;
        int bestcostb = -1;
        for(int k=1; k<=n-1; k++){
            int costa = J(n-k,ns+1);
```

APPENDIX A-continued

The source code shown below is a naïve implementation of the optimal check pointing strategy of the present invention with just the addition of the concept of a "correlation buffer" to that of the "state buffer" for demonstration of the idea.

```
                int costb = J(k-1,ns);
                if(costa<0 || costb<0) continue;
                int cost = k+costa+2+costb;
                if(cost<cost2 || cost2==-1){
                    cost2 = cost;
                    bestk = k;
                    bestcostb = costb;
                }
            }
            int cost = -1;
            if(cost1<0 && cost2<0){
                cost = -1;
            } else if( (cost2>=0) && (cost2<=cost1 || cost1<0) ){
                if(bPrint){
                    printf("Advance %d steps from state %d to state %d (J=%d)\n", bestk, nstart, nstart+bestk, bestk);
                    printf("Take snapshot of state %d\n", nstart+bestk);
                    J(n-bestk,      ns+1, true, nstart+bestk);
                    printf("Backward adjoint state 1 step to %d (J=1), correlate there \n", nstart+bestk);
                    printf("Release state %d buffer, Backward adjoint state 1 step to %d (J=1)\n", nstart+bestk, nstart+bestk-1);
                    printf("Restore state %d\n", nstart);
                    J(bestk-1, ns,       true, nstart);
                }
                cost = cost2;
            }else if( (cost1>=0) && (cost1<=cost2 || cost2<0) ){
                if(bPrint){
                    printf("Without checkpoints to correlate %d steps with memory constraint %d (J=%d)\n",
                        n, M-ns*S, cost1);
                }
                cost = cost1;
            }
            if(n<dimension1 && ns<dimension2) j[n][ns] = cost;
            return cost;
        }
        int J_nocp(int n, int ns)
        {
            if(n==0) return 0;
            if( M-ns*S<0 ) return -1;
            int navailablebuf = (M-ns*S)/C + 1;
            int nsweep = n/navailablebuf;
            int nremain = n-nsweep*navailablebuf;
            return ( n+ n+navailablebuf*(1-nsweep) )*nsweep/2 + nremain + n - 1;
        }
};
int main(int argc, char** argv)
{
    int n = 55; if(argc>1) n = atoi( argv[1] );
    int C = 10; if(argc>2) C = atoi( argv[2] );
    int S = 10; if(argc>3) S = atoi( argv[3] );
    int M = 20; if(argc>4) M = atoi( argv[4] );
    Analyzer analyzer(n,C,S,M);
    int J = analyzer.J(n, 0, true);
    printf("totalcost = %d\n", J);
    return 0;
}
```

APPENDIX B

This source code provides an example implementation of the present inventive method incorporating a two-level storage optimal check pointing strategy.

```
__int min(int x, int y){ if(x<y) return x; return y; }
int max(int x, int y){ if(x>y) return x; return y; }
int round(float x){ int a = (int)x; if(x<a-0.5) return a-1; if(x<a+0.5) return a; return a+1;}
class CPAnalyzer
{
private:
    bool bOptimal;
    int n, C, S, nSBuf[2], M[2]; float Ws[2], Rs[2], Wc[2], Rc[2];
    float* pJ[2][2]; float* pJnocp[2]; int* pBestK[2][2];
public:
    std::vector<int> instructions;
    int nReadc[2], nWritec[2], nReads[2], nWrites[2];
    void clear( ){ instructions.clear( ); nReadc[0]=nReadc[1]=nWritec[0]=nWritec[1]=nReads[0]=nReads[1]=nWrites[0]=nWrites[1]=0; }
```

APPENDIX B-continued

This source code provides an example implementation of the present inventive method incorporating a two-level storage optimal check pointing strategy.

```
CPAnalyzer(int n__, int C__, int S__, int M__[ ], float Ws__[ ], float Rs__[ ], float Wc__[ ], float Rc__[ ], bool bOptimal__=true)
    :n(n__),C(C__),S(S__),bOptimal(bOptimal__)
{
    for(int i=0; i<2; i++){
        M[i]=M__[i]; nSBuf[i] = min( (n-1)*C/S+1, M[i]/S);
        Ws[i]=Ws__[i]; Rs[i]=Rs__[i]; Wc[i]=Wc__[i]; Rc[i]=Rc__[i];
    }
    int no = (n+1)*(nSBuf[0]+1)*(nSBuf[1]+1);
    for(int startType=0; startType<2; startType++){
        pJnocp[startType] = newfloat[no];
        for(int k=0; k<no; k++) pJnocp[startType][k] = -1;
        for(int kType=0; kType<2; kType++){
            pJ[startType][kType] = newfloat[no];
            pBestK[startType][kType] = new int[no];
            for(int k=0; k<no; k++){
                pJ[startType][kType][k] = -1;
                pBestK[startType][kType][k] = -1;
            }
        }
    }
    for(int i=2; i<=n; i++){
        if(i %10==0) printf("constructed table for <%d states (total no of states:%d)\n", i, n);
        for(int nfUsed=nSBuf[0]; nfUsed>=0; nfUsed--){
            for(int nsUsed=nSBuf[1]; nsUsed>=0; nsUsed--){
                Jwithcp<0,0,0>(i,nfUsed,nsUsed);
                Jwithcp<0,1,0>(i,nfUsed,nsUsed);
                Jwithcp<1,0,0>(i,nfUsed,nsUsed);
                Jwithcp<1,1,0>(i,nfUsed,nsUsed);
            }
        }
    }
}
~CPAnalyzer( ){/*Release is not added here for convenient demonstration of idea*/}
int IDOf(int n, int nfUsed, int nsUsed){return n*(nSbuf[0]+1)*(nSBuf[1]+1) + (nSBuf[0]-nfUsed)*(nSBuf[1]+1) + (nSBuf[1]-nsUsed);}
template<int StartCP>
float Jnocp(int n, int m, int nfc, int nsc)
{
    if(n<=0) { return 1e10; printf("Jnocp for n=%d!\n", n); exit(0); }
    int nf = min(n-m,m*nfc); int tf=(nfc==0)?0:(nf/nfc); int rf = nf-tf*nfc;
    int ns = min(n-m-nf,m*nsc);int ts=(nsc==0)?0:(ns/nsc); int rs = ns-ts*nsc;
    float J = (m-1)*Rs[StartCP]+m*(m+1)*0.5;
    J += tf*(tf+1)*nfc*0.5 + rf*(tf+1) + nf*(Wc[0]+Rc[0]);
    J += ts*(ts+1)*nsc*0.5 + rs*(ts+1) + ns*(Wc[1]+Rc[1]);
    return J;
}
template<int StartCP, int print>
float Jnocp(int n, int nfUsed, int nsUsed)
{
    float* pCost= pJnocp[StartCP] + IDOf(n,nfUsed,nsUsed);
    if(print==0 && *pCost>=0) return *pCost;
    int nfc = (M[0]-nfUsed*S)/C; int nsc = (M[1]-nsUsed*S)/C;
    int m[11]; int mno = 0;
    m[mno] = n; mno++;
    if(nfc>0){
        int mf= n/(nfc+1);
        if(mf*(nfc+1)<n) mf++;
        int mopt = round( (nfc*Rs[StartCP]+n+nfc*(Wc[0]+Rc[0]))/(nfc+1) );
        if(mopt<n && mopt>mf){
            m[mno] = mopt;      mno++;
        }
        m[mno] = mf; mno++;
    }
    if(nsc>0){
        int ms = n/(nfc+nsc+1);
        if(ms*(nfc+nsc+1)<n) ms = ms+1;
        int mopt = round( ( nsc*Rs[StartCP]+n*(1+nfc)+nsc*(1+nfc)*(Wc[1]+Rc[1])-nsc*nfc*(Wc[0]+Rc[0]) ) /
                ((nfc+1)*(nfc+nsc+1)) );
        if(mopt<m[mno-1] && mopt>ms){
            m[mno] = mopt; mno++;
        }
        m[mno] = ms; mno++;
    }
    float bestcost=1e10; int bestm=-1;
    for(int i=0; i<mno; i++){
        for(intj=-1; j<=1; j++){
            int mm = m[i]+j;
            if(mm<m[mno-1] || mm>m[0]) continue;
```

APPENDIX B-continued

This source code provides an example implementation of the present inventive method incorporating a two-level storage optimal check pointing strategy.

```
                float cost = Jnocp<StartCP>(n, mm, nfc, nsc);
                if(cost>bestcost) continue;
                bestcost = cost; bestm = mm;
            }
        }
        if(print){
            int m = bestm;
            int nf = min(n-m,m*nfc); int tf=(nfc==0)?0:(nf/nfc); int rf = nf-tf*nfc;
            int ns = min(n-m,m*nsc);int ts=(nsc==0)?0:(ns/nsc); int rs = ns-ts*nsc;
            printf("2 %d %dF %dS, ", n, min(nf,nfc), min(ns,nsc));
            instructions.push_back(2);
            instructions.push_back(n);
            instructions.push_back(min(nf,nfc)); nReadc[0]+=min(nf,nfc); nWritec[0]+=min(nf,nfc);
            instructions.push_back(min(ns,nsc)); nReadc[1]+=min(ns,nsc); nWritec[1]+=min(ns,nsc);
            if(n-1-min(nf,nfc)-min(ns,nsc)>0){
                nReads[StartCP]++;
                printf("3 %c, ", (StartCP==0)?'F':'S');
                instructions.push_back(3);
                instructions.push_back(StartCP);
                Jnocp<StartCP,print>(n-1-min(nf,nfc)-min(ns,nsc),nfUsed,nsUsed);
            }
        }
        *pCost = bestcost;
        return bestcost;
}
template<int StartType, int KType, int print>
float Jwithcp(int n, int nfUsed, int nsUsed)
{
    if(n<=1){ return 1e10; }
    if(KType==0 && nfUsed>=nSBuf[KType]){ return 1e10; }
    if(KType==1 && nsUsed>=nSBuf[KType]){ return 1e10; }
    float* pCost = pJ[StartType][KType] + IDOf(n,nfUsed,nsUsed);
    if(print==0 && *pCost>=0) return *pCost;
    if(n==2){
        *(pBestK[StartType][KType] + IDOf(n,nfUsed,nsUsed)) = 1;
        *pCost = 1 + Ws[KType] + 1 + Rc[KType];
        return *pCost;
    }
    int previousk = *(pBestK[StartType][KType] + IDOf(n-1,nfUsed,nsUsed) );
    int nextnfUsed = nfUsed+((KType==0)?1:0);
    int nextnsUsed = nsUsed+((KType==1)?1:0);
    float bestcost = 1e10; int bestk;
    int kmax, kmin, deltak=1;
    int searchdistance = (S/C+1)*2;
    kmax = min(previousk+searchdistance,n-1);
    kmin = max(previousk-searchdistance,1);
    if( (!bOptimal) && (n>S/C*20) ){      deltak = max(S/C,1);           }
    for(int k=kmax; k>=kmin; k-=deltak){
        float cost = k + Ws[KType] + J<KType,print>(n-k,nextnfUsed,nextnsUsed) +
            Rc[KType] + Rs[StartType] + J<StartType,print>(k-1,nfUsed,nsUsed);
        if( cost<bestcost-1e-4 ){
            bestcost = cost; bestk=k;
        }
    }
    *pCost = bestcost;
    *(pBestK[StartType][KType] + IDOf(n,nfUsed,nsUsed) ) = bestk;
    return *pCost;
}
template<int StartType, int print>
float J(int n, int nfUsed, int nsUsed)
{
    if(n>this->n){      printf("# of states beyond limit (%d>%d)\n", n,this->n);      exit(0);}
    float costF=1e10,costS=1e10,cost0=1e10;
    costF = Jwithcp<StartType,0,0>(n,nfUsed,nsUsed);
    costS = Jwithcp<StartType,1,0>(n,nfUsed,nsUsed);
    cost0 = Jnocp<StartType,0>(n,nfUsed,nsUsed);
    float bestcost = cost0;
    int kType = 2;
    if(cost0<costF+1e-4 && cost0<costS+1e-4){
        bestcost = cost0;
    }else if(costS<costF+1e-4){
        bestcost = costS;
        kType = 1;
    }else{
        bestcost = costF;
        kType = 0;
    }
```

APPENDIX B-continued

This source code provides an example implementation of the present inventive method incorporating a two-level storage optimal check pointing strategy.

```
            if(print){
                if(bestcost==cost0){
                    Jnocp<StartType,print>(n, nfUsed, nsUsed);
                }else{
                    nWrites[kType]++; nReadc[kType]++; nReads[StartType]++;
                    int k = *(pBestK[StartType][kType] + IDOf(n,nfUsed,nsUsed) );
                    printf("0 %d %c, ", k, ((kType==0)?'F':'S') );
                    instructions.push_back(0);
                    instructions.push_back(k);
                    instructions.push_back(kType);
                    if(kType==0){
                        J<0,print>(n-k,nfUsed+1,nsUsed);
                    }else{
                        J<1,print>(n-k,nfUsed,nsUsed+1);
                    }
                    printf("1 %c %c, ", (kType==0?'F':'S'), (StartType==0?'F':'S') );
                    instructions.push_back(1);
                    instructions.push_back(kType);
                    instructions.push_back(StartType);
                    J<StartType,print>(k-1,nfUsed,nsUsed);
                }
            }
            return bestcost;
        }
};
int main(int argc, char** argv)
{
    int M[2]; float Rs[2], Ws[2], Rc[2], Wc[2];
    int n = 100;if(argc>1) n = atoi( argv[1] ); printf("n=%d\n", n);
    int C = 12; if(argc>2) C = atoi( argv[2] ); printf("C=%d\n", C);
    int S = 12; if(argc>3) S = atoi( argv[3] ); printf("S=%d\n", S);
    M[0] = 12; if(argc>4) M[0] = atoi( argv[4] ); printf("M[F]=%d\n", M[0]);
    M[1] = 12; if(argc>5) M[1] = atoi( argv[5] ); printf("M[S]=%d\n", M[1]);
    Rs[1] = 12; if(argc>6) Rs[1] = atof( argv[6] ); printf("Rs[S]=%e\n", Rs[1]);
    Ws[1] = 12; if(argc>7) Ws[1] = atof( argv[7] ); printf("Ws[S]=%e\n", Ws[1]);
    Rc[1] = 1; if(argc>8) Rc[1] = atof( argv[8] ); printf("Rc[S]=%e\n", Rc[1]);
    Wc[1] = 1; if(argc>9) Wc[1] = atof( argv[9] ); printf("Wc[S]=%e\n", Wc[1]);
    Rs[0] = 5; if(argc>10) Rs[0] = atof( argv[10]);printf("Rs[F]=%e\n", Rs[0]);
    Ws[0] = 5; if(argc>11) Ws[0] = atof( argv[11]);printf("Ws[F]=%e\n", Ws[0]);
    Rc[0] = 0.6; if(argc>12) Rc[0] = atof( argv[12]);printf("Rc[F]=%e\n", Rc[0]);
    Wc[0] = 0.6; if(argc>13) Wc[0] = atof( argv[13]);printf("Wc[F]=%e\n", Wc[0]);
    int nOptimal=1; if(argc>14) nOptimal = atoi( argv[14]);printf("nOptimal=%d\n", nOptimal);
    M[0] = min(M[0], n*C); M[1] = min(M[1], n*C-(M[0]/C)*C );
    CPAnalyzer analyzer(n,C,S,M,Rs,Ws,Rc,Wc, nOptimal);
    analyzer.clear ( );
    float J = analyzer.J<0, 1>(n, 0, 0);
    printf("-1\nForward Cost = %e, Total Cost = %e\n", J, J+n-1);
    printf("nReadc[F]=%d nWritec[F]=%d nReads[F]=%d nWrites[F]=%d\n",
        analyzer.nReadc[0], analyzer.nWritec[0], analyzer.nReads[0], analyzer.nWrites[0]);
    printf("nReadc[S]=%d nWritec[S]=%d nReads[S]=%d nWrites[S]=%d\n",
        analyzer.nReadc[1], analyzer.nWritec[1], analyzer.nReads[1], analyzer.nWrites[1]);
    return 0;
}
```

The invention claimed is:

1. A method for lowering a computational cost of a computer simulation, comprising:

performing a checkpointing strategy, wherein the checkpointing strategy comprises:

selecting a time step for storing a correlation checkpoint, wherein the correlation checkpoint comprises data used to correlate a forward propagated value generated by the computer simulation, and wherein the computer simulation cannot be restarted from the values stored in the correlation checkpoint;

wherein the selecting a time step for storing a correlation checkpoint balances (i) reduction of computer storage requirements from storing a correlation checkpoint instead of a full state checkpoint, without ability to restart the computer simulation, versus (ii) reduction of computation time from storing a full state checkpoint from which the computer simulation can be restarted;

allocating a storage space for the correlation checkpoint; and running the computer simulation at each of a plurality of time steps, wherein at each of the plurality of time steps:

a simulated value backwards propagated from measured data is correlated to the forward propagated value from the computer simulation, wherein the forward propagated value is stored in the correlation checkpoint.

2. The method of claim 1, further comprising:
storing a full state checkpoint; and
restarting the simulation from the full state checkpoint.

3. The method of claim 1, further comprising determining an optimum location for storing either a full state checkpoint or a correlation checkpoint, wherein the optimum location is storage space allocated in a graphics processor unit (GPU) memory, a random access memory (RAM), a RAM disk, a disk drive, or any combinations thereof, and wherein the determination of the optimum location is based, at least in part, on the access speed of the storage space.

4. The method of claim 1, wherein a storage space used for the correlation checkpoint is less than a storage space used for a full state checkpoint.

5. The method of claim 1, further comprising optimizing the checkpointing strategy by steps comprising:
   determining a computing cost associated with storing the correlation checkpoint;
   minimizing the computing cost based, at least in part, on an access speed for each of a plurality of storage units, and the ratio in storage space required for a full state checkpoint to storage space required for the correlation checkpoint; and
   generating a table comprising the plurality of time steps and a type of checkpoint to be stored at each of the plurality of time steps.

6. The method of claim 5, wherein determining the computing cost comprises:
   computing a maximum number of correlation checkpoints that can be stored in a fast storage unit;
   computing a maximum number of correlation checkpoints that can be stored in a slow storage unit;
   if any correlation checkpoints can be stored in fast storage:
      compute an optimal number of sweeps if only using fast storage and add to a list;
      compute a minimum number of sweeps if only using fast storage and add to the list;
   if any correlation checkpoints can be stored in slow storage:
      compute a minimum number of sweeps if using all types of storage and add to the list;
      compute an optimal number of sweeps if using all of the fast storage and storing at least one correlation checkpoint in slow storage, add to list if less than last value on list;
   add an integer value nearest to each value on the list to the list;
   compute the cost for each value on the list; and
   return the minimum cost.

7. The method of claim 1, further comprising generating an image of a subsurface region from seismic data.

8. The method of claim 1, further comprising history matching reservoir data to a reservoir simulation.

9. The method of claim 1, wherein propagating simulated excitation pulses forwards in time is performed using a full two-way, wave equation.

10. The method of claim 1, wherein propagating simulated excitation pulses forwards in time is performed using Kirchhoff, Beam or one-way wave equation migration techniques.

11. The method of claim 1, wherein the correlation checkpoint consists of less data than required to restart the computer simulation because of at least one of:
   (a) computations for the computer simulation are performed with a higher degree of precision than computations for the correlation;
   (b) computations for the computer simulation require boundary condition information not required for the correlation;
   (c) not all data components that are simulated are correlated; and
   (d) the computer simulation uses a denser computational grid than the computations for the correlation.

12. A method for comparing collected data to simulated data, comprising:
   backwards propagating the collected data across a grid;
   running a computer simulation to generate forward propagated data across the grid, wherein:
   a plurality of correlation buffers are stored during the computer simulation; and
   the simulation cannot be restarted from any of the plurality of correlation buffers; and
   correlating the data stored in the correlation buffers to the backwards propagated data at each point in the grid; wherein
      time steps in the computer simulation at which the correlation buffers are stored are selected, at least in part, by balancing (i) reduction of computer storage requirements from storing a correlation buffer instead of a full state buffer, without ability to restart the computer simulation, versus (ii) reduction of computation time from storing a full state buffer from which the computer simulation can be restarted.

13. The method of claim 12, comprising storing a full state checkpoint during the simulation, wherein the simulation can be restarted from the full state checkpoint.

14. The method of claim 12, further comprising:
   calculating a cost for storing a full state checkpoint; and
   determining a time step for storing a full state checkpoint based, at least in part, on the cost.

15. The method of claim 1, wherein the forward propagated data are is correlated to backwards propagated data in a next time step.

16. The method of claim 1, further comprising:
   storing a plurality of correlation checkpoints in a fast storage medium; and
   storing at least one correlation checkpoint in a slow storage medium.

17. The method of claim 16, further comprising storing at least one full state checkpoint, wherein the simulation can be restarted from the full state checkpoint.

18. The method of claim 17, further comprising storing the at least one full state checkpoint in a fast storage medium.

19. A system for correlating simulated data to collected data, comprising:
   a processor;
   a storage system, comprising data structures representing:
   measured data;
   a propagation algorithm configured to propagate the measured data backwards-in-time across a grid;
   a computer simulation configured to generate forward-in-time simulated data across the grid; and
   a memory, wherein the memory comprises code to direct the processor to:
      propagate the measured data backwards-in-time across the grid;
      populate the grid with forward-in-time simulated data from the computer simulation;
      store a correlation checkpoint at a selected time step during the computer simulation, said correlation checkpoint containing information sufficient to perform a correlation but insufficient to restart simulation; wherein the selecting a time step for storing a correlation checkpoint balances (i) reduction of computer storage requirements from storing a correlation checkpoint instead of a full state checkpoint, without ability to restart the computer simulation, versus (ii) reduction of computation time from storing a full state checkpoint from which the computer simulation can be restarted; and correlate the backwards propagated data to the simulated data stored in the correlation checkpoint.

20. The system of claim 19, wherein the processor comprises a single core, a multiple core, a graphics processing unit, or any combinations thereof.

21. The system of claim 19, wherein the correlation checkpoint is stored in the memory.

22. The system of claim 19, wherein the memory comprises a random access memory (RAM), a RAM disk, a graphics processing unit memory, or any combinations thereof.

23. The system of claim 19, wherein the memory comprises code to store a full state checkpoint at a time step, wherein the computer simulation can be restarted from the full state checkpoint.

24. A computer implemented method for solving a problem of imaging or inverting seismic data where a time-stepping forward seismic simulation must be accessed in reverse-time order to correlate with a backward time stepping adjoint computation, comprising:

determining and implementing a checkpointing strategy that reduces computation time for a fixed amount of available computer memory M, including data storage, by selecting a combination of $n_c$ memory buffers of size C sized to store data from a forward simulation needed to perform a correlation at a checkpointed time step without storing all data needed to restart the simulation from the time step, and $n_s$ memory buffers of size S sized to store all data needed to restart the forward simulation from a checkpointed time step, wherein S>C, $n_c C + n_s S \leq M$, $n_c \geq 1$ and $n_s \geq 0$;

wherein the checkpointed time steps are selected, at least in part, by balancing (i) reduction of computer storage requirements from storing a buffer of size C instead of a buffer of size S, without ability to restart the computer simulation, versus (ii) reduction of computation time from storing a buffer of size S from which the computer simulation can be restarted;

performing the imaging or inverting on the computer using saved data from the selected memory buffers.

25. The method of claim 24, wherein the checkpointing strategy is based at least in part on different access speeds of memory resources.

26. The method of claim 24, wherein the checkpointing strategy includes optimizing which time steps are selected as restart checkpoints, for a pre-selected total number of time steps in the forward simulation.

27. The method of claim 26, wherein the optimizing which time steps are selected as restart checkpoints is based on minimizing a computation cost function.

28. The method of claim 24, wherein C depends upon what type of correlation is used in the imaging or inverting.

* * * * *